(12) United States Patent
Kihira et al.

(10) Patent No.: US 6,631,022 B1
(45) Date of Patent: Oct. 7, 2003

(54) OPTICAL DEVICE, A FABRICATION METHOD THEREOF, A DRIVING METHOD THEREOF AND A CAMERA SYSTEM

(75) Inventors: Toru Kihira, Kanagawa (JP); Toru Udaka, Kanagawa (JP); Mitsunobu Sekiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/577,116

(22) Filed: May 23, 2000

(30) Foreign Application Priority Data

| May 28, 1999 | (JP) | P11-150227 |
| May 31, 1999 | (JP) | P11-151467 |
| Jul. 1, 1999 | (JP) | P11-187317 |
| Jul. 1, 1999 | (JP) | P11-187318 |
| Jun. 17, 1999 | (JP) | P11-170670 |
| Jun. 17, 1999 | (JP) | P11-171157 |
| Jun. 17, 1999 | (JP) | P11-171158 |
| Apr. 24, 2000 | (JP) | P2000-122945 |

(51) Int. Cl.[7] .............. G02F 1/15; G02F 1/153; B05D 5/12
(52) U.S. Cl. .............. 359/265; 359/272; 359/273; 427/125
(58) Field of Search .............. 359/265, 272, 359/273, 269, 270, 275; 427/125

(56) References Cited

U.S. PATENT DOCUMENTS

| 6,219,173 B1 * | 4/2001 | Udaka et al. ............ 359/272 |
| 6,336,753 B1 * | 1/2002 | Kihira et al. ............ 396/506 |
| 6,362,806 B1 * | 3/2002 | Reichmann et al. ..... 345/105 |

* cited by examiner

*Primary Examiner*—Georgia Epps
*Assistant Examiner*—Tim Thompson
(74) *Attorney, Agent, or Firm*—Sonnenschein, Nath & Rosenthal LLP

(57) ABSTRACT

An optical device includes an insulation layer formed on a lead electrode of an electrode, an electrode having an indium doped tin oxide in which indium/tin is 1.5 or less by the element ratio, an electrode having a laminate including an oxide layer in which indium is doped to tin and a tin oxide layer, and an electrode having conductive particles as a first layer, a polymeric layer as a second layer and a current collector as a third layer, and the second layer is disposed between the first layer and the third layer. A control device controls a driving current to an electrode in accordance with a temperature and a current supply supplies a current to an electrode for supplementing a dissolved portion of electrodeposited material. The optical device includes a polarization device which polarizes an electrode to an oxidation direction before electrodeposition on the electrode.

116 Claims, 50 Drawing Sheets

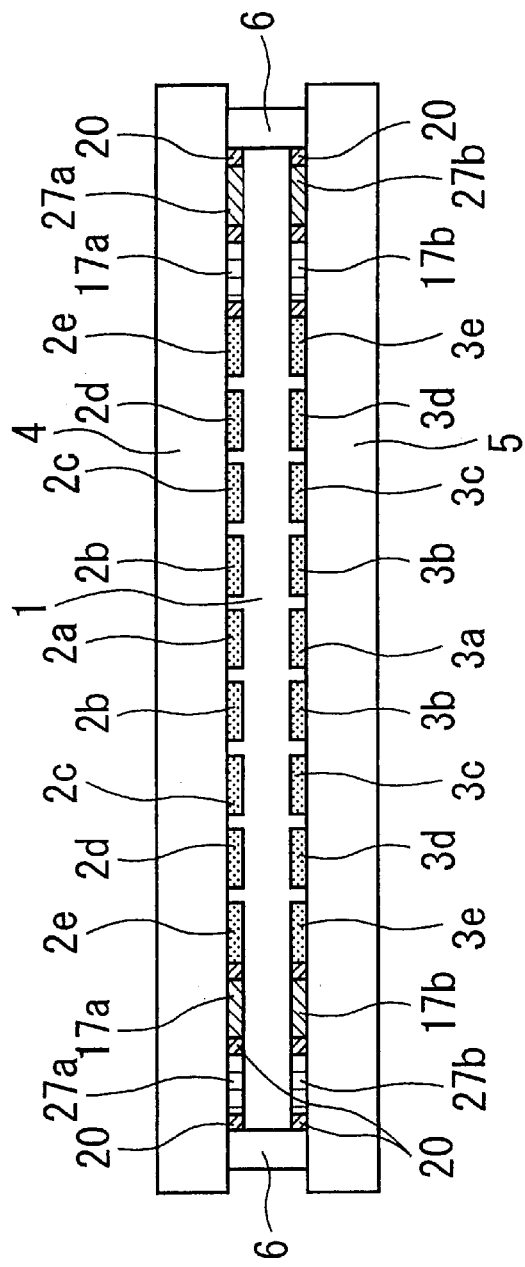
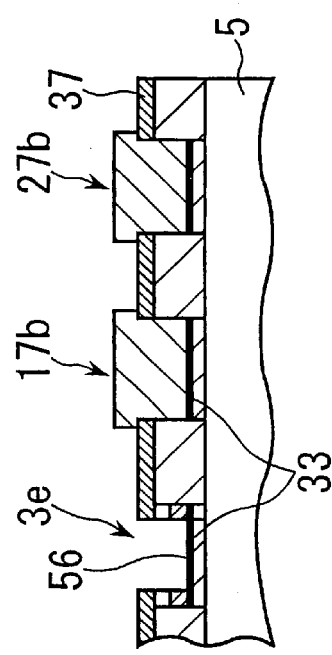

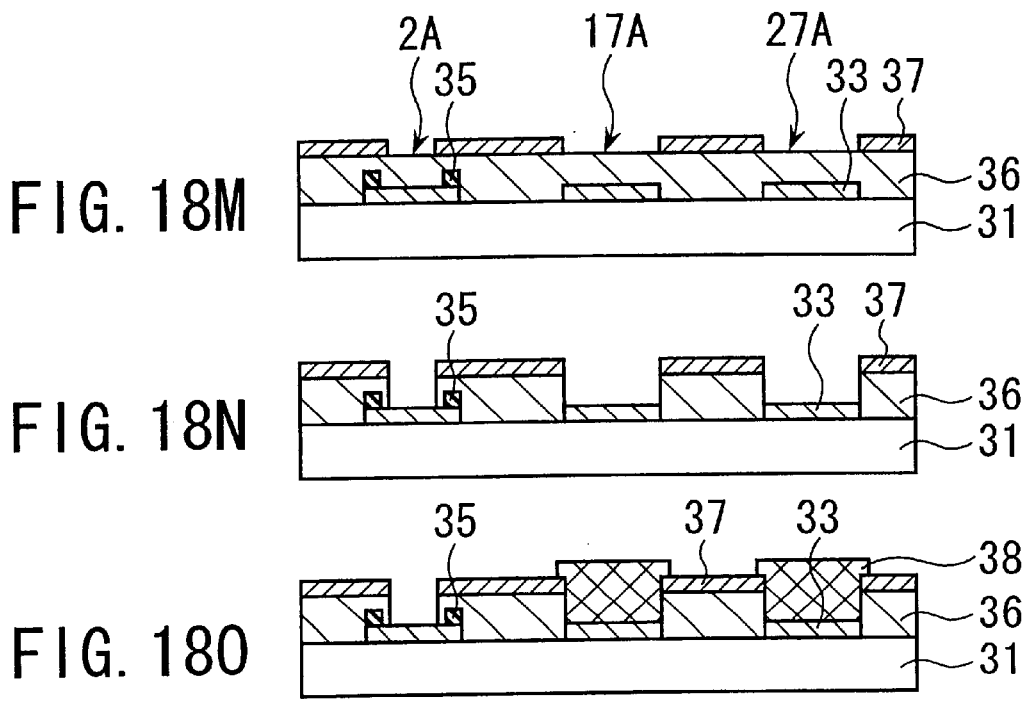
FIG. 18M
FIG. 18N
FIG. 18O
FIG. 19
In/Sn=8.9  COMPARATIVE EXAMPLE 3
22°C, DEPOSITION
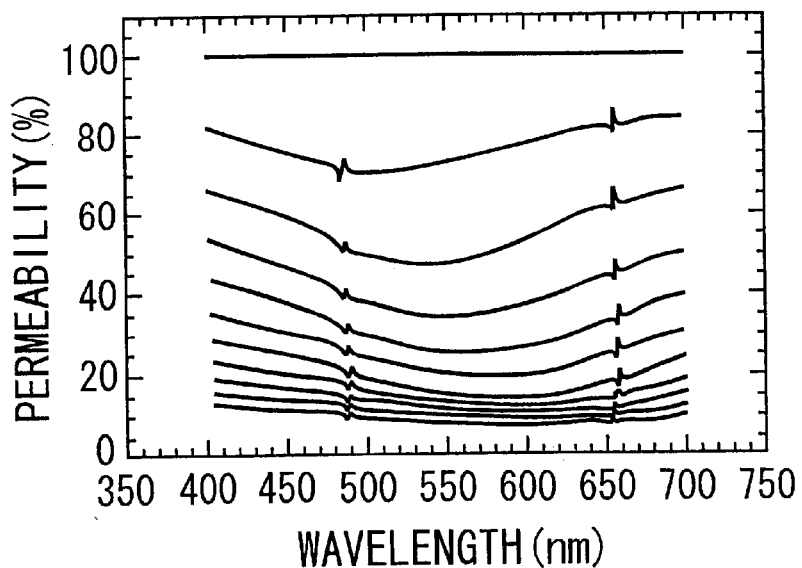

In/Sn=7.5  COMPARATIVE EXAMPLE 4

22°C, DEPOSITION

In/Sn=6.2  COMPARATIVE EXAMPLE 5

22°C, DEPOSITION

In/Sn=4.2  COMPARATIVE EXAMPLE6
22°C, DEPOSITION

In/Sn=3.0  COMPARATIVE EXAMPLE7
22°C, DEPOSITION

In/Sn=2.0    COMPARATIVE EXAMPLE 8

22°C, DEPOSITION

In/Sn=1.6    COMPARATIVE EXAMPLE 9

22°C, DEPOSITION

In/Sn=1.4 EXAMPLE4

22°C, DEPOSITION

In/Sn=0.54 EXAMPLE5

22°C, DEPOSITION

In/Sn=0.26  EXAMPLE6

22°C, DEPOSITION

In/Sn=0.0  EXAMPLE7

22°C, DEPOSITION

EXAMPLE 8

22°C, DEPOSITION

COMPARATIVE EXAMPLE10 (In/Sn=8.9 ITO)

22°C, DEPOSITION

COMPARATIVE EXAMPLE11 (In/Sn=0.0 TIN OXIDE)

22°C, DEPOSITION

FIG. 38 EXAMPLE 11

OPTICAL DEVICE, A FABRICATION METHOD THEREOF, A DRIVING METHOD THEREOF AND A CAMERA SYSTEM

BACKGROUND OF THE INVENTION

1. Field of the Invention

The present invention concerns an optical device suitable, for example, to display apparatus for conducting display of numericals or characters or X-Y matrix display, as well as an optical filter capable of controlling light transmissivity or light reflectivity in a visible light region (wavelength at 400 to 700 nm), as well as a fabrication method thereof and a driving method thereof.

2. Description of the Related Art

An electrochromic display device (hereinafter simply referred to as "ECD") employed so far in display apparatus such as digital watches is a non-light emission type display device which conducts display by reflection light or transmission light as a light control device by electrochemical operation, so that it has a merit giving less feeling of fatigue even in long time observation, as well as a merit that it requires relatively low driving voltage and less consumption power.

For instance, as disclosed in Japanese Published Patent Application No. Sho 59-24879, a liquid type ECD using organic molecule type viologen molecule derivatives that reversibly form states of coloration/color extinction as the electrochromic material (EC material) has been known. However, ECDs using the viologen molecule derivatives involve a problem that response speed or degree of light shielding is insufficient. In addition, as a light amount control device, it is necessary that the light transmissivity can be controlled in a visible light region (wavelength at 400 to 700 nm), and no sufficient characteristics can be obtained with the ECD material as described above.

The present inventors have noted on a light control device utilizing deposition/dissolution of a metal salt, instead of ECD, and have found that it can provide more excellent characteristics than the EC material with respect to the response speed and the degree of light shielding.

While various metal salts can be used for such an optical device, those systems using, particularly, deposition/ dissolution of silver particles are excellent in view of optical characteristics. That is, an electrolyte is used as the material for a reversible plating, that is, RED (Reversible Electro-Deposition) in which a solution for the electrolyte shows no absorption spectrum in a visible light region (wavelength at 400 to 700 nm) upon preparation and causes deposition/ solution of silver particles from a silver salt (including silver complex salt) of forming substantial uniform light shielding in the visible light region upon coloration. Further, the silver salt has a possibility of deposition/solution also by control for driving. Meanwhile, a cyan type solution has been used so far as a plating bath regarding deposition of silver particles from a silver salt but, since the cyan type solution is fatally poisonous, it is preferred to use a non-cyan type silver salt in the optical device of the present invention in view of safety for operation environment and discarding of liquid wastes.

Under the situations described above, it is possible to provide a non-light emitting type optical device such as an optical filter which consumes less electric power and which is suitable to a visible light region by the use of a reversible system of depositing/dissolving a metal from a metal salt on a transparent electrode of an optical device, that is, by the use of an RED material as a reversible plating material.

FIGS. 1A and 1B and FIG. 2 show a cell structure of an existent electrochemical light control device described above.

As shown in FIG. 1A and FIG. 2, a pair of transparent glass substrates 4 and 5 are disposed at a predetermined distance as a display window. As shown in FIG. 1A, working electrodes 2 and 3 each comprising an indium tin oxide (ITO) film obtained by doping tin to indium oxide are opposed to each other on the inner surfaces of the substrates 4 and 5, respectively, and an electrolyte 1 containing a metal salt is sealed between the opposed working electrodes 2 and 3. Counter electrodes 6 are disposed at the circumferential edges between the substrates 4 and 5 and function also as spacers, by which the sealed electrolyte 1 is sealed between the substrates 4 and 5.

In the optical device described above, when a DC driving voltage is applied for a predetermined period of time, as shown in FIG. 1B, between the counter electrode 7 as the positive electrode and the working electrodes 2 and 3 as the negative electrode, metal ions contained in the electrolyte take place the oxidation/reduction reaction at the negative electrode as shown by the following formula (1):

$$M^{n+} + ne^- \rightarrow M \quad (1) \quad (n: \text{natural number})$$

and the working electrodes 2 and 3, which function as the negative electrode, change from transparent to colored states by deposited metal particles. FIG. 1B is a conceptional view illustrating the electrochemical mechanism in this reaction.

When the foregoing process is explained specifically to a case of using a silver salt solution as the electrolyte 1, a silver plate is used for the counter electrodes 7 and the silver salt solution is formed, for example, by dissolving silver bromide into dimethylsulfoxide (DMSO). As shown in FIG. 1B when a DC driving voltage is applied for a predetermined period of time between the counter electrode 7 as the positive electrode and the working electrodes 2 and 3 as the negative electrode, oxidation/reduction reaction is taken place for silver ions at the negative electrode as shown by the following equation (2):

$$Ag^+ + e^- \rightarrow Ag \quad (2)$$

and the working electrodes 2 and 3, which function as the negative electrode change from transparent to colored states by deposited Ag particles.

When the metal particles are deposited on the working electrodes 2 and 3 as described above, a specified reflection color with the deposited metal particles is observed through the display window. The filter effect due to the coloration, namely, the transmissivity for the visible light (or density of coloration) changes depending on the level of voltage or the application time thereof. Accordingly, the cell can function as a variable transmissivity display device or an optical filter by controlling the factors.

On the other hand, in a state where the cell is in the colored state, when a DC voltage is applied in the opposite direction between the counter electrode 7 and the working electrodes 2 and 3, the working electrodes 2 and 3 on which the metal particles are deposited now act as the positive electrode to take place a reaction of the following formula (3):

$$M \rightarrow M^{n+} + ne^- \quad (3)$$

and the metal particles deposited on the working electrodes 2 and 3 are restored from the colored state to the transparent state.

This is to be explained again to a case of using a silver salt solution for the electrolyte 1. When a DC voltage is applied in the direction opposite to the above between the counter electrode 7 and the working electrodes 2 and 3 in a state where the cell is in the colored state, the working electrodes 2 and 3 on which Ag particles are deposited now act as the positive electrode to take place the reaction of the following formula (4):

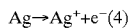

$$Ag \rightarrow Ag^+ + e^- \quad (4)$$

and Ag particles deposited on the working electrodes 2 and 3 are restored from the colored state to the transparent state.

FIG. 3 and FIG. 4 show another electrochemical light control device of the related art.

In this example, as shown in the cross sectional view of FIG. 3, working electrodes 8a, 8b, 8c, 8d, 8e and 9a, 9b, 9c, 9d, 9e each comprising a pair of ITO films are opposed to each other on the inner surfaces of a pair of transparent glass substrates 11 and 12 constituting a cell. Counter electrodes 7a, 7b each comprising a silver plate are disposed to the outer circumference of the outer working electrodes 8e and 9e. The substrates 11 and 12 are kept and sealed at a predetermined distance by a spacer 13 and an electrolyte 1 is sealed between them.

As shown in a plan view of FIG. 4, the working electrodes 8a–8e and 9a–9e, and the counter electrodes 7a and 7b are planer electrodes formed in a concentric pattern. Each of the electrodes paired as 8a with 9a, 8b with 9b, 8c with 9c, 8d with 9d, 8e with 9e and 7a with 7b, respectively, are connected to driving power sources 14a, 14b, 14c, 14d, 14e and 14f by way of wirings 15a, 15b, 15c, 15d, 15e and 15f, respectively, each comprising fine chromium wires.

In this constitution, metal particles can be deposited from the electrolyte 1 on each of the electrodes as the negative electrode and colored by applying a predetermined potential (V1, V2, V3, V4 and V5, V6 being a standard potential relative to the counter electrodes 7a and 7b) to each of the opposing pair of working electrodes 8a and 9a, 8b and 9b, 8c and 9c, 8d and 9d, 8e and 9e respectively. The filter effect by the coloration, namely, the transmissivity for the visible light (or density of coloration) changes with the level of the voltage or the application time thereof.

If V1=V2=V3=V4=V5, the cell can be colored uniformly over the entire region and the degree of density can be changed uniformly in accordance with the voltage or the application time thereof. Further, if it is defined as |V1|>|V2|>|V3>|V4|>|V5|, the color density decreases from the central portion to the periphery (that is, transmissivity is increased). On the other hand, if it is defined as |V1|<|V2|<|V3|<|V4|<|V5|, the transmissivity is decreased from the central portion to the periphery. The constitution is useful as an optical diaphragm for use in CCD (Charge Coupled Device) such as of a television camera and since the size of the device can be reduced, it can sufficiently cope with increase for the integration degree of CCD.

Then, the problems in the existent electrochemical light control devices described above are to be explained.
(1) Effect of Reaction of the Residue of Deposited Metal and Light Shielding Material on the Working Electrode In the existent electrochemical light control devices, a black resist of a black color is often coated to shield light to a portion other than the effective region for controlling light effectively at the portion of the working electrode.

That is, after forming working electrodes, counter electrodes and, if necessary, reference electrodes on a substrate such as of glass by the same fabrication method as in semiconductor manufacturing processes, a light sensitive black resist is coated by spin coating or like other means, and conducting exposure and development using a mask having a predetermined pattern for peeling the portion for the working electrode, the counter electrode and the reference electrode to obtain a desired pattern in which the black resist of the electrode portion is peeled.

When an electrolyte prepared by dissolving a silver salt to a mixed solution of DMSO/AN (dimethylsulfoxide/acetonitrile) is used for example, a resist material mainly comprising propylene glycol monomethyl ether is used such that the black resist is not dissolved in the electrolyte. In the black resist, light shielding die or a pigment is generally incorporated in the matrix material as described above to obtain a desired light shielding property.

However, after the step as described above, when deposition/dissolution of a metal is repeated on the working electrode, uneven deposition occurs to the electrolyzed metal on the working electrode or the electrolyte metal on the surface is not dissolved completely (undissolved deposit) even if the electrode is sufficiently polarized to the oxidation state, probably because of the effect of the black resist residue remaining on the surface of the working electrode.

In such a situation, the light shielding is not sufficient or the brightness of a picture element cannot be ensured sufficiently upon transparent state to deteriorate the device characteristics.

Further, the counter electrode and/or the reference electrode (third electrode) disposed for monitoring/controlling the potential of the working electrode and/or the counter electrode may sometimes be constituted with a material more noble than the material of a metal contained in the electrolyte (lower ionization tendency). For example, in a case of using an electrolyte containing silver, the counter electrode and/or the reference electrode is sometimes constituted with platinum, palladium or gold which is more noble than silver. This is because it is stable in the electrolyte and the metal (silver) can be deposited/dissolved smoothly on the electrode, particularly, in a case of the counter electrode.

In such a case, portions other than the counter electrode and/or the reference electrode are previously covered with a photoresist and platinum or the like is formed by a gas phase growing method such as a physical vapor deposition method. In this case, the melting point, particularly, of platinum is as high as 1769° C. and the temperature in the vapor deposition vessel rises to 200° C. or higher by which the resist is cured and the resist is sometimes cracked by the heat. Accordingly, in the subsequent lift-off operation, the resist may remain as the residue, particularly, on the working electrode or particles of platinum intruding through the cracked portion of the resist may be adhered on the surface of the working electrode not removably. In such a situation, when the optical device having the optical element is driven, undesired effects are also given on the optical characteristics of the element such as electrodeposited material remains undissolved on the working electrode.

Further, when the optical device is driven and, particularly, the deposition material is deposited/dissolved, particularly, on the working electrode, if a high overvoltage is applied to the working electrode, a considerably high voltage is applied to the black resist between the lead electrode for the working electrode and the electrolyte to cause bubbles by deposition of the black resist. Therefore, the insulation withstand voltage is lowered, which further induces bubbling and reaction between lead electrode and the electrolyte. In this case, stable operation of the optical device is no more possible.

As described above, in a case where the portions of each of the electrodes other than the effective region are shielded with a light shielding material such as a black resist in the electrochemical optical element, disadvantages may sometimes occur at the lead electrode portion. In addition, when the electrochemical optical element is fabricated, the photoresist used for fabrication or the portion of the black resist to be removed may not sometimes be removed completely to leave residues and bring about a disadvantage such as undissolved electrodeposition film.

(2) Specific Light Absorption of the Electrodeposited Film on the Working Electrode In the existent electrochemical light control element described above, tin-doped indium oxide is used for the working electrode. In this case, the electrodeposited film sometimes exhibits a specific light absorption. For example, most of commercially available ITO has In/Sn element ratio (or ratio for the number of atoms) of about 4(8:2) to 9(9:1). When such material is used for the working electrode and a silver film is deposited on the working electrode at a room temperature, the silver film shows light absorption at 500 to 600 nm and is colored red. A disadvantage is caused in such a situation that the photographed image upon light control is pigmented to the color of the deposition film.

(3) Overpotential at Working Electrode

High resistance of the working electrode causes deviation of the potential at the electrode from an equilibrium potential (that is polarization) upon driving the device.

Then, when the working electrode is overpotential, various side reactions, such as a decomposition of the electrolyte, may occur. Particularly, in using an electrolyte which contains a silver salt and an iodic salt as a supporting salt, yellowing of the electrolyte is observed perhaps because the iodic ions are oxidized into molecules.

(4) Life of the Counter Electrode

In the existent electrochemical light control devices, the counter electrodes 6, 7a and 7b consisted of the same kind of material as the metal contained in the electrolyte 1. For example, when a pure silver metal plate is used as it is in a case where the electrolyte 1 comprises a silver salt solution, smooth electrochemical reaction can be conducted mainly for silver on the counter electrode. However, there is a problem that the cost for the material of the counter electrode increases. Further, as the life of the optical element increases, inactivated metal particles deposited on the counter electrode diffuse and suspend in the electrolyte to contaminate the inside of the element and which may lead to a problem of lowering the transmissivity in the transparent state of the element or causing short-circuit between the electrodes.

For example, in the device shown in FIG. 3 and FIG. 4, upon color extinction of the working electrode, material mainly containing a metal is deposited on the counter electrodes 7a and 7b as the negative electrode. In this case, since lines of electric force of the electric field are concentrated to the angled portion of the electrode as shown in FIG. 5 (illustrated as 7b in the drawing), the material is grown on the portion into relatively large particles and deposited. Different from thin-film deposition material B at other portions, the particulate deposition material A is not easily dissolved upon coloration of the working electrode and, as shown in the figure, detached in an inactivated particulate state as it is and dispersed and suspended in the electrolyte 1. When such deposition material of inactivated particles is increased in the electrolyte, it lowers the transparency of the device upon color extinction of the working electrode and such particles also cause short-circuit between the electrodes.

In view of the above, the present inventors have studied, as a countermeasure, a method of forming a layer containing at least one kind of conductive particles such as carbon material on a current collector instead of using, for example, a metal plate such as a pure metal plate as it is for the material of the counter electrode and have proposed an optical device, for example, an electrochemical light control device, as well as a fabrication method thereof as Japanese Patent Application Hei 10-9458 (filed on Jan. 21, 1998 in Japan).

However, while the counter electrode can be constituted with a relatively inexpensive material and it has an excellent performance that particles of inactivated deposition material are less formed on the counter electrode according to the patent application (hereinafter referred to as a prior application), it has been found to still have a room for an improvement.

That is, when the carbon material is used as the counter electrode, when the device is driven and dissolution/deposition reaction is repeated a number of cycles at the transparent electrode and the counter electrode, adhesion between the current collector as the underlying electrode and the carbon material is lowered to sometimes detach the layer of the carbon material from the current collector. The current collector means herein an underlying electrode that supplies charges to the carbon material but the underlying electrode itself does not electrochemically react with the electrolyte because it is covered with the carbon material.

When the conductive particle layer is detached, the current collector is in direct contact with the electrolyte not by way of the layer of the carbon material and has a direct concern to the reaction with the electrolyte. In such a case, interface polarization between the current collector and the electrolyte increases remarkably in an underlying electrode material that transfer of charges from the current collector to the electrolyte is not taken place smoothly.

Further, in a case of the current collector consisting of a material that can transfer charges to the electrolyte relatively smoothly, deposition of a metal or a compound containing the metal on the current collector, or side reaction such as decomposition of the electrolyte component may take place. If the deposition material has a particularly insulative property, subsequent charge transfer is not conducted smoothly and, as a result, polarization increases extremely. Such a great polarization requires large power consumption and, in addition, promotes side reactions thereby resulting in a problem such as shortening of the device life.

(5) Temperature Dependence of the Transmissivity Control

In the existent electrochemical optical device, the deposition form of the deposition material on the working electrode differs depending on the working temperature and, particularly, the deposition rate of the deposition material containing a metal tends to be affected by temperature. That is, the deposition rate is faster at a higher temperature than at a lower temperature, and the thickness of the deposition film is larger as a temperature is higher at an identical current density even within an identical time.

In the optical device described above, since the degree of light screening is changed by the thickness of the deposition film, the desired light shielding degree to be obtained depends on the temperature, current density and deposition time. When comparison is made at an identical deposition time, it has been a problem that the light shielding degree of the optical device greatly is affected by temperature and current density and is hard to operate stably.

(6) Change of Transmissivity

In the existent electrochemical optical device, when a deposition material containing a metal such as silver is deposited (electrodeposition) on the surface of the working electrode and then left as it is while short circuiting the external circuit, since the electrodeposited material is dissolved again into the electrolyte to reduce the thickness of the deposition film, the transmissivity was increased. Further, even when the external circuit is opened as it is after depositing the film (electrodeposition), the electrodeposited material is also dissolved again in the electrolyte although the dissolution rate is somewhat slower to gradually increase the transmissivity. If such phenomenon should occur, no stable light control can be attained, for example, in a CCD camera to bring about a disadvantage that the image is blurred.

(7) Peeling of Electrodeposition Film on the Working Electrode

In the existent electrochemical light control device described above, deposition material contained in the electrolyte is electrodeposited on the surface of a working electrode comprising ITO if the amount of electric current supplied to the electrode is increased and the thickness of the deposition film increases, the deposited film is sometimes peeled from the surface of the working electrode perhaps because of the increase in the stresses caused to the deposition film. This film peeling was remarkable, particularly, in a case where the transparent conductive film constituting the working electrode has a layer of tin oxide formed on tin oxide or ITO.

If such film peeling should occur, the peeling portion can no more shield the light and light shielding is decreased as a whole and, depending on the case, no sufficient light sealing can be attained in a CCD camera and brings about a problem of disadvantage such as blurred images.

Further, if such peeling of deposition film should occur, when the working electrode is polarized to the oxidation state to dissolve the electrodeposition material, it sometimes results in undissolved deposit, since current cannot be supplied sufficiently over the entire film.

(8) Limit for the Size Reduction of Mechanical Diaphragm

On the other hand, for the light amount control of CCD (charge Coupled Device) cameras, mechanical diaphragm for controlling the amount of light has been used so far. However, along with the reduction of the size in CCD cameras, as the range for the diaphragm is decreased, the peripheral machinery constitution for driving the same is rather enlarged in the scale in the existent mechanical diaphragm, which imposes a limit as the reduction of the size for the entire system. Further, as the size of CCD is getting smaller, various problems have occurred such as blurred images under the effect of light diffraction in the mechanical diaphragm described above.

In view of the above, it may be considered as a means for the diaphragm in a camera system to cope with problems for the size reduction as the entire system and of blurred images by controlling the light amount using the electrochemically light control device. However, the existent electrochemical light control device described above involves the problems of specific light absorption of the electrodeposition material and undissolved deposit of the electrodeposition material to lower the light shielding and increase the transmissivity, which forms a bar in a case of using the electrochemical optical device to the camera system.

OBJECT AND SUMMARY OF THE INVENTION

The present invention has been accomplished in view of the foregoing various situations described above and a first object of the present invention is to provide an electrochemical light control device utilizing deposition/dissolution reaction of a material mainly containing a metal, which is free from problems due to the presence of a light shielding material in a case having a shielding structure with the light shielding material such as a black resist, enables stable operation and can attain a long life of the device.

Further, it is an object thereof to provide a fabrication method capable of obtaining a highly reliable electrochemical optical device without causing disadvantages such as undissolved deposit of the electrodeposition material caused by the residue of the photoresist used for fabrication, or the residue of the material such as the black resist.

Further, it is an object of the present invention to provide a camera system capable of reducing the size and overcoming the problem of blurred images or the like, by solving the problems in the existent electrochemical light control element such as undissolved electrodeposition materials as described above thereby suppressing peeling of the film deposited on the working electrode and suppressing lowering of the light shielding and increase in the transmissivity to enable application to the camera system.

An electrochemical optical element according to the present invention has at least a transparent electrode as a working electrode and a counter electrode and an electrolyte disposed in contact with the working electrode and the counter electrode in which light is controlled electrochemically by controlling an electric field applied to the electrolyte, wherein an insulation film is formed on a lead electrode for at least one of electrodes.

According to the present invention, since the insulation film is formed on the lead electrode, the black resist or the like is formed by way of this insulation film over the lead electrode. Accordingly, a problem caused by the contact of the lead electrode with the black resist or the like, can be overcome. Such an insulation film is formed on at least one of the lead electrodes, and the insulation film is present between the lead electrode and the black resist, so that even when a high overvoltage is applied to the lead electrode, it is applied mainly along the insulation film, so that with the black resist or the like, does not take place an electrochemical reaction by the over voltage and, accordingly, high reliability and long life of the optical element can be obtained.

A fabrication method for an electrochemical optical element according to the present invention resides in a fabrication method for an optical element having at least a transparent electrode as a working electrode and a counter electrode and an electrolyte disposed in contact with the working electrode and the counter electrode in which light is controlled electrochemically by controlling an electric field applied to the electrolyte, wherein at least a portion including the transparent electrode as the working electrode is covered with an insulation film before at least one resist step.

According to the present invention, since at least the portion including the transparent electrode is covered with the insulation film, if any residue of the resist or the like remains on the portion in the subsequent resist step, disadvantage caused to the electrode can be prevented. Particularly, when the insulation film is previously formed on the surface of one of the electrodes in which a deposition material containing a metal is electrodeposited/dissolved, since the light shielding material such as a black resist is not in direct contact with the electrode, disadvantage given to the black resist or the like on the electrode can be prevented. Even if any residue such as of the black resist should remain undesired effects can be suppressed. Subsequently, when the insulation film is removed by the etching or like other means after exposure/development of the black resist, residue of the black resist or the like does not remain on the surface of the electrode and an electrode with no undissolved electrodeposition material can be obtained.

Further, the present invention can overcome also the problem caused by the photoresist used generally for light shielding, in addition to the black resist used generally for patterning. That is, since also the photoresist for the patterning is not in direct contact with the surface of the electrode covered with the insulation film, even if the photoresist is cured and suffers from cracking and vapor deposition products intrude through the cracks in a case where the film of a high melting metal or the like is formed subsequently by way of a gas phase growing method such as physical vapor deposition on other electrodes, residue of such as photoresist does not remain on the surface of the electrode on which the material containing a metal such as silver is deposited thereafter if the insulation film is removed by etching or like other method to obtain an electrode with no undissolved electrodeposition material in the electrolyte.

Further, in a camera system according to the present invention, an electro-optical element having an insulation film formed on the lead electrode for at least one of the electrodes is disposed for controlling the amount of light in an optical path (hereinafter also referred to as a camera system according to the present invention).

According to the present invention, since an optical device having the insulation film formed on the lead electrode for one of the electrodes is used, no undissolved electrodeposition material is formed as described above.

Further, the optical device has an electrode with no decomposition or damage of the light shielding layer such as the black resist and a camera system capable of reducing the size and overcoming the problem such as blurred images can be provided by disposing such an electro-optical element for controlling the amount of light in an optical path.

The camera system according to the present invention can be practiced as an embodiment in which various forms of the electrochemical light control elements according to the present invention described above, are disposed in an optical path for controlling the amount of light.

According to the camera system of the present invention as described above, since the electrochemical optical element capable of controlling the amount of light by the application of an electric field is applied as the optical diaphragm in a CCD camera or the like, it requires no mechanical constitution of a large scale different from existent mechanical diaphragm and, accordingly, it is possible to reduce the size, that is, to a substantially effective range of the optical path, and diffraction can be prevented by controlling the amount of light by the level of the applied electric field, which is thereby capable of effectively preventing blurred images.

A second object of the present invention is to provide an optical device having a working electrode of a relatively reduced resistance and excellent spectral characteristics, and a fabrication method thereof, as well as a camera system capable of attaining the reduction of the scale of the system and preventing blurred images by using the optical device for controlling the amount of light.

That is, the present invention provides an optical device having an electrode formed of an oxide layer in which indium is doped to tin, wherein indium/tin is 1.5 or less by the element ratio (or ratio for the number of atoms) (hereinafter referred to as an optical device of the present invention).

According to the optical device of the present invention, since the oxide layer formed by doping tin to indium so as to be within an appropriate range for the indium/tin element ratio of 1.5 or less as described above (preferably, from 1.5 to 0.5) is used for the electrode, when it is used, for example, as the working electrode, spectral characteristics can be improved, for example, suppression for the coloration of the electrodeposited film and the resistance of the oxide electrode can be decreased.

Further, the present invention also concerns a fabrication method for an optical device having an electrode formed of an oxide layer in which indium is doped to tin (in which indium/tin is 1.5 or less by the element ratio), wherein the oxide layer is formed by a gas phase film forming method (hereinafter referred to as a fabrication method of the present invention).

According to the fabrication method of the present invention, since the oxide layer can be formed to a desired film quality and thickness by changing the target or the discharging condition in one identical vacuum apparatus, for example, by a sputtering or vapor deposition method as the gas phase film forming method, it is possible to provide a fabrication method for an optical device of favorable reproducibility that can provide the same effect as described above.

Further, the present invention concerns a camera system having an optical device disposed in an optical path for controlling the amount of light, the device having an electrode formed of an oxide layer in which indium is doped to tin where indium/tin is 1.5 or less by the element ratio.

According to the camera system of the present invention, since the optical device incorporated therein is excellent in the spectral characteristic and capable of controlling the amount of light by the application of the electric field to the electrolyte, no large scale mechanical constitution is required different from existent mechanical diaphragm and the size can be reduced substantially to an effective range of an optical path, and the amount of light can be controlled by the level of the applied electric field to prevent diffraction and also effectively prevent blurred images.

Further, the present invention concerns an optical device having an electrode, particularly a transparent electrode, formed of a laminate comprising an oxide layer in which indium is doped to tin and a tin oxide layer (hereinafter referred to as an optical device of the present invention).

According to the optical device of the present invention, since the electrode is formed of a laminate comprising an oxide layer in which tin is doped to indium and a tin oxide layer, the spectral characteristics of an electrodeposited film containing a metal, when deposited on the electrode, can be improved by the tin oxide layer and, further, the resistance as the entire electrode can be decreased by reducing the thickness of the oxide layer (for example, to 130 nm or less). As a result, it is possible to suppress polarization of the electrode upon driving of the device.

Further, the present invention provides a fabrication method for the optical device having an electrode formed of a laminate comprising an oxide layer in which tin is doped to indium and a tin oxide layer wherein the tin-doped indium and/or tin oxide layer is formed by a gas phase film forming method (hereinafter referred to as a fabrication method of the present invention).

According to the fabrication method of the present invention, since the tin oxide layer can be formed contiguous with the oxide layer and the tin oxide layer can be formed to a desired film quality and thickness by changing the target or the discharging condition in one identical vacuum apparatus, for example, by a sputtering or vapor deposition method as the gas phase film forming method, it is possible to provide a fabrication method for an optical device of favorable reproducibility that can provide the same effect as described above.

Further, the present invention concerns a camera system in which an optical device is disposed in an optical path for controlling the amount of light, the device having an electrode formed of a laminate comprising an oxide layer in which tin is doped to indium and a tin oxide layer (hereinafter referred to as a camera system of the present invention).

According to the camera system of the present invention, since the optical device incorporated therein is excellent in the spectral characteristic and capable of controlling the amount of light by the application of the electric field to the electrolyte, no large scale mechanical constitution is required different from existent mechanical diaphragms and the size can be reduced substantially to an effective range of the optical path, and the amount of light can be controlled by the level of the applied electric field to prevent diffraction and also effectively prevent blurred images.

A third object of the present invention is to provide an optical device in which adhesion of a layer comprising conductive particles such as a carbon material is improved in the counter electrode to prevent peeling of the layer described above and the potential of the counter electrode is stabilized to enable stable driving and which can lower the electric power consumption and make the device life longer, and a fabrication method thereof.

A further object of the present invention is to provide an optical device such as an electrochemical light control element in which the counter electrode of the electrochemical optical device utilizing deposition/dissolution reactions of materials such as metals can be constituted with a relatively inexpensive material and particulate deposits such as of an inactivated metal are less formed on the counter electrode, as well as the fabrication method thereof.

That is, the present invention concerns an optical device comprising a working electrode, a counter electrode and an electrolyte disposed in contact with both of the electrodes, and light is electrochemically controlled by an electric field applied to the electrolyte, wherein the counter electrode comprises a first layer comprising conductive particles, a second layer comprising a polymeric layer and a third layer comprising a current collector, and the second layer is formed between the first layer and the third layer (hereinafter referred to as the optical device of the present invention).

According to the optical device of the present invention, the polymeric layer as the second layer can bond the first layer comprising the conductive particles and the third layer comprising the underlying current collector to improve the adhesion. As a result, since this can stabilize the potential of the counter electrode and can delay occurrence of peeling between the first layer comprising the conductive particles and the third layer comprising the underlying current collector and accompanying increase of the polarization, it is possible to suppress increase of the consumption power and side reaction with the electrolyte for a long period of time to make the life of the optical device longer.

Further, since the first layer comprises the conductive particles, when a mixture comprising them in admixture with a binder is printed or coated to form the first layer, it can be easily set to a predetermined shape and the counter electrode can be formed to a shape with no substantially angle corner, so that localized concentration of electric field on the counter electrode can be moderated and deposition of inactivated particles including metal on the counter electrode can be suppressed or prevented. As a result, it is possible to prevent the particles of inactivated deposition material from diffusing or suspending in the electrolyte to lower the transparency of the element, or from short-circuiting the electrodes.

Further, the present invention provides a fabrication method for an optical device having a working electrode and a counter electrode and an electrolyte disposed in contact with both of the electrodes and light is controlled electrochemically by an electric field applied to the electrolyte, wherein the method comprises forming a second layer comprising a polymeric layer on a third layer comprising a current collector by a electrochemical polymerizing process, and forming a first layer comprising conductive particles on the second layer (hereinafter referred to as a fabrication method of the present invention).

According to the fabrication method of the present invention, since the second layer, in particular, of the optical device according to the present invention is formed by the electrochemical polymerization method, a dense and homogeneous polymeric layer can be formed and since the first layer is formed as a coating layer or the like comprising the conductive particles, the optical device according to the present invention having the foregoing function and effect can be fabricated with favorable reproducibility.

Further, the present invention concerns a camera system in which an optical device is disposed in an optical path for controlling the amount of light, wherein the device has a counter electrode comprising a first layer including conductive particles, a second layer comprising a polymeric layer and a third layer comprising a current collector, and the second layer is formed between the first layer and the third layer (hereafter referred to as a camera system of the present invention).

According to the camera system of the present invention, since the optical device incorporated therein is excellent described above, it is possible to suppress increase of the consumption power and make the life of the camera system longer. And since no large-scale mechanical constitution is required different from existent mechanical diaphragms, the size can be reduced substantially to an effective range of the optical path. Further, the amount of light can be controlled by the level of the applied electric field to prevent diffraction and also effectively prevent blurred images.

Further, a fourth object of the present invention is to provide, in an electrochemical optical device utilizing deposition/dissolution of a material including a metal for controlling light, an optical device capable of obtaining a stable light shielding degree, a driving method thereof, as well as a camera system capable of reducing the size of the system and preventing blurred images by applying the optical device for controlling the amount of light.

That is, the optical device according to the present invention have a working electrode, a counter electrode and an electrolyte disposed in contact with both of the electrodes and light is controlled electrochemically by an electric field applied to the electrolyte, wherein the optical device further comprises a control device or unit for controlling a driving current in accordance with a temperature of the electrolyte in the optical device.

Further, the driving method according to the present invention comprises controlling the driving current in accordance with the temperature of the electrolyte in the optical device.

Further, a camera system according to the present invention has the optical device as described above disposed in an optical path for controlling the amount of light.

According to the optical device and the driving method of the present invention, since the driving current is controlled in accordance with the temperature of the electrolyte in the optical device for electrochemically controlling the light, an averaged transmissivity, that is, a stable degree of light shielding can be attained irrespective of the temperature of the electrolyte.

Further, a fifth object of the present invention is to provide, in an electrochemical optical device utilizing deposition/dissolution of a material such as a metal for controlling light, an optical device improved so as to effectively suppress increase of the transmissivity (or decrease of the reflectivity) caused by electrodeposition of a deposition material containing a metal and subsequent dissolution of the electrodeposited material into the electrolyte again and prevent disadvantage such as blurred images, a driving method thereof, as well as a camera system capable of reducing the size of the system and preventing blurred images by using the optical device for controlling the amount of light.

That is, the optical device according to the present invention comprises a working electrode, a counter electrode and an electrolyte disposed in contact with both of the electrodes in which light is controlled electrochemically, wherein a current supply means is disposed for supplementing a dissolved portion of a predetermined electrodeposited material after electrodeposition of the material to the working electrode.

Further, the driving method according to the present invention for an optical device having a working electrode, a counter electrode and an electrolyte disposed in contact with both of the electrodes, wherein light is controlled electrochemically, comprises the steps of electrodepositing a material on the working electrode and then supplying an electric current for supplementing a dissolved portion of the electrodeposition material.

Further, according to the camera system of the present invention, the optical device is disposed in the optical path for controlling the amount of light.

According to the optical device of the present invention and the driving method thereof, in the driving device for electrochemically controlling the light, since a material containing the predetermined material, for example, a material containing silver is electrodeposited on the working electrode and then an electric current is supplied for supplementing the dissolved portion of the electrodeposition material, so that reduction for the thickness of the electrodeposited film due to spontaneous dissolution into the electrolyte and an accompanying change of the optical characteristics such as light transmissivity can be suppressed effectively and, as a result, sufficient light shielding can be attained, for example, in a CCD camera.

Further, according to the camera system of the present invention, since the optical device attached thereto can control the amount of light electrochemically by the application of the electric field to the electrolyte, no large scaled mechanical constitution is required different from existent mechanical diaphragms and it can be reduced to a size for the substantially effective range of the optical path, and the amount of light is controlled by the level of the applied electric field to prevent diffraction and also effectively prevent blurred images.

Further, a sixth object of the present invention is to provide an electrochemical optical device utilizing deposition/dissolution of a material including a metal for light control, in which an optical device capable of suppressing the deposited film of the material from peeling from the working electrode, suppressing lowering of the light shielding and increase of the transmissivity, without causing disadvantage such as blurred images in a cCD camera and not resulting in undissolved electrodeposition material, and a driving method thereof, as well as, a camera system capable of reducing the size and with no blurred images.

That is, the present invention provide an optical device having a working electrode, a counter electrode and an electrolyte disposed in contact with both of the electrodes and light is electrochemically controlled by an electric field applied to the electrolyte, wherein the optical device comprises means for polarizing the working electrode in the direction of oxidation before electrodeposition of a material containing a metal on the working electrode (hereinafter referred to as an optical device of the present invention).

According to the optical device of the present invention, since the electrodeposition is conducted after polarization of the working electrode to the oxidation direction, the state of the surface of the working electrode is stabilized so as to be easily electrodeposited and, subsequently, the material containing a metal is electrodeposited on the working electrode from the electrolyte, so that peeling of the electrodeposited film can be prevented. As a result, an optical device of excellent characteristics with suppressed lowering of the light shielding and increase of the transmissivity can be attained and it is possible to provide an optical filter not causing blurred images and undissolved electrodeposition material also when it is applied to a CCD camera or the like.

Further, the present invention concerns a driving method of an optical device having a working electrode, a counter electrode and an electrolyte disposed in contact with both of the electrodes in which light is controlled electrochemically by an electric field applied to the electrolyte, wherein the working electrode is polarized in the oxidation direction by a polarization means before electrodepositing the material including a metal on the working electrode from the electrolyte (hereinafter referred to as a driving method of the present invention).

According to the driving method of the present invention, since the working electrode is previously polarized to the oxidation direction before electrodeposition of the material on the working electrode, the surface state of the working electrode can be stabilized to provide the same effect as that for the optical device according to the present invention described above.

Further, the present invention also provides a camera system (hereinafter referred to as a camera system of the present invention) in which the optical device according to the present invention is disposed for controlling the amount of light in an optical path.

According to the camera system of the present invention, since the optical device capable of controlling the amount of light by the application of the electric field to the electrolyte is used for the diaphragm such as of a CCD camera, no large scale mechanical constitution is required different from the existent mechanical diaphragm and the size can be reduced to substantially an effective range of optical path, and the amount of light can be controlled by the level of the applied electric field to prevent diffraction and also effectively prevent blurred images.

Referring to the transparency in the present invention, the transmissivity of the working electrodes is generally 70% or more in a visible light region (or aimed intended wavelength region). Further, the optical device comprises a transparent electrode as the working electrode and have a counter electrode paired with the working electrode in the present invention. It may have a structure further comprising an appropriate reference electrode.

BRIEF DESCRIPTION OF THE DRAWINGS

FIGS. 7A and 7B illustrate the constitution of an electrochemical cell section of an optical filter according to a third embodiment of the present invention in which FIG. 7A is a schematic cross sectional view and FIG. 7B is an enlarged cross sectional view shown for a portion;

FIG. 18M through FIG. 18O are schematic views illustrating further steps of the fabrication method in Example 4 through Example 7 successively;

FIG. 19 is a graph showing the spectral characteristics upon electrodeposition on a working electrode in Comparative Example 3;

FIG. 24 is a graph showing the spectral characteristics upon electrodeposition on a working electrode in Comparative Example 9;

DETAILED DESCRIPTION OF THE PREFERRED EMBODIMENTS

Figure 1A:
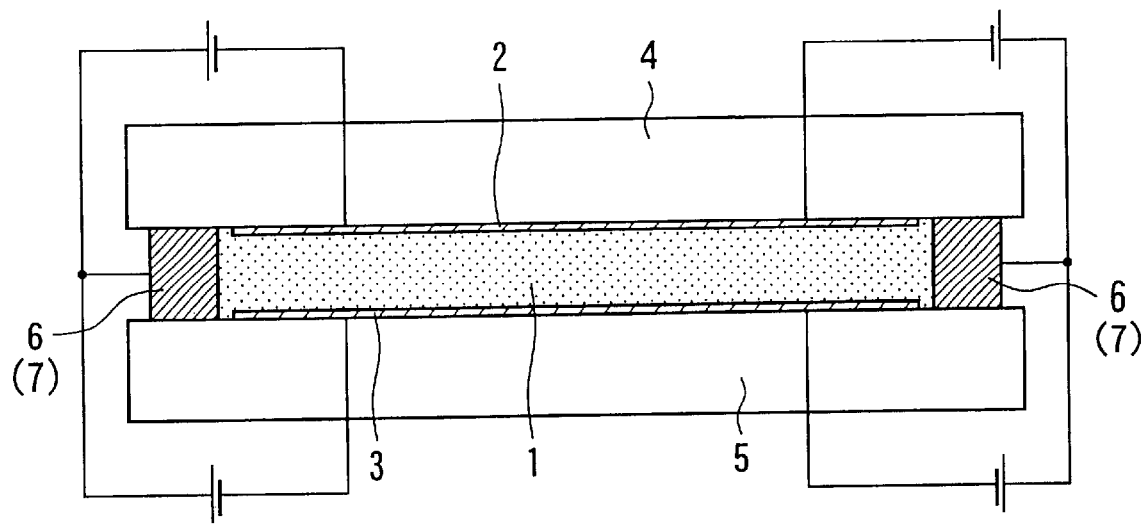
FIG. 1A and FIG. 1B show a cross sectional view for the constitution of an existent optical device and a conceptional view illustrating the operation principle thereof.

The present invention is to be explained further for preferred embodiments, and preferred concrete examples are to be explained with reference to the drawings. The present invention is not restricted by the following illustrating explanations and examples.

<First Embodiment>

An optical device and a fabrication method for the first embodiment of the present invention can be applied suitably to an optical device comprising a working electrode, a counter electrode and an electrolyte disposed in contact with both of the electrodes, wherein the working electrode has a transmissivity of 70% or more in a visible light region, a material including a metal is electrodeposited on the working electrode and thereby light is electrochemically controlled by an electric field to the electrolyte.

In an optical device for a first embodiment of the present invention, at least a lead electrode for an electrode, a particularly transparent electrode is covered with a cover layer containing at least one layer of insulation material. Further, a fabrication method of the optical device is preferably conducted such that at least the entire surface of the transparent electrode is covered with a cover layer containing at least one layer of an insulation material and the cover layer is removed only from the main surface of each of the electrodes so as to cover the lead electrode portion before assembling as an optical device (light control cell).

That is, in the optical device according to the present invention, the steps can be proceeded with no direct contact of a photoresist and/or a black resist with the surface of the electrode by previously forming a cover layer containing an insulation layer, for example, an insulation layer such as of silicon dioxide on the surface of the transparent electrode, the counter electrode portion or the reference electrode portion and on the lead electrode for the electrode before coating the photoresist and/or the black resist, so that an electrode with no residue of the photoresist and/or the black resist can be obtained by removing the insulation layer by an etching or like other method.

Then, if electrodeposition/dissolution of a material containing a metal are repeated on the electrode surface in the electrolyte uneven deposition or undissolved deposit of the material does not occur, particularly, on the transparent electrode, so that an optical device having excellent spectral characteristics can be obtained.

The cover layer may be a single layer (one layer of an insulation film) or may comprise a plurality of layers, but it has at least one layer of insulation film. Then, even when a high overvoltage is applied to the lead electrode for the electrode, voltage is applied almost along the insulation film, and disadvantages such as a reaction of the black resist or the like coated thereon with the electrolyte, does not occur.

In a case where no sufficient electric protection is obtained only by one kind of insulation film for the light shielding layer, a different kind of layer may further be disposed thereon.

The material for constituting the cover layer is desirably chemically stable. Specifically, as the insulation film constituting the cover layer, inorganic materials such as silicon dioxide, silicon nitride or amorphous silicon, as well as various organic polymers can be adopted. Inorganic materials are more preferably used than organic polymers in view of the subsequent cleanness of the surface of the electrodes. Further, when a different kind of layer is further disposed, different kind of species can be selected from not only the insulative materials described above but also non-insulative materials, such as metals, metal oxides or semiconductors. However, when the different kind of conductor or semiconductor layer is disposed, it should always be formed by way of an insulation layer on each electrode and the lead electrode thereof so as not to be in electrical contact with the electrodes.

Various methods can be adopted for forming the cover layer. For example, various gas phase film forming methods are preferably used, such as a sputtering method of using a desired metal or a compound thereof as a target and applying an AC voltage, a DC voltage or a DC voltage combined with an AC voltage under a reduced pressure or a an atmospheric pressure, thereby forming a thin film of the metal or the compound thereof, a physical vapor deposition method of melting and vaporizing a desired metal, a compound thereof or the other material, thereby forming a film, a chemical vapor deposition method (CVD) of vaporizing a gas containing a desired material and applying an AC voltage, a DC voltage or a DC voltage combined with an AC voltage to chemically activate the same, thereby forming a film containing the desired material to an object to be processed, or an metal organic chemical vapor deposition method (MOCVD) of using a metal organic gas as a vapor gas and a molecular beam epitaxy (MBE) method or the like. For the vapor deposition method, a method of vaporizing a metal, a metal compound or the like by ohmic heating under high vacuum or a method of vaporization by irradiating an electron beam to a target material (EB vapor deposition) can be used. The advantageous effects of the present invention can be obtained effectively by any of the methods.

Particularly, there can be suitably used the sputtering method for forming silicon dioxide films, and the CVD method using a silane gas such as monosilane or disilane as a monomer gas and nitrogen or argon as a carrier gas for forming silicon nitride or amorphous silicon films, since films can be formed stably at a relatively low temperature.

Further, in the case of using the plating method for forming the cover layer, either electrolytic plating or electroless plating may be adopted. And a sol-gel method can also be adopted.

Further, as the coating or printing method, spin coating or screen printing may be adopted.

Among the constituents for the cover layer, the different kind of layer may be removed not only for the electrode surface but also entirely by the etching method. That is, the different kind of layer formed further to the insulation layer in the cover layer may be finally removed not only for the electrode surface but also entirely.

The optical device according to the present invention can be constituted as an optical device comprising a pair of transparent or semitransparent substrates opposed to each other, a transparent electrode disposed as a working electrode at least to one of the opposing surfaces of the pair of transparent or semitransparent substrates, a counter electrode and an electrolyte disposed in contact with both of the transparent electrode and the counter electrode between the transparent or semitransparent substrates, and such an optical device can be driven preferably.

A preferred embodiment of the present invention is to be described more in detail with reference to the drawings.

An embodiment of applying the present invention to the same optical filter as explained in FIG. 3 and FIG. 4, (electrochemical light control element) is to be explained with reference to FIG. 6.

Figure 6:
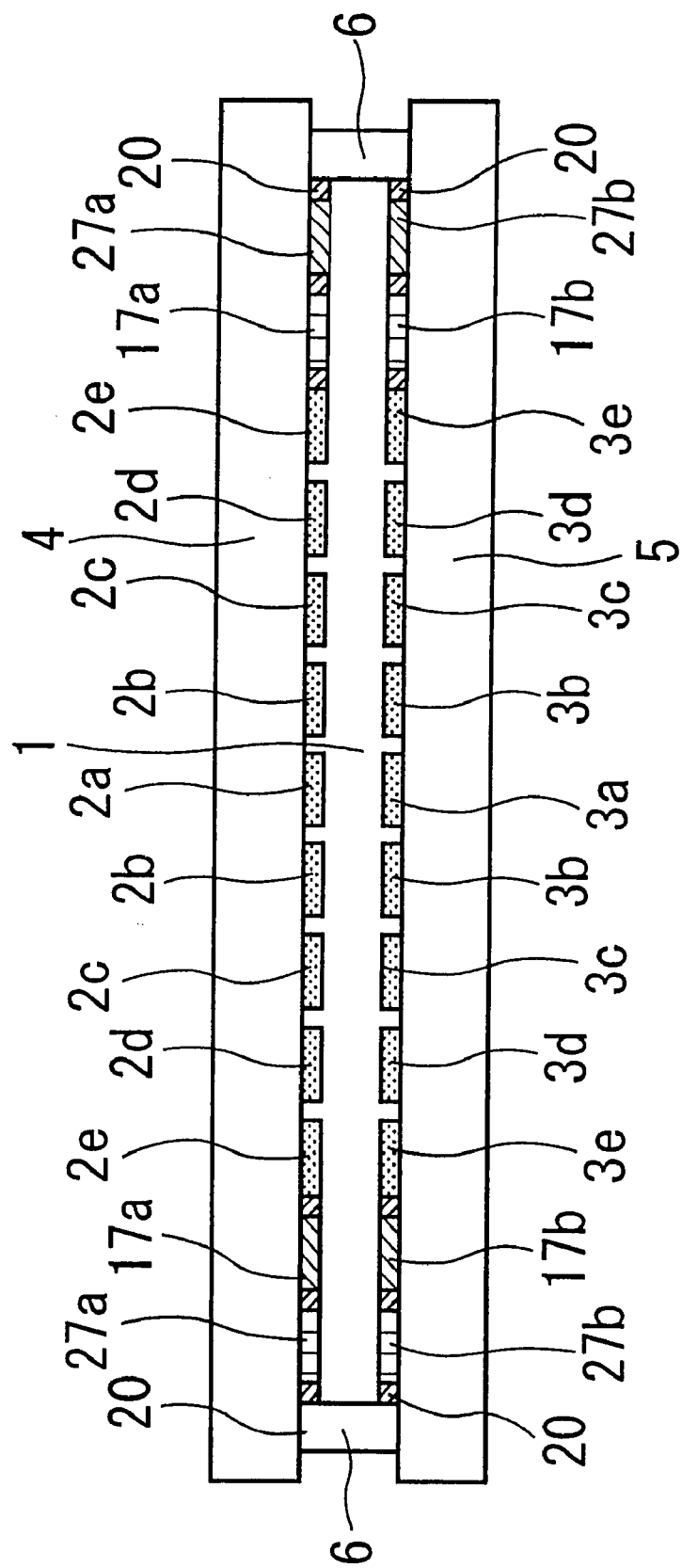
FIG. 6 is a schematic cross sectional view illustrating the constitution of an electrochemical cell section of an optical filter according to a first embodiment of the present invention.

In the optical device of this embodiment, as shown in FIG. 6, a pair of transparent substrates (for example, glass substrates) 4 and 5 constituting a cell are disposed at a predetermined gap, and pair of working electrodes (hereinafter sometimes referred to as transparent electrode or ITO electrode) 2a, 2b, 2c, 2d and 2e; and 3a, 3b, 3c, 3d and 3e are opposed to each other to the inner surfaces (opposing surfaces) of each of the substrates 4 and 5, and the counter electrodes 17a and 17b and the reference electrodes 27a and 27b are disposed on the inner surface of each of the substrates to the outer circumference thereof. The substrates 4 and 5 are kept at a predetermined distance by the spacers 6 and the electrolyte 1 such as a silver salt solution is sealed between them. The planer shape for the working electrodes 2a to 2e; 3a to 3e, as well as the counter electrodes 17a and 17b is substantially identical with that shown in FIG. 4. While the reference electrodes 27a and 27b are disposed to the outer circumference and not shown in FIG. 4, they are optionally used in the optical device of this embodiment. However, since they are extremely effective for stable control and driving of the optical device, they are adopted as a further preferred embodiment (here and hereinafter).

Further, the optical device according to the present invention can be constituted as a camera system capable of overcoming the problems in the related art by application to a camera system such as a CCD camera.

That is, according to the present invention, since an electro-optical element in which an insulation film is formed on a lead electrode for any of electrodes is used, the electro-optical element has an electrode not causing the undissolved electrodeposition material thereon in the electrolyte as described above, and a camera system capable of reducing the size and overcoming the problem of blurred images can be provided by disposing the electro-optical element described above in an optical path for controlling the amount of light.

<Second Embodiment>

An optical device and a fabrication method for the second embodiment of the present invention can be applied suitably to an optical device comprising a working electrode, a counter electrode and an electrolyte disposed in contact with both of the electrodes, wherein the working electrode includes a transmissivity of 70% or more in a visible light region, a material including a metal is electrodeposited on the working electrode from the electrolyte and thereby light is controlled electrochemically by an electric field to be applied to the electrolyte.

The working electrode according to the present invention comprises an oxide layer in which indium is doped to tin, wherein indium/tin is 1.5 or less by element ratio. The optical device has an excellent spectrum characteristic.

However, an electrical resistance of the oxide layer gets larger as tin ratio increases. Particularly, when indium/tin is less than 0.5, the electrical resistance increases abruptly. A large electrical resistance causes a large polarization of the working electrode, resulting in higher power consumption and denaturation of the electrolyte. Therefore, it is desirable that the electrical resistance is small. In view of the spectrum characteristics and the electrical resistance, it is preferable that indium/tin is 0.5 to 1.5 by element ratio.

Further, it is preferred that an oxide layer constituting the working electrode is formed by a gas phase film forming method and, the layer can be formed suitably by the gas phase film forming method using sputtering, physical vapor deposition or chemical vapor deposition.

This enables to fabricate a preferred optical device comprising a pair of transparent or semitransparent substrates opposed to each other, a working electrode disposed to at least one of opposing surfaces of the pair of transparent or semitransparent substrates, a counter electrode and an electrolyte containing a metal salt such as a silver salt disposed in contact with the working electrode and the counter electrode between the transparent and semitransparent substrates.

A preferred embodiment (light control cell structure) of the present invention is shown in FIG. 6 described for the first embodiment.

The working electrode according to the present invention can be formed by various gas phase film forming methods such as a vapor deposition method (physical vapor deposition method), sputtering method, CVD method, MOCVD method or MBE method, a plating method, a sol-gel method, a coating method such as spin coating, a printing method or the like described for the first embodiment.

Further, for the target used in the sputtering method, single crystal or polycrystal material of a compound containing the film forming ingredient element is suitably used. The composition of the formed film can be controlled by the element compositional ratio in the target. For example, in the polycrystal material in which tin oxide is mixed with ITO, the film ingredient can be controlled by varying the amount of tin oxide to be mixed.

The target incorporated with a little amount of a different kind of element such as fluorine or antimony may be used for reducing the electrical resistance value of the film.

The temperature inside the reaction chamber is properly controlled upon film formation by sputtering. Since the critical temperature between the crystalline property and the amorphous property upon film formation also depends on the In/Sn ratio in the film, it is desirable that the temperature is controlled to an appropriate level corresponding to a desired In/Sn ratio.

Sputtering is conducted after once evacuating the inside of the reaction chamber and while introducing mainly argon into the chamber. A little amount of oxygen may be incorporated optionally depending on the intended physical property values such as the sheet resistivity of the film to be formed.

The optical device described above and the camera system incorporating such an optical device may be constituted by using the working electrode fabricated in this manner.

<Third Embodiment>

Also an optical device and a fabrication method of a third embodiment according to the present invention can be applied suitably to an optical device comprising a working electrode as an electrode having a transmissivity of 70% or more in a visible light region, a counter electrode and an electrolyte disposed in contact with both of the electrodes in which light is electrochemically controlled by an electric field applied to the electrolyte.

In this case, it is preferred that a tin oxide layer is laminated to a thickness of 5 nm or more and 130 nm or less, preferably, from 5 nm to 10 nm so as to cover the oxide layer in which indium is doped to tin constituting the working electrode.

Further, the tin oxide layer is preferably formed by a gas phase film forming method and the layer can be formed suitably by using a sputtering, physical vapor deposition or chemical gas phase growing method as the gas phase film forming method.

This enables to drive preferably an optical device comprising a pair of transparent or semitransparent substrates opposed to each other, a working electrode disposed at least on one of the opposing surfaces of the pair of transparent or semitransparent substrates, a counter electrode and an electrolyte containing a metal salt such as a silver salt disposed in contact with both of the working electrode and the counter electrode between the transparent or semitransparent substrates and, further, the device can be constituted as a camera system such as a CCD camera.

A preferred embodiment of the present invention is to be explained more in detail with reference to the drawings.

A preferred embodiment of applying the present invention to an identical optical filter as explained with reference to FIG. 3 and FIG. 4 (electrochemical light control element) is to be explained with reference to FIGS. 7A and 7B.

In the optical device of this embodiment, as shown in FIG. 7A, a pair of transparent substrates (for example, glass substrate) 4 and 5 constituting a cell are disposed at a predetermined distance, and pair of working electrodes (hereinafter sometimes referred to as transparent electrode) 2a, 2b, 2c, 2e and 2e; and 3a, 3b, 3c, 3d and 3e are disposed to each other on the inner surface (opposing surface) of each of the substrates 4 and 5, and counter electrodes 17a and 17b and reference electrodes 27a and 27b are disposed to the outer circumference thereof. The substrates 4 and 5 are kept at a predetermined distance by spacers 6, and an electrolyte 1 such as a silver salt solution is sealed between them.

In this embodiment, the working electrodes 2a to 2e and 3a to 3e are constituted as described below. That is, as shown in FIG. 7B as an enlarged view for the electrodes of FIG. 7A, a thin tin oxide layer 56 of about 5 nm thickness is formed as a coverage layer of a two-layered structure by a gas phase film forming method such as sputtering on ITO 33 (In/Sn=9) of about 200 nm thickness on the substrates 4 and 5. The planer shape for the working electrodes 2a to 2e and 3a to 3e, as well as for the counter electrodes 17a and 17b is substantially identical with that shown in FIG. 4.

Various gas phase film forming methods are used preferably for forming the working electrode of the two-layered structure described above in the same manner as described for the first embodiment.

The optical device and the camera system incorporating the optical device may be constituted by using the working electrode fabricated in this manner.

<Fourth Embodiment>

In an optical device and a fabrication method according to the present invention, at least a portion of a first layer of an electrode, particularly a counter electrode other than a transparent electrode as a working electrode, preferably contains at least one kind of conductive particles and at least one kind of binder.

In this case, the conductive particles are desirably constituted with at least one member selected from the group consisting of the same kind of metals as a metal contained in the electrolyte. For example, when a silver salt solution is used for the electrolyte, the particles are preferably constituted with at least one kind of member selected from the group consisting of silver and other conductive materials such as carbon material. Further, the binder is preferably constituted with at least one kind of resin materials selected from the group consisting of natural rubber series, cellulosic series, phenolic series, urethanic series and epoxy series resin materials.

Then, at least a portion of the first layer of the counter electrode may preferably comprise the same kind of metal particles as a metal contained in the electrolyte and other conductive particles, and the binder, and it is desirable that a mixture of them forms at least a portion of the first layer of the counter electrode by printing, coating or sintering of the mixture.

In this case, the blending ratio of the metal particles contained in the electrolyte relative to other conductive particles and the binder is properly adjusted depending on the kind of the metal particles. For example, when the metal particles are silver particles, it is desirable that they are added by 0.01 to 100 times, preferably, from 0.05 to 10 times by weight ratio based on the ingredients comprising the conductive particles other than the silver particles and the binder with a view point of stabilizing the potential of the counter electrode and easy preparation of the mixture (herein and hereinafter).

Specifically, the silver particles are desirably added at 0.01 to 100 times (preferably, 0.05 to 10 times) by weight ratio based on the solid component of the paste comprising the other conductive particles such as carbon and the binder.

That is, in the optical device according to the present invention, when the counter electrode is constituted with conductive particles contained in the binder, it can easily be set to a predetermined shape and the counter electrode can be formed to a shape with no substantially angle corner. Therefore, it is possible to moderate the localized concentration of electric field on the counter electrode and suppress or prevent the electrodeposition of inactivated particles including metal on the counter electrode. As a result, it is possible to prevent the particles of inactivated material from diffusing or suspending in the electrolyte to lower the transparency of the element, or from short-circuiting the electrodes, which results in an improvement of the transparency of the element and a longer life of the optical device. It can reduce the cost. Further, it may be also considered for the spectral characteristics attributable to the driving voltage of the element that the characteristics can be improved by changing the material of the counter electrode. However, since the counter electrode is formed by incorporation into the binder, the metal contained in the electrolyte is incorporated into the counter electrode during driving to show a potential different from the potential inherent to the metal, or since the counter electrode comprises chemically unstable materials (metal contained in the electrolyte is deposited to change the composition of the counter electrode), driving control is sometimes difficult.

However, the potential of the electrode can be stabilized by adding the same kind of metal particles as a metal contained in the electrolyte together with the other conductive particles into the binder (or adding conductive particles plated or vapor deposited with the metal to the binder as will be described later), thereby forming at least a portion of the first layer of the counter electrode (that is, by addition of the same kind of metal as the metal contained in the electrolyte to the electrode).

It is effective that the metal particles are added to the paste comprising the outer conductive particles and the binder when the potential of the counter electrode is different from the potential inherent to the metal contained in the electrolyte by 50 mV or more in the negative or positive direction. When the potential of the counter electrodes is different from the potential inherent to the metal contained in the electrolyte by |50 mV| or more, the metal is less deposited or dissolved electrochemically, but the dipping potential inherent to the electrode can be adjusted equal with the potential of the metal contained in the electrolyte or to a potential of easily causing electrochemical deposition/dissolution of the material containing the metal (here and hereinafter).

Further, at least a portion of a first layer of the counter electrode can be formed by printing or coating a mixture comprising conductive particles other than the same kind of metal as a metal contained in the electrolyte previously plated or vapor deposited with the metal and the binder.

Also in this case, the blending ratio of the metal and the conductive particles other than the metal and the binder is preferably controlled properly depending on the kind of the metal. For example, if the metal is silver, it is preferably added at 0.01 to 100 times (further preferably, 0.05 to 10 times) by weight ratio to the component comprising the conductive particles other than silver and the binder with the reason described previously.

Specifically, plated or vapor deposited silver is added at 0.01 to 100 times (preferably, 0.05 to 10 times) by weight ratio based on the solid component of a paste comprising the conductive particles other than the silver and the binder.

Then, at least a portion of the fist layer of the counter electrode is preferably formed by printing or coating a paste prepared by pulverizing the conductive material, other than the same kind of metal as a metal contained in the electrolyte, plated or vapor deposited with the metal and then mixing with the binder.

It is preferred that the conductive particles plated or vapor deposited with the same kind of metal as a metal contained in the electrolyte is added to the binder in a case where the potential of the counter electrode is different from the inherent dipping potential of the metal contained in the electrolyte by 50 mV or more in the positive or negative direction.

In the optical device described above according to the present invention, it is preferred that at least a portion of the first layer of the electrode comprises a sintered layer of the same kind of metal particles as a metal contained in the electrolyte and conductive particles other than the metal, the sintered layer is formed when the potential of the electrode is different from the potential inherent to the metal contained in the electrolyte by 50 mV or more in the positive or negative direction in view of the potential stabilization of the electrode.

Further, at least a portion of the first layer of the counter electrode may comprise a sintered layer of the conductive particles other than the same kind of metal as a metal contained in the electrolyte and be plated or vapor deposited with the metal.

In this case, at least a portion of the first layer of the counter electrode may be formed by preliminary molding of a conductive material other than the same kind of metal as a metal contained in the electrolyte, previously plated or vapor deposited with the metal after pulverization. The preliminary formation can provide the electrode with a shape substantially free from the presence of angled corners.

It is preferred that the conductive material is sintered after pulverization and preliminary molding in a case where the potential of the counter electrode is different from the dipping potential of the metal contained in the electrolyte by 50 mV or more in the positive or negative direction.

Further, it is preferred that the second layer is formed of at least one kind of electroconductive polymeric material, and the electroconductive polymeric material is preferably formed by electrochemical polymerization. Then, as the conductive polymeric material, polyaniline, polypyrrole or polythiophene is preferably used.

Further, the third layer may be constituted with a metal foil or a conductive thin film and, for example, the third layer may be constituted with the material identical with that for the working electrode.

Then, it is essential that no angled corner is substantially present at the end edge of the counter electrode.

This enables to form an optical device comprising a pair of transparent or semitransparent substrates opposed to each other, a working electrode disposed on at least one of the opposing surfaces of the pair of transparent or semitransparent substrates, the counter electrode described above and an electrolyte disposed in contact with both of the working electrode and the counter electrode between the pair of transparent or semitransparent substrates.

In this embodiment, different from the related art example shown in FIG. 3 and FIG. 4 described previously, counter electrodes 17a and 17b disposed to the outer circumference of the working electrodes 2a to 2e and 3a to 3e are constituted as described below. That is, as shown in an enlarged view of FIGS. 8A and 8B for the counter electrode 17b in FIG. 6 for instance, a third layer 19 comprising a current collector is formed on the substrates 4 and 5, on which a second layer 20 comprising a polymeric layer is formed by an electrochemical polymerization process, and a first layer 18 formed by printing or coating a kind of pasty conductive paint comprising conductive particles and a binder in admixture with each other is printed or coated thereon to constitute the counter electrodes 17a and 17b. The planar shape for the working electrodes 2a to 2e and 3a to 3e, as well as the counter electrode 17a and 17b is substantially identical with that shown in FIG. 4. Further, 27a and 27b denote reference electrodes.

That is, in the optical device of this embodiment, the polymeric layer is interposed between the current collector and the layer comprising the conductive particles to bond the first layer and the third layer of the counter electrodes 17a and 17b by the polymeric layer to improve the adhesion.

Such a polymeric layer is preferably constituted with a conductive polymer for smooth charge transfer from the current collector to the conductive particle layer. Then, while various methods such as casting or vapor deposition can be used for forming the conductive polymeric layer, the electrochemical polymerizing process is used preferably among them. That is, a dense polymeric layer can be formed uniformly by the electrochemical polymerization process by utilizing elctrochemical oxidation/reduction reaction.

The electrochemical polymerization process is a method of dipping a material to be formed in a solution containing monomer molecules and polymerizing monomer molecules by supplying electric current to the material to be formed, thereby forming a polymer on the surface of the material to be formed (details will be described later). The conductive polymer to be formed by the electrochemical polymerization can include polyaniline from aniline as the monomer, polypyrrole from pyrrole as the monomer and polythiophene from thiophene as the monomer.

Further, since aniline, pyrrole, thiophene and the like are chemically modified easily, there are present various derivatives and, correspondingly, various polymer derivatives are present. For example, polyaniline includes polymer derivatives such as N-alkylaniline, N,N-dimethylaniline, 1-aminopyrene and α-phenylenediamine; polypyrrole includes polymer derivatives such as N-methylpyrrole and polythiophene includes polythiophene derivatives in which 3- and 4-positions of thiophene are substituted with alkyl group, alkoxyl group, allyl group or the like.

Figure 9:
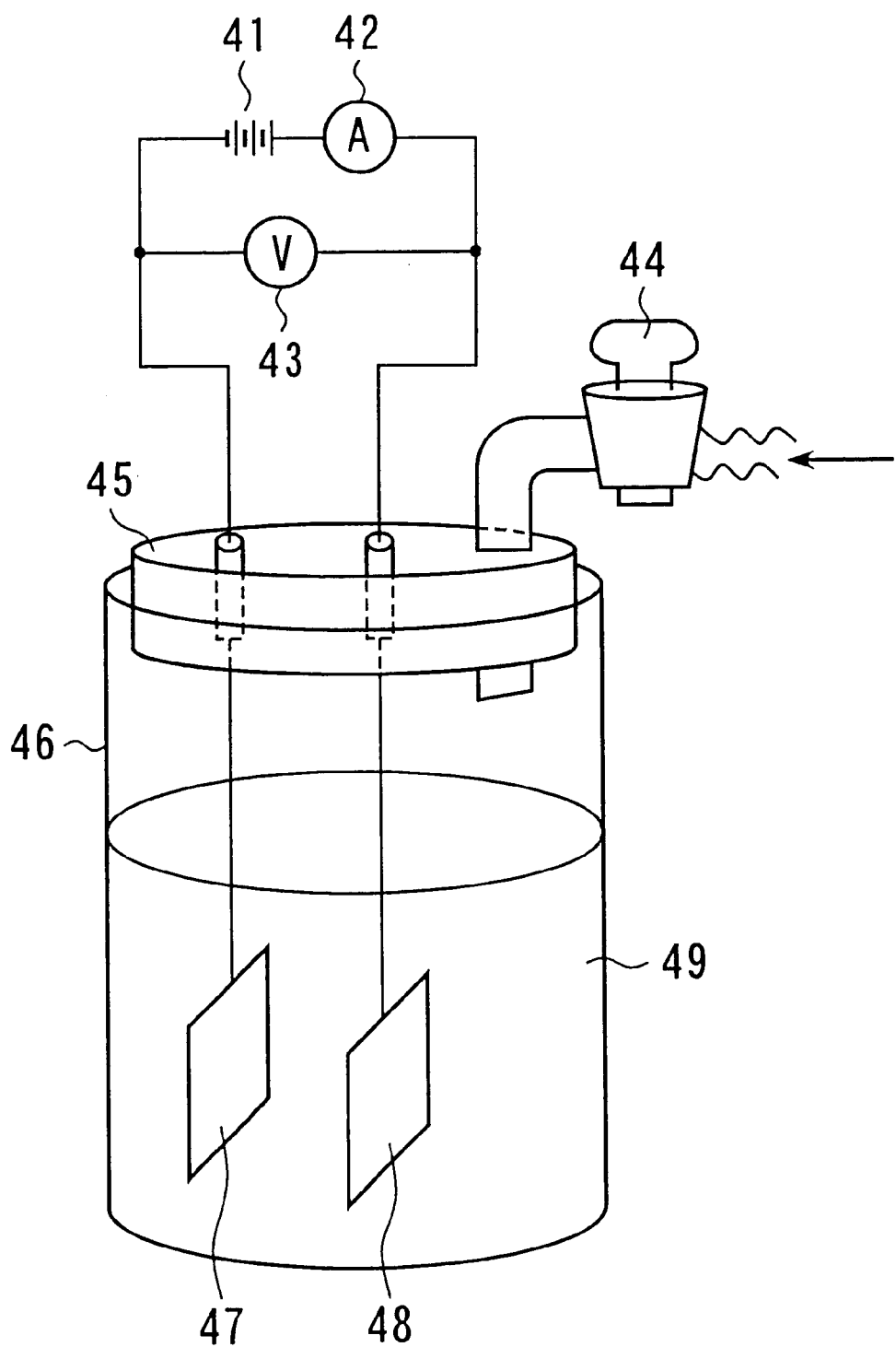
FIG. 9 is a schematic view illustrating a device for electrochemical polymerization.

The polymer is synthesized by electrochemical polymerization in a cell 46 as shown in FIG. 9. For conducting polymerization, the cell is preferably provided with a handle cock 44 capable of introducing an inert gas for removing oxygen in air. Usually, a material to be polymerized with the polymer (substrate 5) is used as a positive electrode 48 while an appropriate electrode material is as a negative electrode 47.

When a monomer to be polymerized is dissolved at an appropriate concentration in a solvent de-oxygenized by blowing an inert gas, and applying an appropriate voltage 41 between both of the electrodes in the electrolyte 49, a desired polymer is formed on the positive electrode 48. In the drawing, are shown an ammeter 42, a volt meter 43 and a lid 45.

For example, when aniline is electrochemically polymerized, about 0.2 to 1 mol/l of aniline is dissolved in an aqueous solution of hydrochloric acid, nitric acid, perchloric acid or tetrafluoro boric acid (pH<2), and oxidation is conducted by current supply at a constant potential of 0.7 to 1.0 V or constant current, using ITO as the positive electrode, silver as the reference electrode, such that a constant film-like polyaniline is formed.

When pyrrole is electrochemically polymerized, pyrrole is dissolved at a concentration of 0.05 to 0.1mol/l into a solvent, for example, acetonitrile, and a voltage at about 3.5 V is applied between both of an ITO positive electrode and a platinum negative electrode, to form polypyrrole.

Further, when thiophene is electrochemically polymerized, benzonitrile, tetrahydrofurane, methylene chloride is often used in addition to acetonitrile, in which platinum, nickel or graphite can be used as the positive electrode. When a voltage is applied to the positive electrode of ITO, polythiophene is formed on ITO.

Usually, when electrochemical polymerization is conducted, a supporting salt is dissolved for supplying a current at a sufficient value. For example, in the electrochemical polymerization of polyaniline, hydrochloric acid or the like is added to adjust pH acidic to about 1. On the other hand, when polypyrrole or polythiophene is electrochemically polymerized, a lithium salt such as lithium iodide or lithium perchlorate can be used as the supporting salt as well as the silver salt such as silver bromide contained in the electrolyte preferably used in the optical device of the present invention. In such electrochemical polymerization films, since anions of the electrolyte are intaken simultaneously with polymerization, highly conductive film can be obtained.

The condition for the electrochemical polymerization varies depending on the kind of the monomer, the solvent or the driving method and, in order to obtain a satisfactory film, a current density is preferably less than 3 mA/cm2, more preferably, from 0.5 mA/cm2 in a case of polymerization at a constant current.

In the electrochemical polymerization, copolymerization, for example, polymerizations of pyrrole and thiophene is impossible since the oxidation potential of the two kinds of monomers are different from each other. However, it is possible to synthesize an alternate copolymer comprising thiophene and pyrrole at 1:1 or 2:1 ratio by using pyrrole derivatives such as 2,2'-thienyl pyrrole and 2,5-di(2-thienyl)-pyrrole as the monomers.

Further, the polymeric layer of the second layer can also be formed with an insulative polymer in which an electric current is allowed to pass therethrough if the second layer is formed at a sufficiently reduced thickness.

After forming the second layer by applying electrochemical polymerization for the counter electrode portion as described above, a layer containing conductive particles is coated or printed to form a first layer.

It is preferred that the thickness of the first layer is from several μm to several tens μm, the thickness of the second layer is from 50 to 500 nm and the thickness of the third layer is from 100 to 400 nm. The third layer functions as a current collector and is made of a conductor such as ITO, copper, silver, gold, platinum, SUS or the like and disposed on an insulative substrate (for example, 1 mm thickness) made of a glass, a fiber reinforced plastic (FRP) or the like.

The carbon material preferably used for conductive particles can include graphite, easily graphitizable carbon (soft carbon), less graphitizable carbon (hard carbon), carbon black and activated carbon.

Among them, the easily graphitizable carbon (soft carbon) is a carbon material which is graphitized when heat treated at about 2800° C. to 3000° C. and the less graphitizable carbon (hard carbon) is a carbon material which is not graphitized even if heat treated at about 3000° C.

Thee easily graphitizable carbon is formed, for example, by sintering coal or pitch in a nitrogen gas stream under the conditions, at a temperature elevating rate of 1 to 20° C. per minute, at a final temperature of 900 to 1300° C., for a retention time at the final temperature of about 0 to 5 hours.

Pitch includes those obtained by the operation of distillation (vacuum distillation, atmospheric distillation and steam distillation), heat polycondensation, extraction or chemical polycondensation from tars or asphalts, obtained by high temperature heat decomposition of coal tar, ethylene bottom oil and crude oil, or pitches formed upon dry distillation of wood.

Further, easily graphitizable carbon can be formed also by carbonizing starting polymeric compound materials such as polyvinyl chloride resin, polyvinyl acetate, polyvinyl butyrate or 3,5-dimethylphenol resin in a nitrogen gas stream at 300 to 700° C. and then sintering them under the same conditions as described above.

Further, easily graphitizable carbon is formed also by carbonizing and sintering condensated polynuclear hydrocarbon compounds such as naphthalene, phenanthrene, anthracene, triphenylene, pyrene, perylene, pentaphene or pentacene and derivatives thereof (for example, carboxylic acids, carboxylic acid anhydrides, carboxylic acid imides thereof), as well as mixtures of each of the compounds, and condensated heterocyclic compounds such as acenaphthylene, indole, isoindole, quinoline, isoquinoline, quinoxaline, phthalazine, carbazole, acridine, phenazine and phenanthridine and derivatives thereof, in the same manner as described above.

On the other hand, less graphitizable carbon is formed, for example, by carbonizing and sintering furan resins, for example comprising homopolymers or copolymers of furfuryl alcohol or furfural under the same conditions as those for the easily graphitizable carbon.

Further, the less graphitizable carbon is formed also from organic materials in which oxygen-containing functional groups are introduced (so-called oxygen crosslinking) to petroleum pitch having a certain H/C atom ratio (for example, 0.6 to 0.8). For example, the less graphitizable carbon material is formed by carbonizing and sintering organic polymeric compounds having an H/C atom ratio of 0.6 to 0.8 such as phenol resin, acrylic resin, halogenated vinyl resin, polyimide resin, polyamideimide resin, polyamide resin, conjugated resin and cellulose or derivatives thereof, or condensated polynuclear hydrocarbon compounds such as naphthalene, phenanthrene, anthracene, triphenylene, pyren, perylene, pentaphene and pentacene or derivatives thereof (for example, carboxylic acids, carboxylic acid anhydrides and carboxylc acid imide thereof), as well as condensated heterocyclic compounds such as various kinds of pitches, acenaphthylene, indole, isoindole, quinoline, isoquinoline, quinoxaline, phthalazine, carbazole, acridine, phenazine and phenanthridine or derivatives thereof, comprising the mixture of each of the compounds described above as the main ingredient under the same conditions as described above.

Further, the starting material or the precursor for the easily graphitizable carbon and less graphitizable carbon described above may be carbonized and sintered after adding phosphorus compounds to them.

Further, when the conductive particles of the present invention is constituted with graphite, natural graphite or artificial graphite, for example, from the easily graphitizable carbon as a precursor and then heat treated at a high temperature of 2000° C. or higher can be used.

Characteristics of the graphite, easily graphitizable carbon (soft carbon), less graphitizable carbon (hard carbon) and activated carbon are shown in the table below:

TABLE 1

| Carbon species | Crystal-linity | Density | Porosity | Sintering temperature | Conductivity |
|---|---|---|---|---|---|
| Graphite | high | high | small | high | high |
| Soft carbon | ↓ | ↓ | ↑ | ↓ | ↓ |
| Hard carbon | ↓ | ↓ | ↑ | ↓ | ↓ |
| Activated Carbon | low | low | large | low | low |

Further, any binder may be used in admixture with the conductive particles so long as it has a durability to the electrolyte 1. For example, natural rubber series, cellulose series, phenolic series, urethane series and epoxy series resins can be used. The mixing ratio of the binder and the conductive particles is preferably within a range of about 80:20 to about 99:1 by weight ratio and, more preferably, within a range of about 90:10 to about 99:1 by weight ratio. If the mixing ratio is less than 80:20, the strength of the obtained film may possibly be weakened. On the other hand, if the mixing ratio is more than 99:1, the relative amount of the conductive particles may be small failing to obtain necessary conductivity.

As described above, by interposing the second layer comprising the polymeric layer between the first layer 18 constituted with a mixture of the conductive particles and the binder and the third layer 19 comprising the current collector, adhesion can be improved to prevent peeling of the first layer 18 in the counter electrodes 17a and 17b.

The first layer 18 constituting the mixture of the conductive particles and the binder contains preferably at least one carbon material and, in addition, silver or other metal such as copper or nickel, or alloy or compound can be used alone or in admixture. Particularly, when a silver salt solution is used for the electrolyte, among them, silver particles can be used preferably for providing the effect of stabilizing the potential of the counter electrode as described previously.

Further, the grain size of the conductive particles is preferably from several $\mu$m to several tens $\mu$m. If the grain size is excessively small or large than the above-mentioned range, it is difficult to uniformly disperse the conductive particles in the binder and, as a result, the electric resistance of the film may possibly be increased excessively.

For the current collector constituting the third layer, those materials having electron conductivity and electrochemically stable are used. Examples of the current collector material usable to the electrolyte used in the light control device of this embodiment can include at least one metal material selected from the group 4A, 6A, 8 and 1B of the periodical table, alloys thereof, or metal oxides such as ITO or tin oxide.

Figure 5:
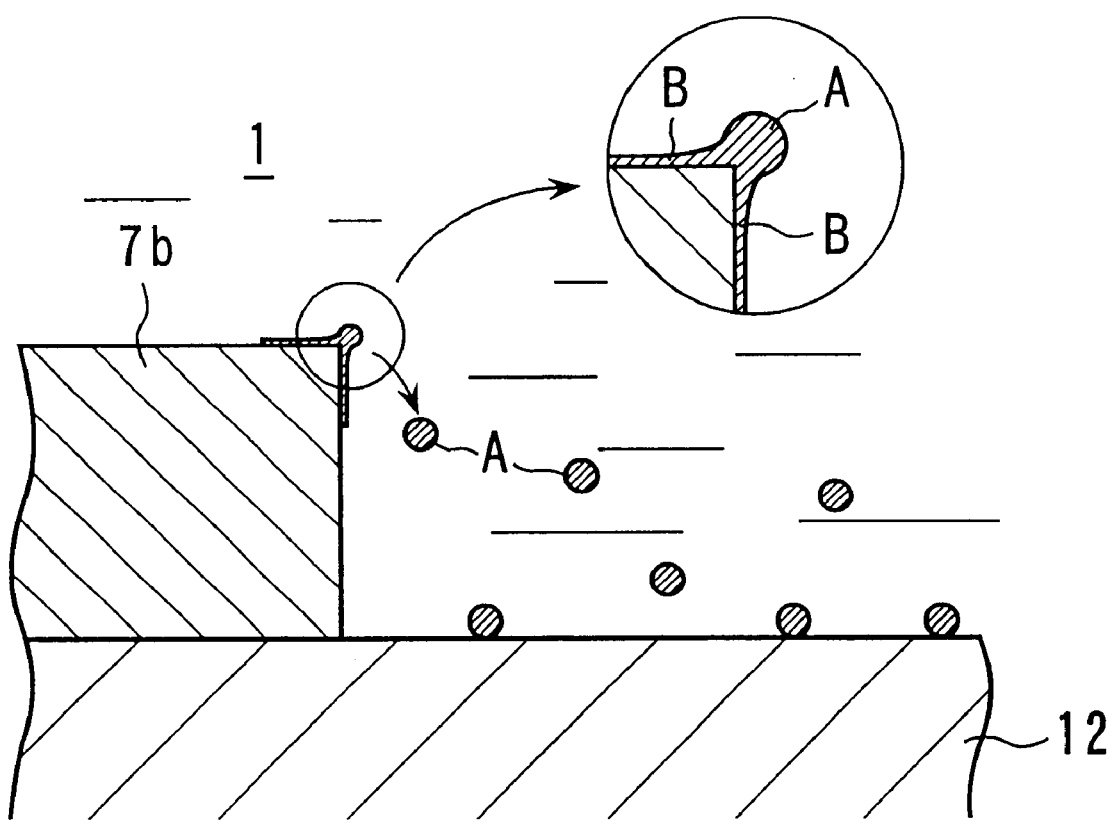
FIG. 5 is a conceptional view illustrating depositing/growing/defoliation phenomenon of metal particles in an existent optical device using a metal plate for a counter electrode.
Figure 8A:
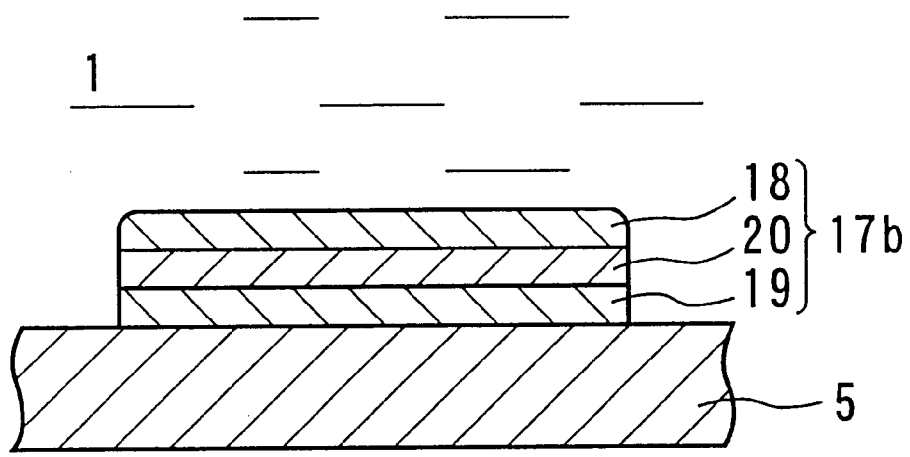
FIGS. 8A and 8B are enlarged cross sectional views for a counter electrode of an electrode filter according to a fourth embodiment of the present invention.
Figure 8B:
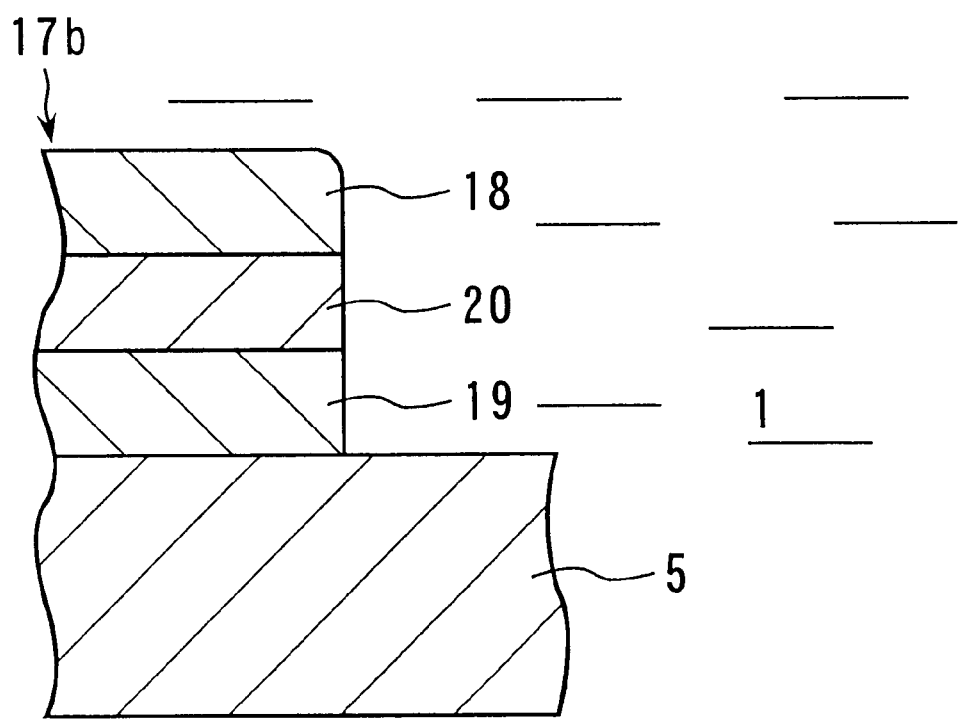

Further, when the counter electrodes 17a and 17b are formed by printing or coating a pasty material, counter electrodes 17a and 17b rounded at the corner on the end edge by the fluidity and the surface tension of the material and of a shape free from substantially angled edges are formed as shown, for example, in FIG. 8A as an enlarged view for a portion of the counter electrode 17b and in FIG. 8B. Accordingly, concentration of the electric field as explained referring to FIG. 5, is moderated and, as a result, this can prevent the material deposited from the electrolyte 1 from growing in a relatively large particulate form. That is, the fourth embodiment can prevent formation of the inactivated deposition material on the counter electrodes 17a and 17b, which may suspend in the electrolyte 1 to lower the transparency of the device upon color extinction of the working electrode or cause short-circuit between the electrodes.

As described above, an optical device having stable characteristics with no diffusion or suspension of particulate deposition material, compared with the case of an electrode constituted with a metal plate such as a silver plate, can be formed by constituting the electrodes 17a and 17b as a laminate structure comprising a layer of a mixture of the conductive particles and the binder, a polymeric layer and an underlying current collector layer.

<Fifth Embodiment>

The optical device of the present invention preferably has a constitution of comprising a control means for controlling a driving current in accordance with the (temperature of the electrolyte such that the temperature information is inputted to a control circuit as the control means.

An optical device of a preferred embodiment according to the present invention comprises a pair of transparent or semitransparent substrates opposed to each other, a working electrode disposed at least on one of the opposing surfaces of the pair of transparent or semitransparent substrates, a counter electrode and an electrolyte disposed in contact with both of the working electrode and the coutner electrode between the substrates and, further, attached with a control means for controlling a driving current source based on a temperature information. It is preferable that a temperature detector is attached in order to measure a temperature of the electrolyte and transmit a temperature information to the control means.

Figure 10A:
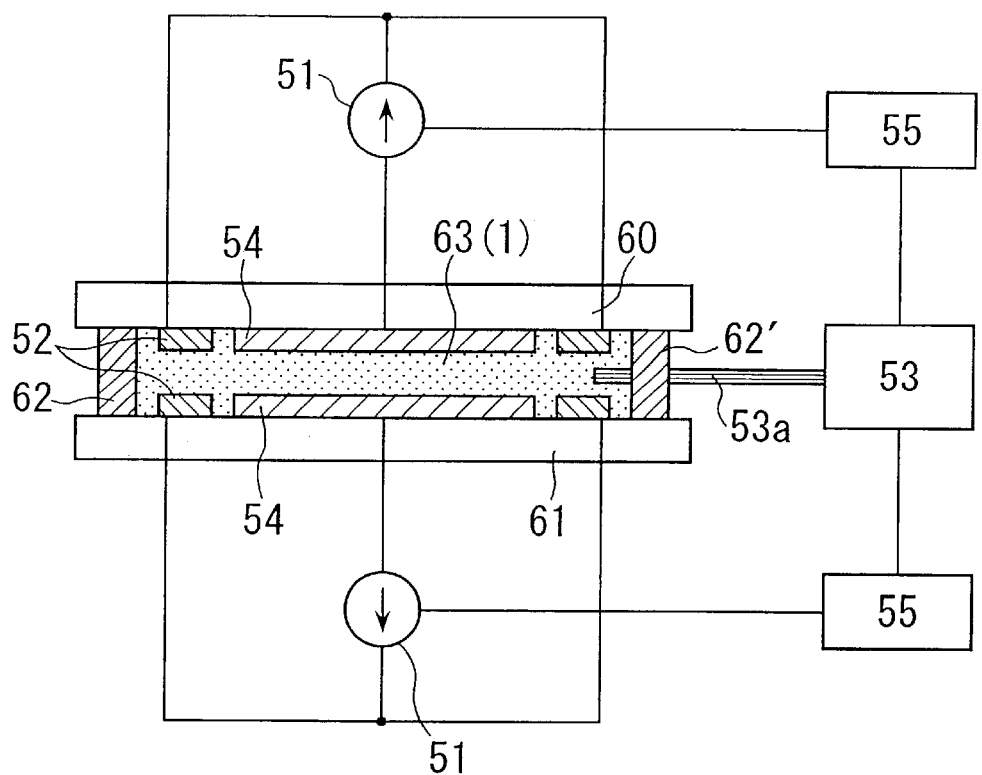
FIG. 10 is a constitutional view of an electrochemical light control type optical device according to a fifth embodiment of the present invention.

As an example, an optical device as shown in FIG. 10 can be mentioned (explanation for the reference electrode is saved here). That is, in the optical device of the embodiment shown in FIG. 10, glass substrates 60 and 61 as a display window are opposed by way of spacers 62 and a working electrode 54 made of ITO and a counter electrode 52 are opposed to each other on the inner surfaces of the glass substrates 60 and 61. Then, a silver salt solution 63 as an electrolyte is sealed between the glass substrates 60 and 61 and the spacers 62 and 62'.

Further, the counter electrode 52 and the working electrode 54 are connected with a driving power source 51. The driving power source 51 comprises a known power source circuit and is controlled depending on the temperature of the electrolyte as will be described later.

On the other hand, a control means 55, a temperature detector 53 and a control circuit for connecting the control means 55 are formed between the driving power source 51 and the driving power source 51, and one end of a probe 53a of the temperature detector 53 is passed through the spacer 62 and in contact with an electrolyte 63 such as a silver salt solution.

In the constitution described above, the temperature detector 53 is required to have a function of transmitting the temperature information of the electrolyte to the control means 55 and it can transmit the temperature change of the electrolyte generally in the form of an electric signal to the control means 55. For example, a thermister is preferred.

The probe 53a of the temperature detector 53 is preferably disposed as shown in the drawing such that the top end is in contact with the electrolyte for recognizing the temperature more accurately but it is not restricted to such an embodiment. For example, if there is a problem in view of the corrosion resistance for the probe 53a, the top end of the probe 53a is kept at a portion of the device near the electrolyte, for example, at the inside of the spacer 62. This scarcely would cause a practical problem.

Further, it may suffice that the probe 53a is made of a material generally having highly corrosion resistant stainless steel (SUS304). However, if higher corrosion resistance is required by a special or particular reason, more chemically stable material, for example, gold or platinum may be used instead of stainless steel. Alternatively, a noble metal or other highly chemically stable material may be coated on the surface of the stainless steel or other metal material.

The temperature information detected by the temperature detector 53 described above is transmitted to the control means 55. The control means is adapted to adjust the control current from the driving power source 51 based on the temperature information, by which the amount of the material electrodeposited on the working electrode 54 (or amount of material to be dissolved) can be controlled. As a practical control means 55 satisfying such a purpose can include, for example, a PID control device.

Figure 10B:
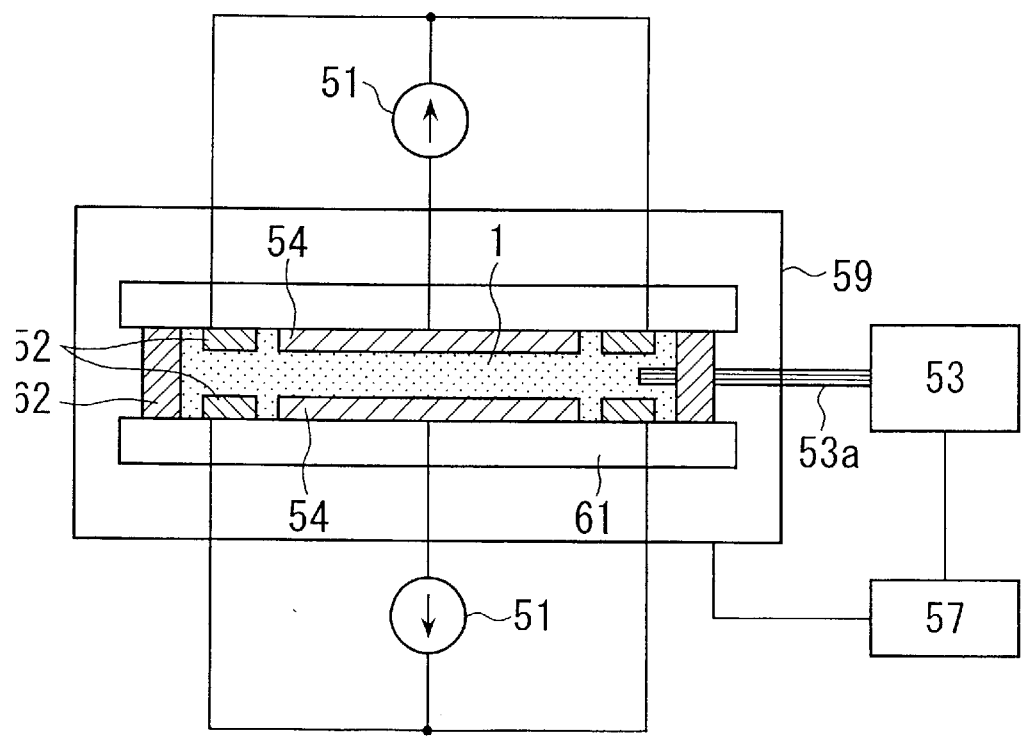

Further, the optical device of the present invention may comprise a temperature control device 57 for controlling a temperature of the electrolyte or the surroundings thereof as shown in FIG. 10B instead of the current control device as described above in order to drive the optical device under a desirable temperature.

<Sixth Embodiment>

In the present invention, a power source circuit that supplies current for supplementing the dissolved portion of the electrodeposited material is preferably connected between the working electrode and the counter electrode.

Then, it is desirable to dispose a control circuit for controlling current to be supplied or voltage to be applied by the current supply means based on a temperature. It is more desirable to dispose a temperature detector such as a thermo-sensor or a thermistor detecting a temperature of the electrolyte.

For the working electrode used in the present invention a transparent or semitransparent electrode having a transmissivity of 70% or more in a visible region is preferably used, and a silver salt solution is preferred as the electrolyte. However, the electrolyte used in the present invention is not restricted to the silver salt solution.

The present invention is to be explained further specifically based on a preferred embodiment.

An optical device of a preferred embodiment according to the present invention comprises a pair of transparent or semitransparent substrates opposed to each other, at least a working electrode disposed on at least one of the opposing surfaces of the pair of transparent or semitransparent substrates, a counter electrode and an electrolyte disposed in contact with both of the working electrode and the counter electrode and, further comprises a reduction current power source. It is desirable that the optical device further comprises a temperature detection means for detecting a temperature of the electrolyte, for example, a thermo-sensor, a control circuit or device for controlling the reduction current from the reduction current power source based on a temperature information from the temperature detection means and a driving power source connecting with the working electrode and the counter electrode.

Figure 11A:
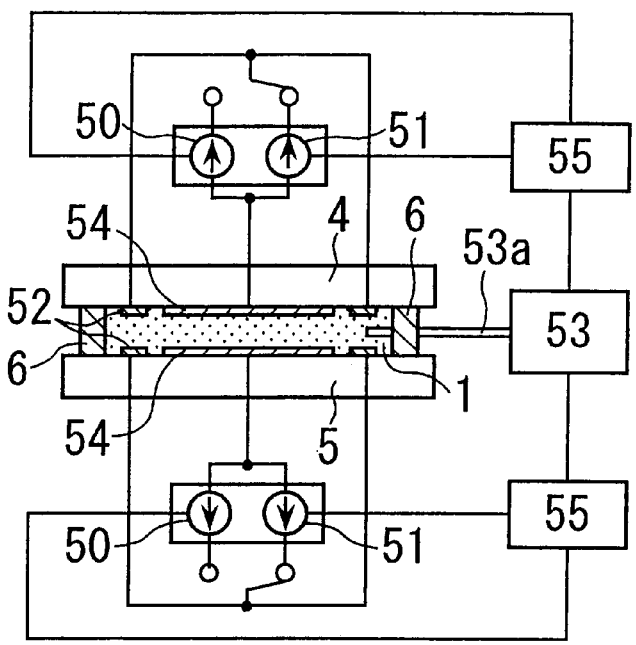
FIG. 11A is a constitutional view of an electrochemical light control type optical device according to a sixth embodiment of the present invention.

As an example, an optical device as shown in FIG. 11A can be mentioned (the reference electrode is not illustrated).

That is, in the optical device of the embodiment shown in FIG. 11A, glass substrates 4 and 5 as a display window are opposed to each other by way of spacers 6 and a working electrode 54 made of ITO and a counter electrode 52 are opposed to each other on the inner surface of the glass substrates 4 and 5. An electrolyte 1 is sealed between the glass substrates 4 and 5, and the spacers 6.

Further, the counter electrode 52 and the working electrode 54 are connected with the driving power source 51, and the driving power source 51 is disposed switchably with a reducing current power source 50, and the reducing current power source 50 is connected with the control circuit (device) 55 and the temperature sensor 53. The reduction current power source 50 should be connected with at least the working electrode 54. In FIG. 11A, it is connected with the working electrode 54 and the counter electrode 52. Then, one end of a probe 53a of the temperature sensor 53 is passed through the spacer 6 and is in contact with the electrolyte 1.

Figure 11B:
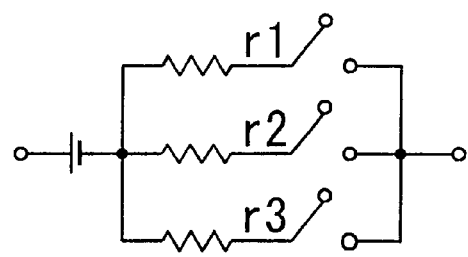
FIG. 11B and FIG. 11C are constitutional views illustrating an example of a reduction current power source circuit used in the optical device.
Figure 11C:

In the constitution described above, the driving power source 51 and the reduction current power source 50 are required to have a function capable of outputting a desired current based on the temperature information from the temperature sensor 53. Concrete examples of them can include, for example, a constitution as shown in FIG. 11B in which resistors r1, r2 and r3 are arranged in parallel and connected switchably to electric current, or a constitution as shown in FIG. 11C in which a variable resistor is connected with a power source, but the invention is not restricted to them.

Further, the control circuit (device) 55, the temperature sensor 53 and the probe 53a can be constituted in the same manner as described for the fifth embodiment.

The temperature information for the electrolyte detected by the temperature detector 53 is transmitted to the control device (circuit) 55. In this embodiment, the control device (circuit) 55 can control the following two types of output current respectively based on the temperature information from the temperature sensor 53. That is, one of them is an output current from the driving power source 51 and the other of them is an output current from the reduction current power source 50.

Figure 1B:
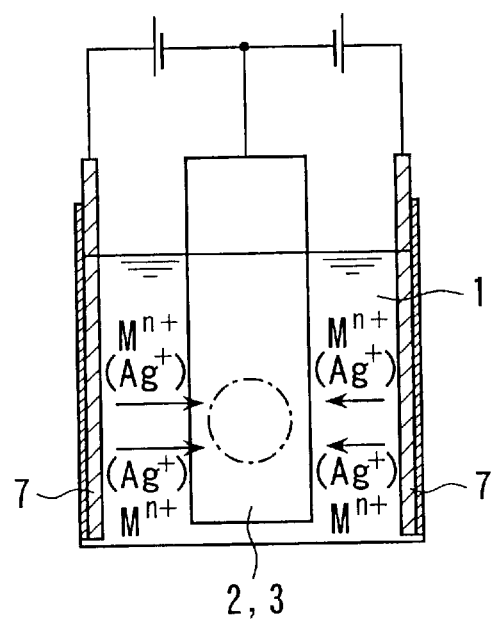
Figure 2:
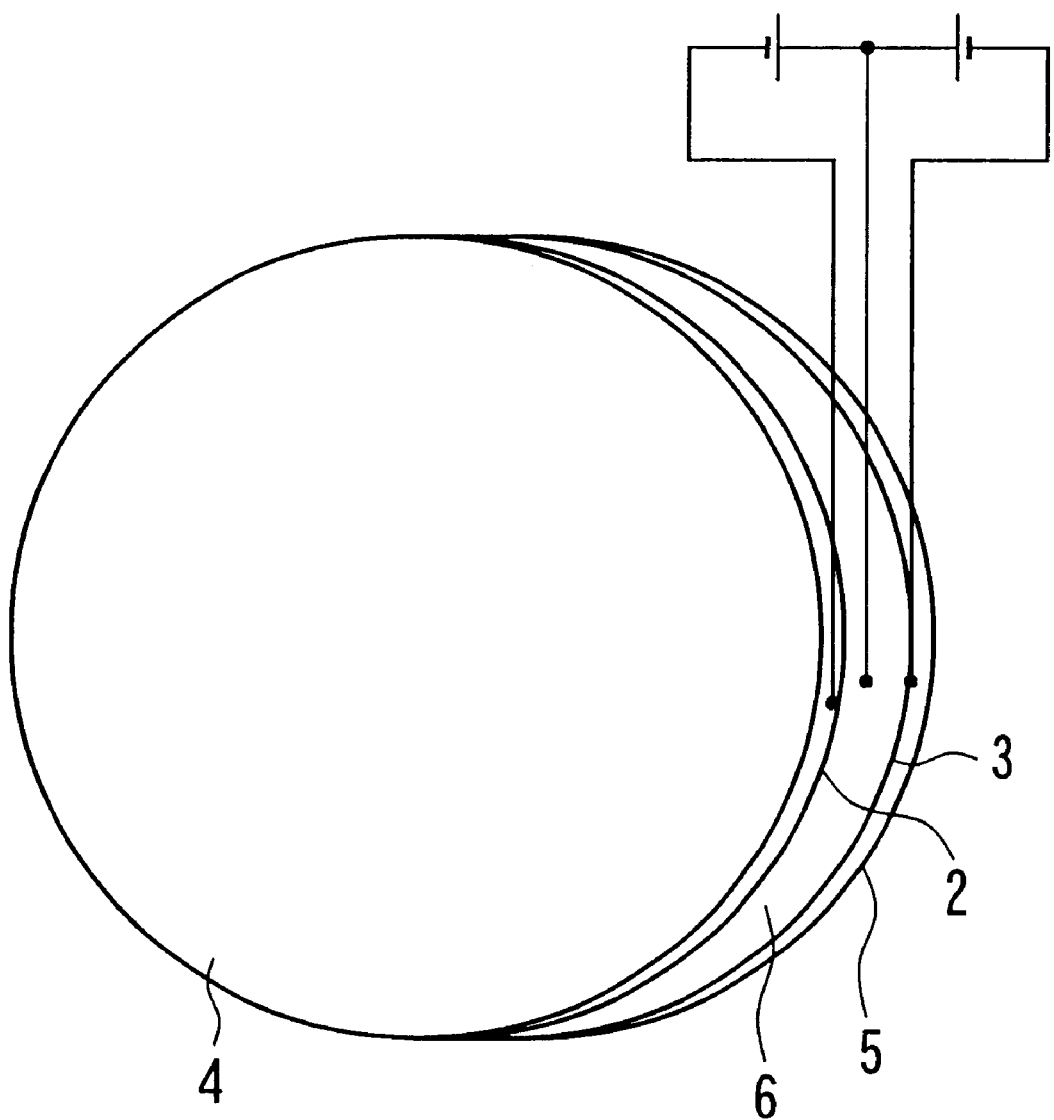
FIG. 2 is a perspective view for the appearance of the optical device.

That is, upon driving of the optical device, the output current from the driving power source 51 is controlled by the control device (circuit) 55 based on the temperature information for the electrolyte from the temperature sensor 53, thereby controlling the amount of the material electrodeposited on the working electrode 54 (the principle is referred to FIG. 1B) and keeping the light shielding degree of the optical device at a desired value.

Such an operation is conducted in the same manner for the power source 50 that supplies reduction current in which the dissolved portion of the electrodeposited material is supplemented by controlling the reduction current to always keep a constant amount of electrodeposition.

Referring to this, in the working electrode on which the material containing a metal is electrodeposited upon driving, if the external circuit is short circuited or opened as described previously, the electrodeposited material is dissolved again into the electrolyte spontaneously, by which the thickness of the deposition films reduced and the transmissivity increases gradually.

Then, in this embodiment, the driving power source 51 is switched to the reduction current power source 50. Then, the output current from the reduction current power source 50 is controlled by the control device (circuit) 55 based on the temperature information for the electrolyte sent from the temperature sensor 53 and the reduction current is supplied (current is supplied in the reduction direction) so as to supplement the dissolved portion of the electrodeposited material. For the power source 50 that supplies current to supplement the electrodeposition material by supplying the reduction current, power sources of various waveforms are used such as constant current, constant voltage, unipolar pulse or bipolar pulse, a constant current power source being used particularly preferably.

The time required for the spontaneous dissolution for all of the electrodeposited material is considerably longer (from several minute to several tens minutes) compared with the control time for deposition/dissolution of the electrodeposited material (several sec) by the driving power source 51, so that the value of the current supplied to the reduction current power source 50, if it is a constant current source for instance, is considerably small compared with the value of current supplied from the driving power source 51 (about from one to several to one to several thousands). However, when the reduction current is supplied as pulses, a current more than that of the driving power source may sometimes flows instantaneously but it is not excluded from the invention.

The value for the reduction current for making the light shielding degree constant in the optical device differs depending on the temperature of the electrolyte as described previously. That is, since the spontaneous dissolution rate of the deposition material such as silver increases as the temperature rises, a larger current is required compared with the case when a temperature is lower for supplementing the deposition material such as dissolved silver. For this purpose, the temperature of the electrolyte is detected by the temperature detection means 53 such as the temperature sensor and the current value corresponding to the temperature information may be supplied.

Further, for driving the optical device, light is shielded by depositing the material such as a metal contained in the electrolyte on the surface of the working electrode 54, while light is allowed to permeate by dissolving the material.

The electrodeposition material can be deposited on the working electrode 54 by polarizing the working electrode 54 as a negative electrode and supplying current in the reduction direction so as to supply electrons from the power source 51.

On the contrary, for dissolving the deposited material on the surface of the working electrode 54, the working electrode 54 is polarized as a positive electrode and current is supplied in the oxidation direction so as to send the electrons to the power source 51.

The value of the reduction current necessary for depositing the material till a predetermined light shielding degree within a predetermined period of time differs depending on the temperature. That is, since the deposition rate of the material is increased as the temperature rises, the value of the reduction current for attaining a predetermined light shielding degree within a period of time may be small. On the contrary, if the temperature is lower, since the deposition rate of the material is slower, larger reduction current value is necessary for attaining the light shielding degree under the same condition. This is applicable also to the value of the oxidation current necessary for dissolving the deposited material.

The reduction current value or the oxidation current value differs depending on the kind and the film quality of the transparent conductive film constituting the working electrode 54 or the constitution of the electrolyte. Accordingly, it is important to control the current occasionally depending on each of the cases.

In this way, increase of the transmissivity due to spontaneous dissolution of the electrodeposited material after electrodeposition can be suppressed effectively in this embodiment.

In the embodiment described above, the driving power source 51 and the reduction current power source 50 use the combination of the control device (circuit) 55 and the temperature sensor 53 in common but the present invention may be constituted so as to use the combination individually. That is, instead of the system of switching the driving power source 51 and the reduction current power source 50 to each other, a system of operating the circuits individually may also be adopted with no substantial change for the advantageous effect of the present invention.

Further, in the present invention, the reduction current power source 50 may be saved and the function thereof may be conducted by the driving power source circuit 50 collectively.

<Seventh Embodiment>

In an optical device and a driving method according to the present invention, it is preferred to provide a temperature sensor for detecting the temperature of the electrolyte and a control circuit for controlling the polarization means in accordance with the temperature of the electrolyte detected by the temperature sensor (for example, polarization voltage or current is decreased upon rise of temperature).

Then, it is preferred that after the working electrode has been polarized in the oxidation direction, the working electrode is polarized to the reduction state in which the material such as a metal contained in the electrolyte is electrodeposited on the working electrode.

In this case, it is desirable to control the polarization of the working electrode upon electrodeposition and/or dissolution of the material in accordance with the temperature of the electrolyte detected by the temperature sensor for detecting the temperature of the electrolyte (for example, voltage or current for reduction or oxidation polarization is decreased upon rise of temperature).

This enables to preferably drive an optical device comprising a pair of transparent or semitransparent substrates opposed to each other, a transparent electrode disposed as the working electrode on at least one of the opposing surfaces of the pair of transparent or semitransparent substrates, a counter electrode and an electrolyte disposed in contact with both of the transparent electrode and the counter electrode between the transparent or semitransparent substrates and, further, this can be incorporated in a camera system such as a CCD camera.

A preferred embodiment of the present invention is to be explained more in details with reference to the drawings. Explanation is to be made for a preferred embodiment of applying the present invention to an optical filter (electrochemical light control element) like that explained for FIG. 3 and FIG. 4, with reference to FIG. 6 and FIG. 10.

In the optical device of this embodiment, as shown in FIG. 6, a pair of transparent substrates, for example, glass substrates 4 and 5 constituting a cell are disposed at a predetermined distance, pairs of working electrodes (hereinafter sometimes referred to as a transparent electrode) 2a, 2b, 2c, 2d and 2e; and 3a, 3b, 3c, 3d and 3e are opposed to each other on the inner surfaces (opposing surfaces) of each of the substrates 4 and 5, and counter electrodes 17a and 17b and reference electrodes 27a and 27b are disposed to the outer circumference thereof. The substrates 4 and 5 are kept at a predetermined distance by spacers 6 between which an electrolyte 1 is sealed.

In this embodiment, the working electrodes 2a to 2e and 3a to 3e are constituted as described below. That is, a thin tin oxide layer of about 5 nm thickness is formed on ITO (In/Sn=8) at a thickness of about 200 nm on the substrates 4 and 5. The planer shape of the working electrodes 2a–2e and 3a–3e, as well as the counter electrodes 17a and 17b is substantially identical with that shown in FIG. 4.

FIG. 10 is a conceptional view illustrating polarization means in the optical device this embodiment.

That is, in an element in which a counter electrode 52 and a working electrode (shown only schematically in this drawing) 54 are disposed for example on the inner surfaces of the substrates 60 and 61 opposed to each other at a predetermined distance by spacers 62, in which an electrolyte 63 is sealed therebetween, a temperature detection means 53 such as a thermister for detecting the temperature of the electrolyte is disposed by way of the spacer, a driving power source 51 is connected between the counter electrode 52 and the working electrode 54, and a control means (circuit or device) 55 such as a PID is connected between the temperature sensor 53 and the driving circuit power source 51.

In the drawing, an arrow for the driving power source shows the direction of current when the material (for example, silver) contained in the electrolyte 63 is electrodeposited (reduced) on the working electrode 54 from the electrolyte. Accordingly, the direction of the current is opposite to the arrow upon oxidation.

The polarization means in the present invention is constituted as described above, the temperature of the electrolyte is detected by the temperature detection means, and the working electrode 54 is polarized to an oxidation direction in accordance with the detected temperature before deposition of the material containing the metal in the electrolyte 63 on the working electrode 54. Further, the material can be deposited or dissolved (that is, polarization upon reduction/oxidation) as the basic operation). In any of the cases, the driving power source 51 for conducting polarization of the working electrode 54 is controlled by the control means 55.

Then, according to the present invention, before electrodeposition on the working electrode 54, it is at first polarized in the direction of the dissolving the electrodeposited material into the electrolyte 63, that is, in the oxidizing direction and thereafter the materials is electrodeposited on the working electrode 54.

Polarization is preferably conducted for about 2 to 5 sec to such an extent that the electrolyte ingredient is not affected. The polarization value varies depending on the kind of the transparent conductive film of the working electrode 54, constitution of the electrolyte 63 and the temperature. For example, in a case where the transparent conductive film of the working electrode 54 is made of ITO and the electrolyte 63 comprises a silver salt dissolved in DMSO/AN=55:45, the electrolyte is denatured and turned yellow at a potential of 1.0 V vs. $Ag/Ag^+$ for silver (1.3 V vs. $Ag/Ag^+$ for tin oxide) or higher at 22° C. As described above, polarization to about 1.0 V vs. $Ag/Ag^+$ is possible at 22° C.

The working electrode 54 is polarized to the reduction direction to electrodeposit the material including the same kind of metal as a metal contained in the electrolyte 63 thereon after the operation described above. In a case where the surface layer of the working electrode 54 is constituted with tin oxide, the deposited film peels partially from the surface of the working electrode 54 to allow the light to permeate through the peeled portion as the thickness of the film increases in a temperature region lower than the room temperature (lower than 25° C.) if the operation has not been applied. However, the deposition film is less peeled after applying the operation.

The reason has not been clarified why the peeling of the electrodeposited film is suppressed by the operation described above. However, it is believed that the polarization to the oxidation direction activates and/or clears the surface of the working electrode.

Explanations have been made to the embodiments of the present invention and the following can be applied to at least one of the embodiments described above.

Referring at first to the counter electrode, a structure having the conductive particle layer has been explained for the fourth embodiment, but the structure having a layer at least containing a material different from the electrodeposited material can also be used in combination with the first to third or fifth to seventh embodiments. This different kind of material is constituted with a material having a lower ionization tendency than that of the electrodeposition material. For example, in a case of using an electrolyte containing a silver salt, silver can be deposited/dissolved reversibly on the surface of a material having a lower ionization tendency than that of the silver, for example, platinum, gold or palladium.

The ionization tendency will be explained in connection with the present invention in view of the standard electrode potential. The standard electrode potential means a potential of an electrode material based on a normal (or standard) hydrogen electrode (simply referred to as: NHE or SHE) at a standard pressure of a hydrogen gas of 1 atm and the value varies depending on temperature. Several standard electrode potentials in metal electrode reactions arranged orderly from negative values are referred to as electrochemical series. The following table shows metal series based on electrochemical series for main metals and standard electrode potentials thereof (at 25° C.).

The standard electrode potentials correspond to potentials exhibited when the materials are dipped an aqueous solution (referred to as dipping potential or natural potential) and those metals showing high dipping potentials are referred to as noble metals and those metals showing low potentials are referred as basic metal.

TABLE 2

| Metal | Standard Electrode Potential (V vs NHE) |
|---|---|
| Li | −3.03 |
| K | −2.925 |
| Ca | −2.87 |
| Na | −2.713 |
| Mg | −2.37 |
| Al | −1.66 |
| Zn | −0.7628 |
| Cr | −0.74 |
| Fe(II)/Fe | −0.440 |
| Cd | −0.402 |
| Co | −0.277 |
| Ni | −0.23 |
| Sn | −0.140 |
| Pb | −0.126 |
| Fe(III)/Fe | −0.036 |
| H | 0.000 |
| Cu(II)/Cu | 0.337 |
| Hg(I)/Hg | 0.789 |
| Ag | 0.7994 |
| Pd | 0.987 |
| Pt | 1.2 |
| Au | 1.50 |

While a standard electrode potential in a non-aqueous solution system is usually different from that in the aqueous solution system, the relation regarding the level of the standard electrode potential in the non-aqueous system substantially corresponds, in most cases, to that in the aqueous solution system. Then, the degree of the ionization tendency as a measure for the ease of ionization corresponds to the level of the standard electrode potential. That is, a material showing a lower standard electrode potential has a higher ionization tendency, whereas a material having a higher standard electrode potential has a lower ionization tendency. Then, it is assumed in this invention that "low ionization tendency" means having a high standard electrode potential.

For example, in a case of using a silver salt solution as the electrolyte, a first layer of the counter electrode in contact with the electrode may comprise a material containing a metal having a more noble potential than silver (Ag). That is, as can be seen from Table 2 described above, any of metal such as silver(Ag), palladium (Pd), platinum (Pt) and gold (Au) having lower ionization tendency than hydrogen is a noble metal having a positive potential with reference to the standard potential (0V) of hydrogen. In addition, since the positive potential of the metal used for the first layer is higher than that of silver, palladium (Pd), platinum (Pt) or gold (Au) showing a lower ionization tendency than that of silver (Ag) is referred to as a metal having a more noble potential than Ag. Metals having higher ionization tendency than hydrogen, for example, lithium (Li), aluminum (Al), nickel (Ni), tin (Sn) and lead (Pb) can be said to be metals having basic potential which is negative with reference to the hydrogen standard potential (0 V).

This is also applicable to a material other than metal such as a metal compound, for example, ITO or tin oxide. For example, it can be confirmed that ITO at In:Sn=9:1 shows a potential more noble by about 0.4 V than silver in most of aqueous and non-aqueous solvent and the standard electrode potential is about 1.2 V vs. NHE.

Accordingly, in the optical device according to the present invention, a material having a more noble potential than the metal deposited/dissolved on the working electrode is preferably used as the material for constituting the first layer of the counter electrode in contact with the electrolyte.

A material having a lower ionization tendency (referred to as D) than the material to be deposited/dissolved at the working electrode (referred to as C) has such a nature that deposition/dissolution reaction of the material C proceeds reversibly and smoothly on the surface of the material D. Further, polarization at the counter electrode is not increased so much even if deposition/dissolution reaction of the material C is repeated on the working electrode. As a result, since this is stable and can suppress the increase of polarization at the counter electrode upon driving of the device, the electric power consumption can be reduced and, in addition, contamination caused by side reactions on the counter electrode can also be suppressed.

This is particularly remarkable in a case where the material C is silver and the material D is platinum, palladium or gold. They can be formed uniformly as a dense thin film by a gas phase film forming method or a plating method, by which obstacles are not intruded into the counter electrode, the potential of the counter electrode is stabilized and not disturbed during driving.

Therefore, in an electrochemical light control device utilizing the deposition/dissolution reaction, when a material D having a lower ionization tendency than a material C to be deposited/dissolved at the working electrode (or material showing more noble potential than the material C) is used for the first layer of the counter electrode, the material D in the first layer is less ionized than the material C and smoothly proceeds deposition/dissolution reaction of the material C on the surface of the material D, so that the device is electrochemically stable, polarization at the counter electrode upon device driving can be suppressed and electric power consumption can be reduced, as well as contamination due to side reaction at the counter electrode can be suppressed.

In the present invention, the counter electrode comprises a single layer or a first layer of a material having a lower ionization tendency than that of the material to be deposited/ dissolved at the working electrode (platinum, palladium or gold in a case of using a silver salt solution for the electrolyte), and the layer may be formed of a single species of material or more species of materials (which is generally an alloy or a mixture), or the first layer may be a laminate of materials selected from those materials having lower ionization tendency than the material to be deposited/dissolved at the working electrode.

Further, for the present invention, it is preferred that the counter electrode is covered with a first layer of a material having a lower ionization tendency that of the material to be deposited/dissolved at the working electrode and that the first layer is adhered favorably with the substrate by way of a second layer comprising a metal or an oxide thereof different from that of the first layer. The second layer is not necessary if adhesion is favorable between the first layer and the substrate. However, if the adhesion is not satisfactory in view of the matching between the materials, the adhesion between the counter electrode and the substrate can be ensured to stabilize the potential of the counter electrode, by disposing a material having a satisfactory adhesion to both of the first layer and the- substrate as a second layer.

Specifically, since the thin film of a platinum group metal such as platinum, palladium or gold has less adhesion, for example, with glass or the like when the metal is formed on an insulative substrate such as of glass, it is preferred to interpose a layer containing a metal such as titanium, chromium or tungsten, or metal oxide such as ITO or tin oxide which is a good conductor and having favorable film adhesion as a second layer between the insulation substrate and the first layer containing platinum, palladium or gold.

In this case, since the second layer may be chemically unstable relative to the electrolyte or cause a side reaction with the electrolyte depending on the condition, it is preferred to adopt a structure in which the second layer is completely covered with the first layer such that the second layer is not in direct contact with the electrolyte.

In a case of forming the first layer of platinum, palladium or gold on an insulation substrate, for example, made of amorphous silicon or the like having good adhesion with those metals, the second layer is optionally interposed between the first layer of platinum, palladium or gold and the insulation substrate.

Further, the metal or metal oxide on which the electrodeposition material such as silver is deposited/dissolved may be formed on the substrate, or the metal or the metal oxide may be fabricated previously into a predetermined shape and buried in a corresponding recess on the surface of the substrate. Fixing by the burying (or fitting) has a merit that it can be disposed easily on the substrate such as by burying and fixing in the recess using an adhesive optionally. However, since the electrode often has pointed corners in the shape, concentration of the electric field as shown in FIG. 5 occurs, which causes deposition of the inactivated particulate electrodeposition material A on the counter electrode and, as a result, the inactivated electrodeposition particles are diffused or suspended in the electrolyte to possibly lower the transparency of the element or cause a short-circuit between the electrodes (in the drawing, B denotes the electrodeposition material in a thin film not causing such deposition). Accordingly, the gas phase film forming method described above is more preferred.

In a case of using a silver salt solution as the electrolyte, since platinum, palladium or gold is a metal more noble than silver, the natural potential upon dipping into the electrolyte shows a higher potential relative to silver. For example, the standard electrode potential of each of the metals in an aqueous solution at 25° C. with reference to the standard hydrogen electrode is 1.188 V vs. NHE for platinum, 0.915 V vs. NHE for palladium and 1.50 V vs. NHE for gold. Since the standard electrode potential of silver is 0.7991 V vs. NHE (taken from Chemical Manual), platinum shows a potential more noble by 0.389 V, palladium shows a potential more noble by 0.116 V and gold shows a potential more noble by 0.70 V relative to silver. Further, also in a non-aqueous solution such as (DMSO)/acetonitrile (AN)=55/45 mixture, it can be confirmed that the relative potential of platinum, palladium or gold to silver shows a noble potential approximate to the potential in the aqueous solution respectively.

While use of the noble metal described above as the counter electrode as it is in contact with the electrolyte causes no troubles at all for providing the performance of the optical device, it is preferred to previously form a third layer of a more basic different kind of metal element on the noble metal. For example, in a case of using the silver salt solution as the electrolyte, when a silver layer is formed on platinum, palladium or gold as the third layer, the potential of the electrode when dipped in the solution described above can be made substantially equal with that of silver and an electrode excellent in reversibility for silver deposition/dissolution reactions can be obtained.

In this case, while the first layer covered with the third layer is not in direct contact with the electrolyte initially, the first layer may get in touch with the electrolyte because of a disappearance of the third layer after the deposition/dissolution reaction is repeated. The third layer can be restored by an appropriate electrochemical reduction of the counter electrode.

The material layer made of the metal or the metal oxide as the first layer, the second layer or the third layer can be formed by using various gas phase film forming methods identical with that explained for the first embodiment or it may be formed by a plating method or a sol-gel method.

Among all, various vapor deposition methods or the sputtering methods may be used preferably for forming the first layer, the second layer or the third layer. For the physical vapor deposition method, ohmic heating method or the EB vapor deposition method or the like described above can be used and substantially the same effect of the advantageous effect of the present invention can be obtained by any of the methods and the characteristics of the counter electrode are not changed depending on the difference of the method.

Further, in any of the embodiments described above, installation of the reference electrode enables the working (transparent) electrode and the counter electrode to be controlled stably.

For the reference electrode, those of the same material constitution with that of any of the counter electrodes described so far can be used. Since deposition/dissolution reactions of the material such as silver are not conducted aggressively at the reference electrode, the amount of the metal such as silver may be smaller than that for the counter electrode, for example, in a case of mixing the material with a mixture of such as the carbon material and the binder. Further, the polymeric layer as described in the fourth embodiment is not always necessary.

In a case of constituting the reference electrode having a different kind of material with a lower ionization tendency than that of the same kind of metal as a metal contained in the electrolyte, tantalum or niobium can be used in addition to the material described for the counter electrode as the material used for the collector constituting the second layer as an adhesion layer of the substrate. Since tantalum and niobium have higher electrical resistivity compared with that of others, they are not used for the current collector of the counter electrode since they increase polarization. However, since only the minute current flows for the monitoring of the potentials of the working electrode and/or the counter electrode relative to the reference electrode and the reference electrode shows no substantial potential change, such metals can also be used as the current collector for the reference electrode.

In the optical device having the light control cell of the constitution described above, since the reference electrode is disposed in contact with the electrolyte, a potential of the working electrode and/or the counter electrode is detected relative to the reference electrode. The reference electrode has no direct concern with the reversible electrolytic deposition/dissolution on the surface of the working electrode or the counter electrode but always shows a constant dipping potential in a state in contact with the electrolyte. Therefore, the potential of the working electrode or the counter electrode in contact with the electrolyte can be obtained based on the detected potential difference relative to the reference electrode.

Then, by constituting the reference electrode with the material containing the same metal as a metal included in the electrolyte as a third layer, the potential of the reference electrode in contact with the electrolyte can be made equal with the potential of the material deposited on the surface of the working electrode. Therefore, the potentials of the working electrode and/or the counter electrode can be detected based on the stable potential of the reference electrode.

Also in this case, as described for the counter electrode, the first layer covered with the third layer is not in direct contact with the electrolyte initially. While the third layer may disappear because of a spontaneous dissolution, the third layer can be restored by an appropriate operation using an electrochemical reduction of the reference electrode.

Further, in the reference electrode of the constitution in which the second layer is disposed as an adhesion layer between the first layer and the substrate, adhesion between the first layer and the substrate can ensure the mechanical stability and the potential stability of the reference electrode on the surface of the substrate.

Also in the reference electrode, in a case of using gold, platinum or palladium for the first layer, adhesion with the substrate made, for example, of glass can be ensured by using a transition metal such as chromium, titanium or tungsten, a metal oxide such as ITO or tin oxide or an insulation film such as of silicon dioxide or amorphous silicon like that as the adhesion layer of the second layer in the counter electrode.

Further, in the optical device having the light control cell of the constitution as described above, after the current collector layer as the second layer has been disposed, the first layer may be covered with a material in which conductive particles are dispersed in the binder as the third layer to stabilize the potential of the electrodes also in a case of constituting the reference electrode.

In the preferred embodiment, those electrolytes 1 containing various kinds of metal salts can be used so long as they contain a metal of a nature capable of electrodeposition and dissolution on the working electrode. Specifically, the embodiment can be practiced in an electrolyte system containing electrodepositable metal such as zinc, cadmium, lead, silver, copper, iron, nickel, tin, indium, platinum, palladium, mercury, chromium, tungsten, molybdenum, cesium or lithium. Among them, a silver salt solution or silver (complex) salt solution is most suitable. As a preferred silver salt solution, a solution containing a silver halide such as silver bromide, silver chloride or silver iodide dissolved in water or in a non-aqueous solvent can be used. The non-aqueous solvent usable herein can include, for example, dimethylsulfoxide (DMSO), dimethyl formamide (DMF), diethyl formamide (DEF), N,N-dimethylacetoamide (DMAA), N-methyl propionic acid amide (MPA), N-methylpyrrolidone (MP, propylene carbonate (PC), acetonitrile (AN), 2-methoxyethanol (MEOH) and 2-ethoxyethanol (EEOH).

Further, the concentration of the silver halide in the silver salt solution is preferably from 0.03 to 2.0 mol/l and, more preferably, from 0.05 to 2.0 mol/l.

Further, for improving the conductivity of the silver salt solution and for dissolving the silver halide, a supporting salt (supporting electrolyte) capable of supplying bromine or like other halogen is preferably added. For example, sodium halide, potassium halide, calcium halide, quaternary ammonium halide salt or the like can be used for this purpose. Such a supporting salt is preferably added within a range at a concentration of about ½ to 5 times the silver halide.

Further, by electrochemically or physically modifying a working electrode on which a material containing a metal such as silver is deposited/dissolved, for example, an ITO electrode, the deposition potential of the deposition material on the ITO electrode can be lowered to facilitate the deposition of the material and mitigate electrical damages to the ITO electrode or the solution per se.

As the chemical modification method in this case, a surface treatment (chemical plating) is preferably applied to the ITO electrode with palladium or the like by a 2-solution treatment method of a tin solution and a palladium solution. That is, the activity on the surface of the ITO electrode can be improved by depositing palladium seeds on the substrate consisting only of ITO as the surface activating treatment for the ITO electrode with palladium.

In this case, it is possible to use a tin solution in which 0.10 to 1.0 g of stannous chloride ($SnCl_2$) at a concentration of 0.010 to 0.10% in 1 liter of HCl and a palladium solution in which 0.10 to 1.0 g of palladium chloride ($PdCl_2$) is dissolved at concentration of 0.010 to 0.10% in 1 liter of HCl.

Further, as the physical modification method, a method of vapor depositing a metal more noble than the material containing a metal deposited/dissolved on the working electrode onto an ITO electrode can be adopted.

Then, the circuit constitution of the optical device using the light control cell of the constitution described above is to be explained.

In the optical device, an external power source is connected to the working electrode and the counter electrode for supplying current to the electrodes. As the external power source, a constant current power source is often used. However, the power source is not restricted only thereto but various power sources such as a constant voltage power source, a pulse power source or the like can be used in accordance with appropriate control. Further, a voltmeter is connected between the reference electrode and the working electrode. Further, a current limiter is connected between the voltmeter and the external power source such that the current supplied from the external power source can be controlled by a potential difference measured by the voltmeter.

The optical device having the circuit constitution described above is driven, for example, as described below.

That is, a driving voltage of a direct current is applied for a predetermined period of time between the working electrode as a negative electrode and the counter electrode as an positive electrode, and a deposition material (for example, Ag in case of using a silver salt solution) is deposited on the working electrode to make the working electrode in a colored state. Further, a driving voltage is applied reversely between the working electrode as the positive electrode and the counter electrode as the negative electrode and the deposition material on the working electrode is dissolved into the electrolyte to render the working electrode transparent. In this case, a potential difference between the working electrode and the reference electrode is monitored by the voltmeter. Then, current flowing from the external power source is controlled by a current limiter such that the potential differences is kept within a predetermined range. That is, it is constituted such that current supplied from the external power source is controlled by the current limiter at the instance the voltmeter indicates that the potential difference between the working electrode and the reference electrode reaches a predetermined value and the potential difference between the working electrode and the reference electrode is kept within a predetermined range.

The range for the potential difference between the working electrode and the reference electrode is determined depending on the composition and/or the temperature of the electrolyte constituting the light control cell. That is, the range of the potential difference is determined such that the constituent materials of the electrolyte do not cause an excessive oxidation/reduction reaction by the polarization at the working electrode. For example, when iodic ions ($I^-$) are included as the anion of a supporting salt in the electrolyte, the external power source is controlled by the current limiter such that the potential of the working electrode is kept within a range of +2 V or lower relative to the potential of the standard hydrogen electrode (in the range not causing discoloration of the electrolyte considered to be attributable mainly to oxidation reaction of the iodic ions). In this case, assuming that the surface of the reference electrode is constituted by using silver (Ag) as a third layer as described above, since the standard electrode potential of silver is +0.798 V vs. NHE which shows substantially the same value also in a non-aqueous solvent, the external power source is controlled by the current limiter such that the potential of the working electrode is kept within a range of +1.2 V vs. Ag/Ag$^+$ or lower.

When the electrolyte described above is used and the reference electrode is constituted by using a metal which is more noble than silver (Ag), that is, platinum (Pt), palladium (Pd) or gold (Au), the external power source is controlled within a range of the potential of such a metal relative to silver (Ag).

For example, in an aqueous solution constituting the electrolyte, a noble potential is shown relative to silver (Ag) of about 0.39 V with platinum (Pt), about 0.12 V with palladium (Pd) and about 0.72 V with gold (Au). Substantially the same potential is shown also in the silver salt solution described previously.

In view of the above, the external power source is controlled by the limiter such that the potential difference of the working electrode relative to the reference electrode is kept within a range of about +0.81 V (=+1.2 V−0.39 V) or lower in the electrolyte described above.

Further, for the reference electrode using palladium (Pd), the external power source is controlled by the limiter such that the potential difference of the working electrode relative to the reference electrode is kept within a range of about +1.08 V (=+1.2 V−0.12 V) or lower.

Further, for the reference electrode using gold (Au), the external power source is controlled by the limiter such that the potential difference of the working electrode relative to the reference electrode is kept within a range of about +0.48 V (=+1.2 V−0.72 V) or lower.

In the optical device having such a constitution, the external power source is controlled by the limiter and the potential of the working electrode is kept within the predetermined range. Therefore, excess polarization at the working electrode can be prevented.

Then, in the method of driving the optical device described above, since current supply to the working electrode is controlled such that the potential between the reference electrode and the working electrode is kept within the predetermined range, excess polarization at the working electrode during current supply is suppressed. Then, light control is conducted by reversible electrolytic deposition/dissolution from/into the electrolyte on the surface of the working electrode while preventing the undesired effect of excess polarization at the working electrode from exerting on the material in the electrolyte.

Accordingly, when iodic ions ($I^-$) are dissolved, for example, as anions of the electrolyte salt, coloration of the electrolyte considered to be attributable mainly to the oxidation of the iodine ions can be prevented. As a result, it is possible to keep the optical characteristics of the optical device satisfactorily.

Further, since the external power source is controlled based on the stable potential of the reference electrode, it is also possible to prevent insufficient deposition/dissolution at the working electrode due to unnecessary suppression of the current to cause disadvantages such as undissolved deposit or insufficient deposition of the deposited materials. Accordingly, light control can be conducted accurately.

The optical device according to the present invention is not restricted only to the reflection type but it is applicable also to a transmission type. Other known filter materials, for example, organic electrochromic material, liquid crystal, electro-luminescent material or the like may be used in combination. Further, the device is applicable to optical diaphragm for CCD, as well as for optical amount control in various optical systems, for example, electrophotographic copiers or communication equipments and, further, to such application uses as various types of image display devices displaying characters or images other than the optical filters.

Figure 4:
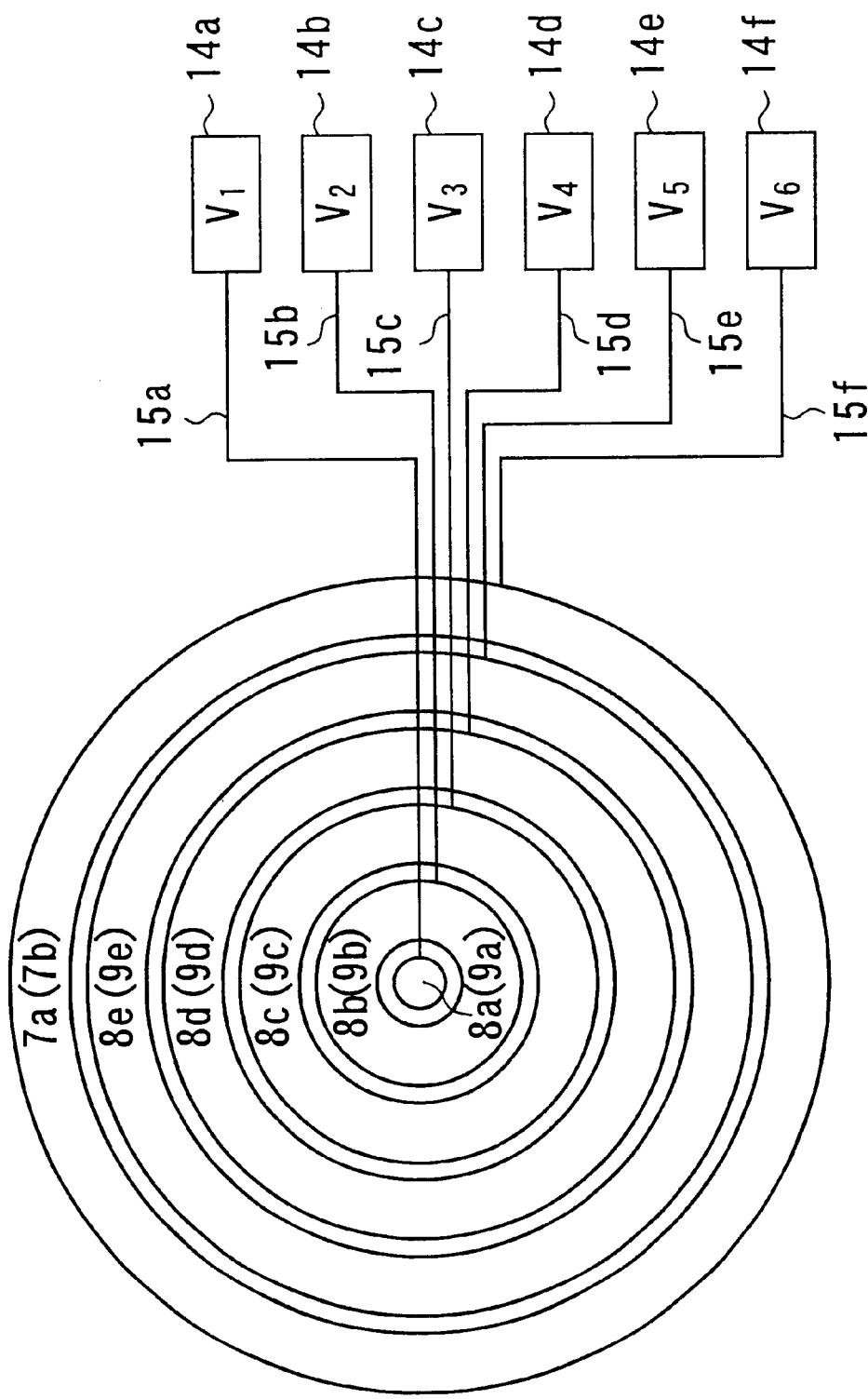
FIG. 4 is a schematic plan view for working electrodes and a counter electrode used in the existent optical device.

Further, the optical device according to the present invention described above (for example those having an electrode pattern as shown in FIG. 4) is used suitably for light control in a camera systems such as a CCD (Charge Coupled Device) camera. In this case, when the light control cell of the optical device according to the present invention is attached on the same optical path as an existent optical filter or an optical diaphragm has been installed so far for the light amount control (light amount restriction) of a camera, while replacing the existent optical parts entirely or partially, a stable control of the light amount can be done.

Since the optical device according to the present invention can control the amount of light by the application of the electric field to the electrolyte thereof as described previously, it requires no mechanism for driving the diaphragm and is different basically from the existent mechanical light amount control mechanism, so that the system can be reduced in the size, substantially, to the effective range of the optical path. Accordingly, it is possible to reduce the size of the CCD camera. Furthermore, since the amount of light can be stably controlled appropriately depending on the level of the voltage applied or the current supplied to the patterned electrodes, diffraction phenomenon in the related art can be prevented and a sufficient amount of light can be entered into an image sensing device to eliminate image blurring. Since the optical device according to the present invention can be driven stably, stable light amount control is possible if the light control cell of the optical device according to the present invention is attached on the identical optical path for the light amount control (light amount restriction), stable optical amount control is possible.

EXAMPLES

Example 1

Figure 12:
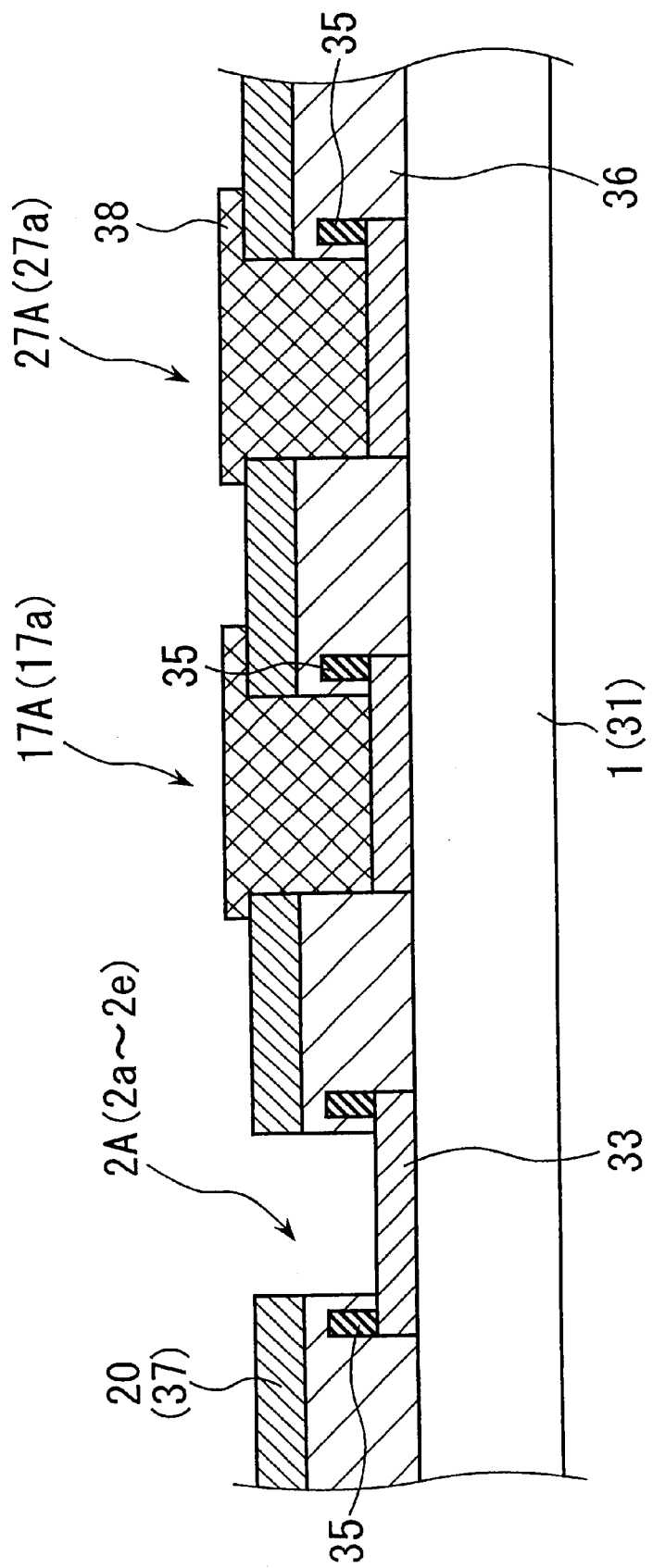
FIG. 12 is a cross sectional view illustrating a constitution for a main portion of an optical element (optical filter or the like) according to Example 1 of the present invention.
Figure 13A:
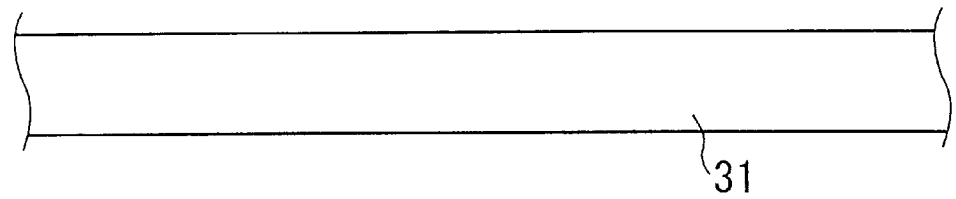
FIG. 13A through FIG. 13O are cross sectional views illustrating the steps of fabricating a working electrode, a counter electrode and a reference electrode in Example 1 according to the present invention successively.
Figure 13B:
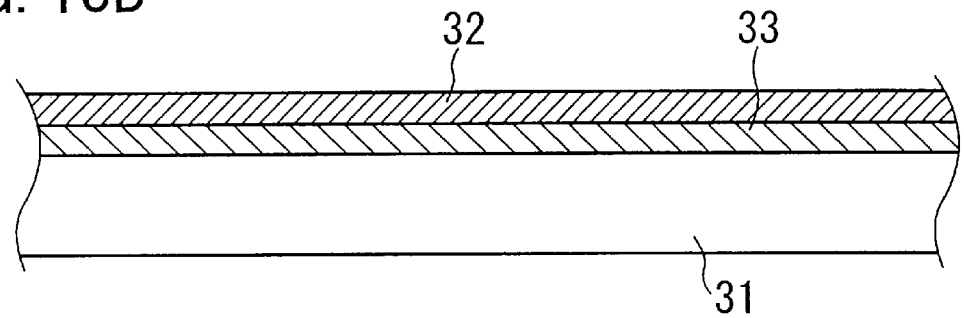
Figure 13C:
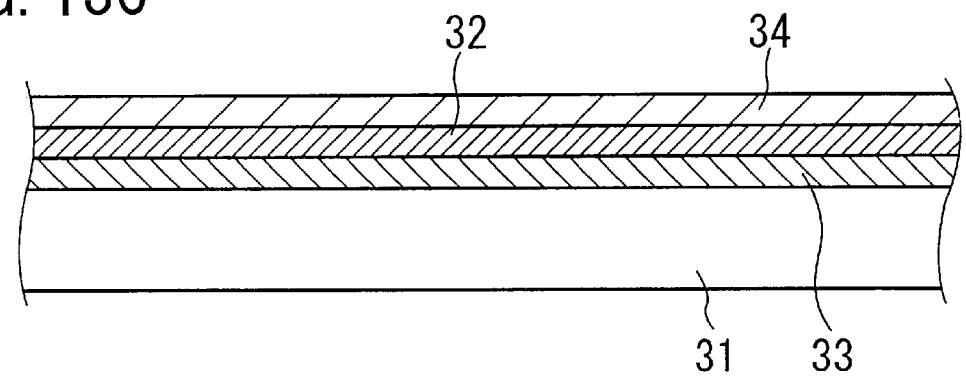
Figure 13D:
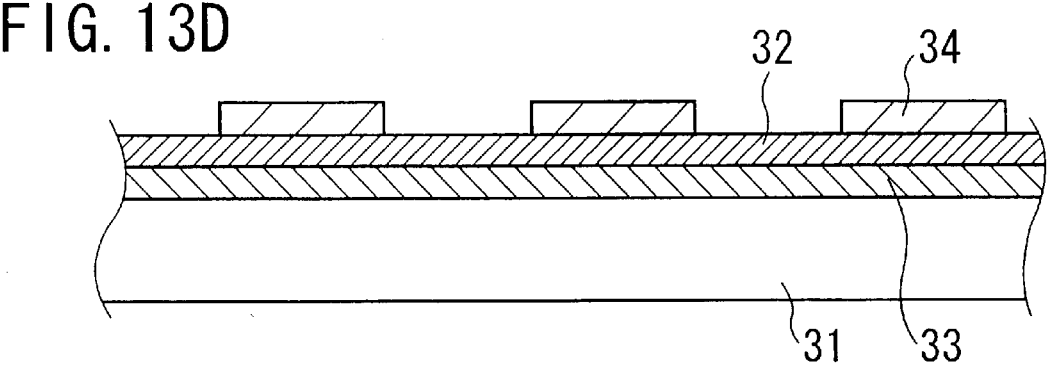
Figure 13E:
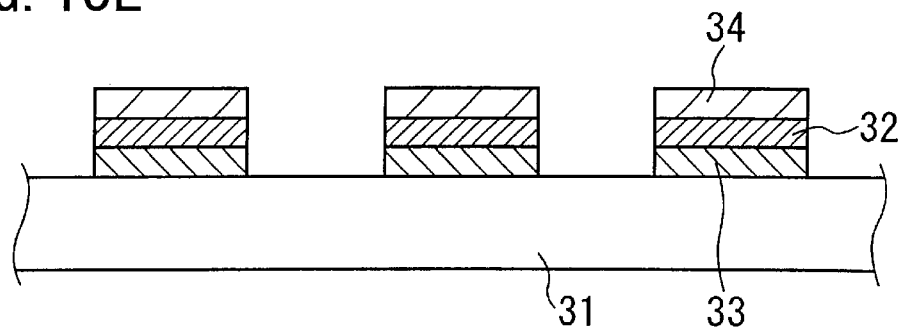
Figure 13F:
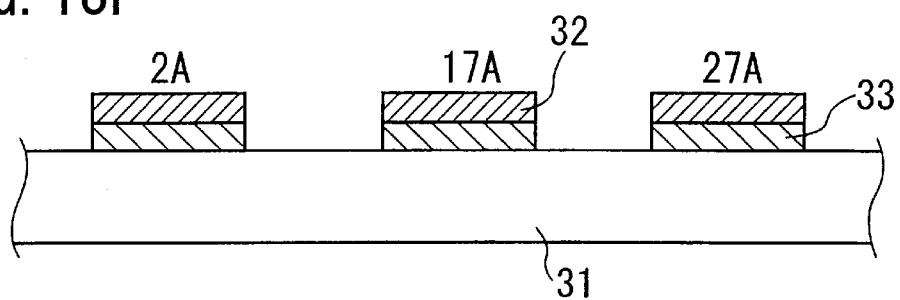
Figure 13G:
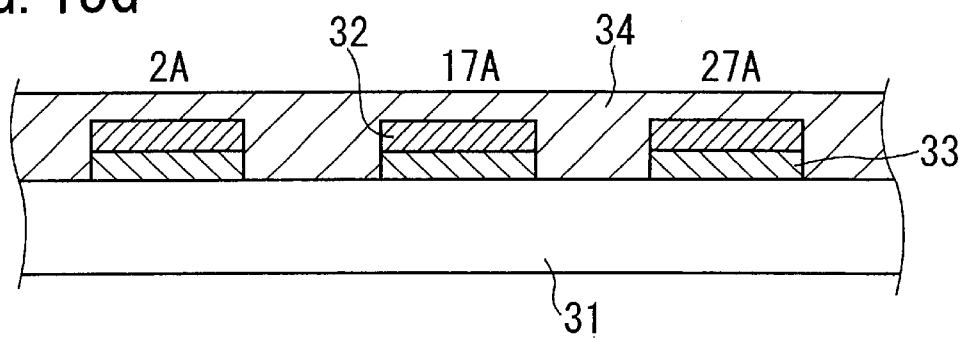
Figure 13H:
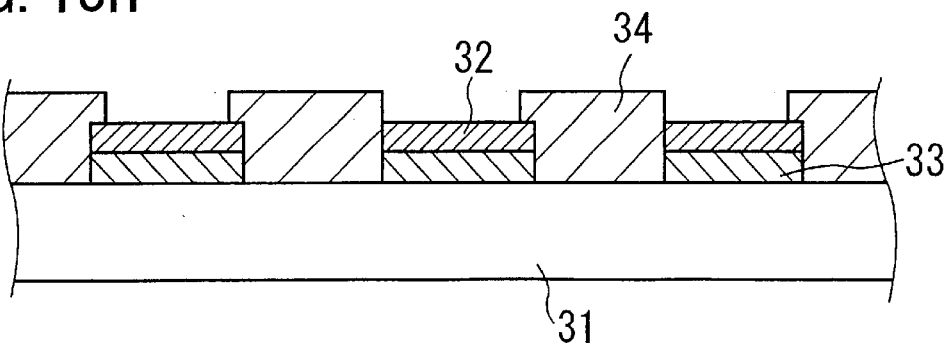
Figure 13I:
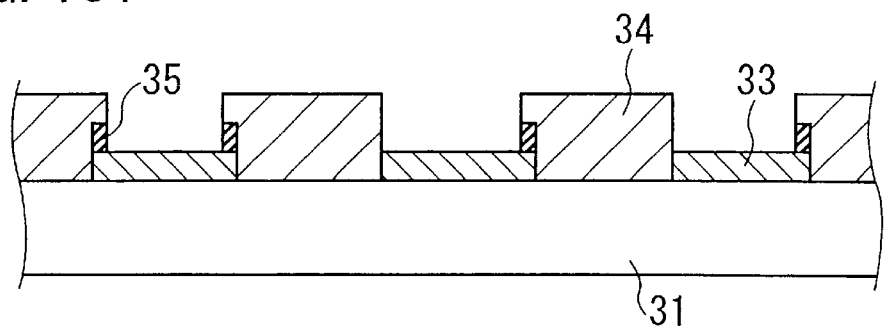
Figure 13J:
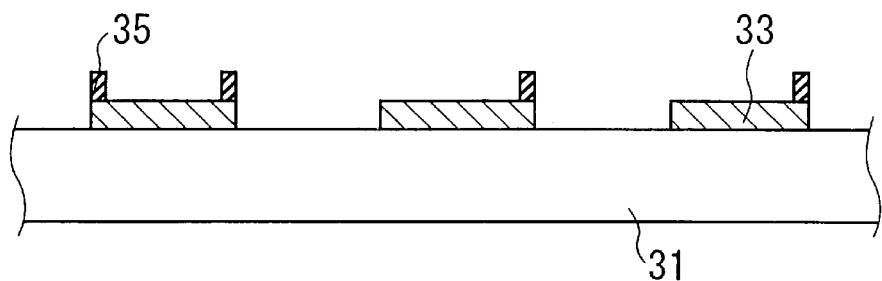
Figure 13K:
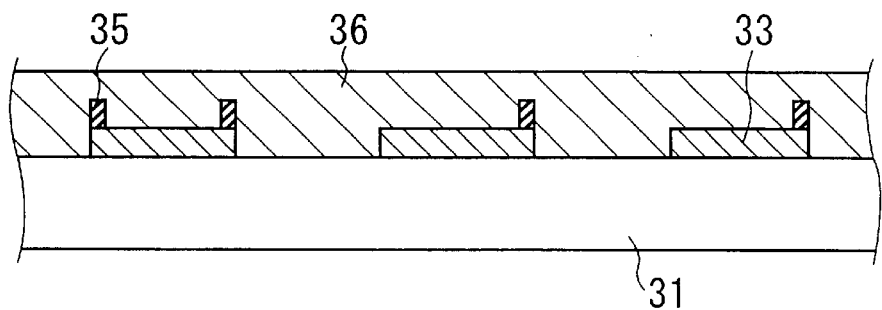
Figure 13L:
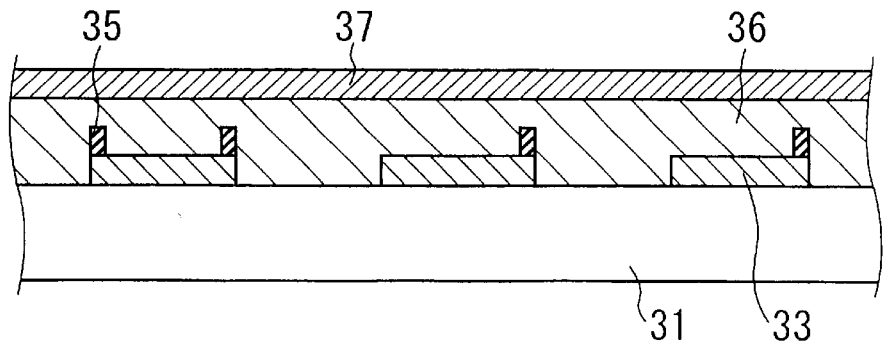
Figure 13M:
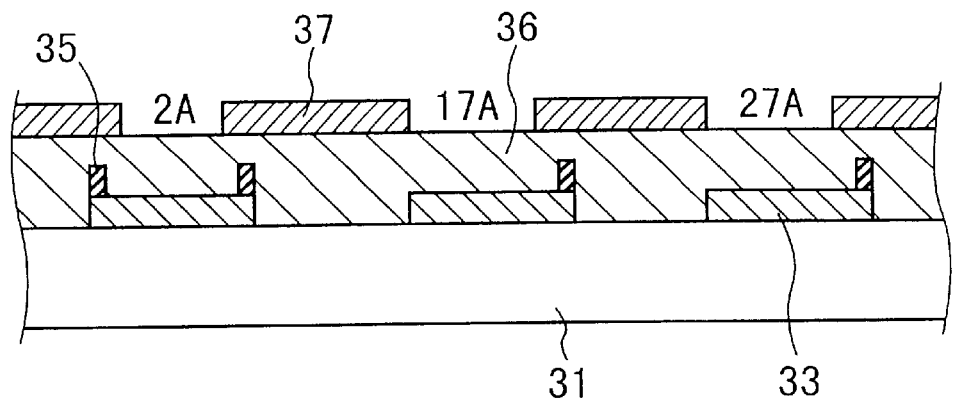
Figure 13N:
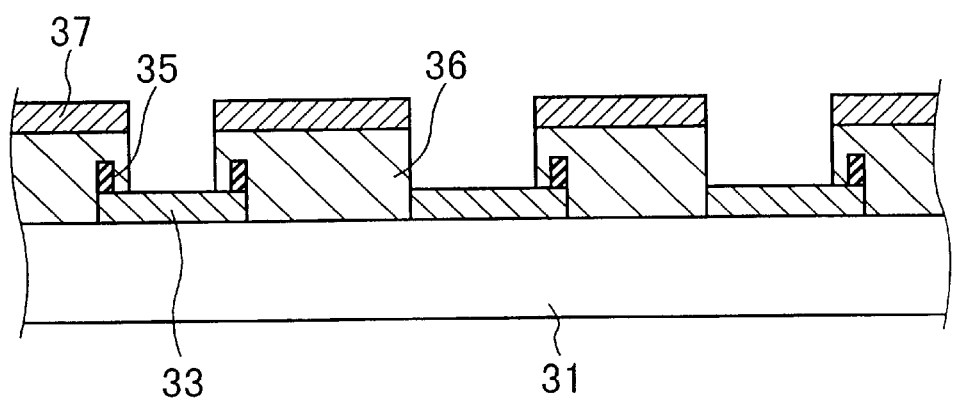
Figure 13O:
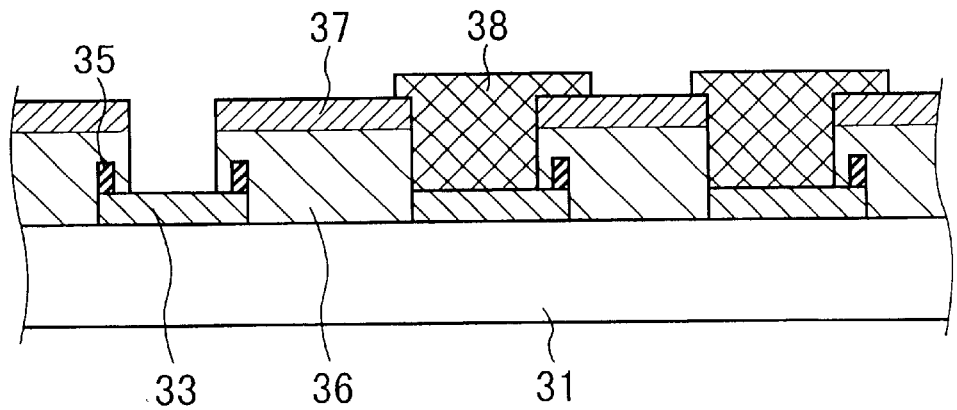

FIG. 12 shows a cross section for a main portion of an electro-optical element according to this example and FIG. 13A through FIG. 13O show fabrication steps for this example. FIG. 6 shows the outline for the entire constitution in a cross sectional view. This example is an embodiment of applying the present invention to the same optical filter (electrochemical light control element) as explained for FIG. 3 and FIG. 4. This example is to be explained referring to each of the drawings.

Also in this example, as shown in FIG. 6, a pair of transparent substrates (for example, glass substrates) 4 and 5 constituting a cell were disposed at a predetermined distance, and pairs of working electrodes (for example, ITO electrodes) 2a, 2b, 2c, 2d and 2e; and 3a, 3b, 3c, 3d and 3e were opposed to each other on the inner surfaces (opposing surfaces) of each of the substrates 4 and 5. The substrates 4 and 5 were kept at a predetermined distance by spacers 6, between which a silver salt solution was sealed as an electrolyte 1. Reference 20 denotes a light shielding material, particularly, a black resist (refer to FIG. 12 for the detailed structure for this portion). A working electrode to which a lead electrode of this example was formed is shown by reference 2A in FIG. 12, which is a constitutional view for a main portion. The lead electrode is shown at 35. As detailed in FIG. 12, lead electrode 35 was kept from direct contact with a light shielding material 20 (black resist 37) by the presence of an insulation film 36 comprising $SiO_2$ in this embodiment.

That is, in this example, the portion of the lead electrode for the working electrodes 2a–2e and 3a–3e were covered with a cover layer comprising the insulation film. Specifically, the lead electrode was covered with silicon dioxide ($SiO_2$).

As also shown in FIG. 12, the lead electrode 35 was formed also to a counter electrode 17A in the same manner as for the working electrode 2A, which was covered with an insulation layer comprising $SiO_2$ or a first layer constituting the counter electrode 17A, so that it was not in direct contact with the black resist 20, nor in contact with the electrolyte upon assembling an appended cell.

In this example, counter electrodes 17A and 17B disposed to the outer circumference of the working electrodes 2a–2e and 3a–3e were constituted by the fabrication method described below.

The planar shape for the working electrodes 2a–2e and 3a–3e and the counter electrodes 17a and 17b was substantially identical with that shown in FIG. 4.

Fabrication steps for the working electrodes 2a–2e and 3a–3e, and the counter electrodes 17a and 17b of the appended cell in this example is to be explained with reference to FIG. 13A to FIG. 13O.

In addition to the working electrode and the counter electrode, a reference electrode 27A for monitoring the potential of both or either of the electrodes can also be disposed for controlling driving of the element and the fabrication method for the reference electrode is in accordance with the fabrication method for the counter electrode described below and explanation is to be made assuming that the reference electrode 27A is disposed.

At first, after forming an ITO film 33 to a thickness of about 200 nm on a substrate 31 shown in FIG. 13A by a sputtering method, a chromium film 32 was coated further thereon to a thickness of about 200 nm also by the sputtering method (FIG. 13B). A photoresist 34 was coated upon the substrate by a spin coating (FIG. 13C) and then exposed/developed to a desired pattern by using a predetermined photomask (FIG. 13D). Thickness of the photoresist 34 was about 1 $\mu$m (here and hereinafter).

Then, etching was applied to a portion of the chromium layer 32 and, further, etching was applied for the ITO film 33 by a mixed acid of hydrochloric acid and nitric acid (FIG. 13E). Subsequently, the remaining photoresist was peeled to form a portion of a working electrode 2A and a portion of a counter electrode 17A and, if necessary, a portion of a reference electrode 27A (FIG. 13F) into a desired planer shape.

Then, a photoresist 34 was coated again (FIG. 13G), exposed/developed by using a different photomask (FIG. 13H), etching was applied again for chromium to form a lead electrode 35 on each of the electrodes (FIG. 13I).

After peeling the photoresist 34 again (FIG. 13J), silicon dioxide, in this case, was formed as an insulation film 36 by a sputtering method so as to cover the entire surface for each of the electrodes (FIG. 13K). The film thickness of silicon dioxide was 750 nm in average.

Subsequently, a light sensitive black resist 37 comprising propylene glycol monomethyl ether as a main ingredient was coated about 2 $\mu$m in thickness (here and hereinafter) for light shielding by a spin coating method so as not to allow light to permeate through portions other than the working electrode 2A (FIG. 13L). Further, exposure/development were conducted by using a further photomask to expose the working electrode 2A, the counter electrode 17A and the reference electrode 27A to obtain a desired substrate (FIG. 13M).

Then, the insulation film 36 (silicon dioxide) on the surface of the electrode portion not covered with the black resist was etched using a liquid mixture of hydrofluoric acid and ammonium fluoride (each at about 15% by weight) to expose the ITO surface of the electrode portion (FIG. 13N).

Subsequently, paste comprising a carbon material and a cellulosic binder in which a silver powder (1 to 3 $\mu$m grain size) was dispersed by the same weight as the weight of carbon, 10% by weight, was screen printed to the counter electrode 17A and the reference electrode 27A to form the electrodes 38 (FIG. 13O).

The substrate applied with the desired pattern through the fabrication steps as described above were appended by way of the spacers such that the working electrodes 2a–2e, and 3a–3e, the counter electrodes 17a and 17b, as well as the reference electrodes 27a and 27b were opposed to each other as shown in FIG. 6 and FIG. 12, and the electrolyte 1 was sealed at the inside to prepare a light control element according to Example 1 of the present invention.

For the electrolyte 1, the silver salt solution, 500 mM of silver bromide and 750 mM of sodium iodide dissolved in a mixed solvent of dimethylsulfoxide (DMSO)/acetonitrile (AN)=55/45, was used.

Further, a cell of Comparative Example 1 was fabricated by using substrates by way of the steps as shown in FIGS.

14A and 14B, without forming the insulation layer of silicon dioxide in FIG. 13K.

A constant current was supplied between ITO electrodes 2a, 2b, 2c, 2d and 2e; and 3a, 3b, 3c, 3e and 3e as the working electrodes and the counter electrodes 17a and 17b of the light control element formed by appending the substrates in Example 1 and Comparative Example 1 described above, to deposit and dissolve the electrodeposits comprising silver on the ITO electrodes. The current was supplied at a density of 18 mA/cm$^2$ at the ITO electrode for 2 sec both for deposition and dissolution. This was defined as one cycle for deposition and dissolution.

The electrodeposits comprising silver could be deposited/dissolved with no trouble even by repeating the deposition/dissolution cycle by a number of times in the cell of Example 1, whereas the electrodeposit was deposited unevenly and often resulted in completely non-dissolved portions on the surfaces of the working electrodes even when the electrodes were polarized greatly to the oxidation direction the cell of Comparative Example 1.

When the virgin ITO surface on the working electrode of Comprehensive Example 1 was examined by X-ray photoelectron spectroscopy (XPS), peaks attributable to carbon that exhibits the presence of organic materials was observed. It was confirmed that carbon comprised about 70 atm % in average in the elemental composition on the surface of the ITO of Comparative Example 1.

Figure 14A:
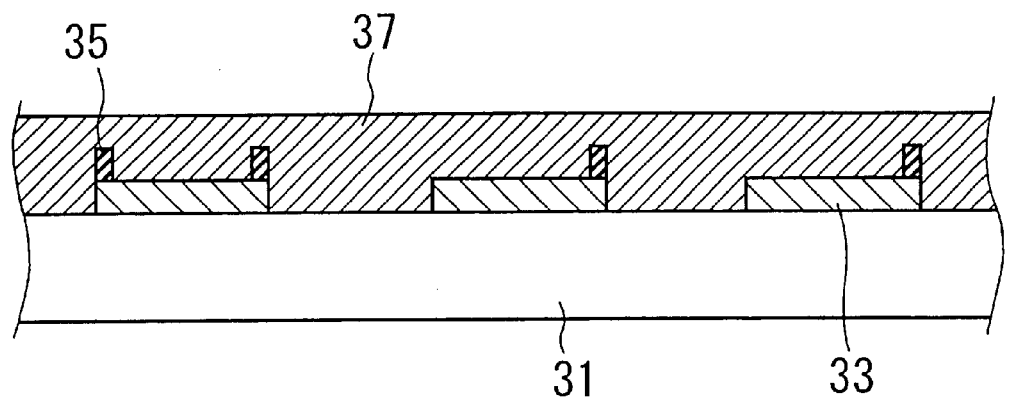
FIG. 14A and FIG. 14B are cross sectional views illustrating the steps of fabricating a working electrode, a counter electrode and a reference electrode in Comparative Example 1 successively.
Figure 14B:
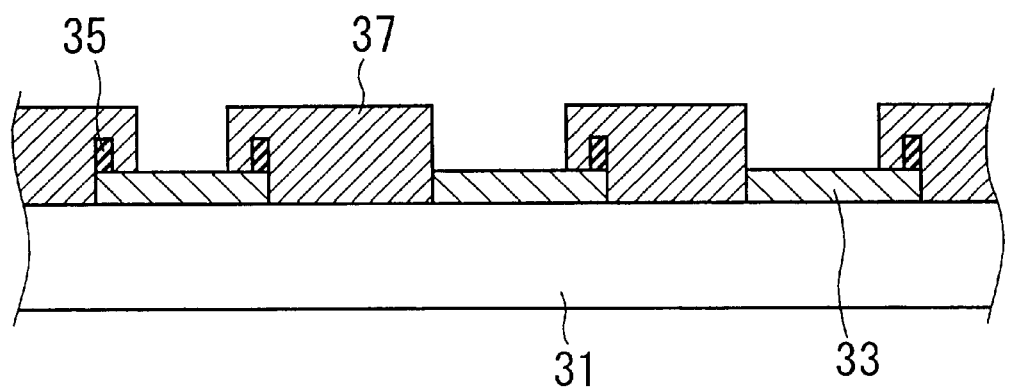

In Comparative Example 1, as shown in FIG. 14A, since the surface of each electrode, particularly, the surface of ITO 33 of the working electrode 2A was in direct contact with the black resist 37, it was estimated that organic materials on the ITO surface could not be removed completely even by way of the subsequent developing step.

On the contrary, in Example 1, as shown in FIG. 13L through FIG. 13O, since the surface of ITO 33 of the working electrode 2A was not in direct contact with the black resist, residues such as of organic materials were not left on ITO and uneven or undissolved electrodeposits were not formed.

Further, it was also suggested by the analysis for the virgin ITO surface by X-ray photoelectron spectroscopy that the carbon content was at a level below the detectable sensitivity and residues of the organic material were not present in Example 1.

As has been described above, it was possible according to the present invention to eliminate residues of the black resist on the ITO surface and obtain a light control element with no uneven deposition or undissolved deposition including silver as in this example.

Further, bubbles were evolved from the black resist when a potential of 3 V or higher relative to the reference electrode was applied to the working electrode and decomposition products of the black resist causes a reaction such as discoloration of the surrounding electrolyte in Comparative Example 1, whereas such reaction did not occur in Example 1. In Example 1, since the lead electrode was covered with silicon dioxide that has a high insulation withstand voltage and is also electrochemically stable, the voltage was applied to the silicon dioxide layer and no high voltage was applied to the black resist, the reaction described above no more occurred. Therefore, according to the present invention, it was possible to provide a long life optical device having stable characteristics.

As has been described above, $SiO_2$ was used as the material for the insulation film constituting the cover layer formed on the lead electrode in Example 1, but various other insulation materials could be used. The materials for the insulation film which could be used being formed on the lead electrode upon practicing the present invention are exemplified in the following Table 3. The materials for the insulation film described in the table can be etched, for example, with HF (hydrofluric acid), buffered HF, $H_3PO_4$ (phosphoric acid), $H_2SO_4$ (sulfuric acid) and NaOH (sodium hydroxide). Etchants usable for the etching of respective materials for the insulation film are also shown collectively in the following table.

TABLE 3

| Insulation material | HF | Buffered HF | $H_3PO_4$ | $H_2SO_4$ | NaOH | Others |
|---|---|---|---|---|---|---|
| $SiO_2$ | ○ | ○ | ○ | X | ○ | HF gas |
| SiO | X | X | X | X | X | HF + $NHO_3$, $NH_4F$ + KOH |
| $TiO_2$ | ○ | ○ | ○ | X | ○ | |
| $Ta_2O_5$ | ○ | ○ | ○ | ○ | ○ | KOH + $H_2O_2$ |
| $ZrO_5$ | ○ | X | ○ | ○ | X | |
| $Al_2O_3$ | ○ | ○ | ○ | X | X | $H_3PO_4$ + $CrO_3$ |
| PSG | ○ | ○ | ○ | X | ○ | |
| BSG | ○ | ○ | ○ | X | ○ | |
| AsSG | ○ | ○ | ○ | X | ○ | |
| AlSG | ○ | ○ | ○ | X | ○ | |
| PbSG | ○ | ○ | ○ | X | ○ | $HNO_3$ |
| GaAs oxide | X | X | X | X | X | HCl |
| $Si_xO_yN_z$ | ○ | ○ | ○ | X | X | HCl |
| $Si_3N_4$ | ○ | ○ | ○ | X | X | |
| $Si_xN_yH_z$ | ○ | ○ | ○ | X | X | |
| $Ge_3N_4$ | ○ | ○ | ○ | ○ | ○ | $HNO_3$ |
| $HfO_2$ | ○ | ○ | ○ | X | X | |
| $Nb_2O_5$ | ○ | X | ○ | ○ | ○ | |
| $GeO_2$ | Δ | X | ○ | ○ | ○ | HCl |

In the table, ○: etchable, X: not etchable, Δ: etchable only hexagonal system.

Further, metal compounds could also be used as the material for covering the lead electrode. The following Table 4 shows examples of various metal compounds including oxides that could be used being formed on the lead electrode upon practicing the present invention. When the metal compounds cited herein were used as the insulation materials, the effect of the present invention was also able to be provided effectively. Etching solutions and conditions therefor in this case are also shown collectively in the following Table 4. In Table 4, "normal temperature" is also called "room temperature", which means the temperature around 23° C.

TABLE 4

| Metal Compound | Etching solution | Temperature |
|---|---|---|
| $AgO_2$ | $NH_4OH$ | normal temperature |
| | KCN (10%) | normal temperature |
| $CrO_3$ | Mixture of $Ce(NH_4)_2(SO_4)_3$/nitric acid | normal temperature |

TABLE 4-continued

| Metal Compound | Etching solution | Temperature |
|---|---|---|
| $Cr_2O_3$ | Mixture of $Ce(NH_4)_2(SO_4)_3$/nitric acid | normal temperature |
| CuO | Hydrochloric acid | normal temperature |
| FeO | Diluted hydrofluoric acid | normal temperature |
| $Fe_2O_3$ | Hydrochloric acid | normal temperature |
| $MoO_3$ | Mixture of $NH_4OH$/hydrogen peroxide (mixing ratio 9:1) | normal temperature |
| PbO | Nitric acid | normal temperature |
| $WO_3$ | $Na_2O_2$ (20%) | 200° C. |
| CuSi | Electrolytic etching in aqueous solution of NaCl (application voltage different depending on Si amount) | normal temperature |
| CoSi | Electrolytic etching in aqueous solution of NaCl or sodium sulfate solution | normal temperature |
| CrSi | Mixed acid of phosphoric acid/nitric acid/hydrofluoric (mixing ratio: 60:5:1) | normal temperature |
| CrSiO | Hydrochloric acid or sulfuric acid | 50–70° C. |
| NiSi | Electrolytic etching in aqueous solution of NaCl or sodium sulfate solution | normal temperature |
| WC | Electrolytic etching in an aqueous solution of NaOH and NaW (21 V) | normal temperature |

Further, the insulation film described above can also be formed with organic polymers. More specifically, polymeric materials such as polyimide resin, polyamide resin or polyamideimide resin were available suitably as the material for forming the insulation film.

The organic polymers could be formed to a layer of a desired thickness by dilution with an appropriate organic solvent and using a coating method such as a spin coating or printing method using a screen plate. Nitric acid was used preferably for etching and etching could be conducted under the temperature condition at about 60° C. These resins can maintain the cleanness of the surface of each electrode.

The effect of the present invention was also obtainable by the placing each of the materials for the insulation film described above with $SiO_2$. This was identical for this example and other examples. Further, in practicing the present invention, the insulation film is not restricted to a single layer but it may be formed as a plurality of layers by appropriately selecting a plurality of materials among the materials described above.

Example 2

Example 2 is to be explained. This example had a schematic constitution also as shown in FIG. 6. In this example, counter electrodes 17a and 17b and reference electrodes 27a and 27b of cell substrates were formed by physical vapor deposition of platinum in FIG. 13A to FIG. 13O for Example 1. FIG. 15A to FIG. 15H are referred to.

Also in this example, lead electrode portions for the working electrodes 2a–2e and 3a–3e were covered with a cover layer comprising an insulation film. Specifically, the lead electrode was covered with silicon dioxide but other insulative materials may be used as described above.

In this Example 2, the steps in and after FIG. 13K for Example 1 are altered as below.

Figure 15A:
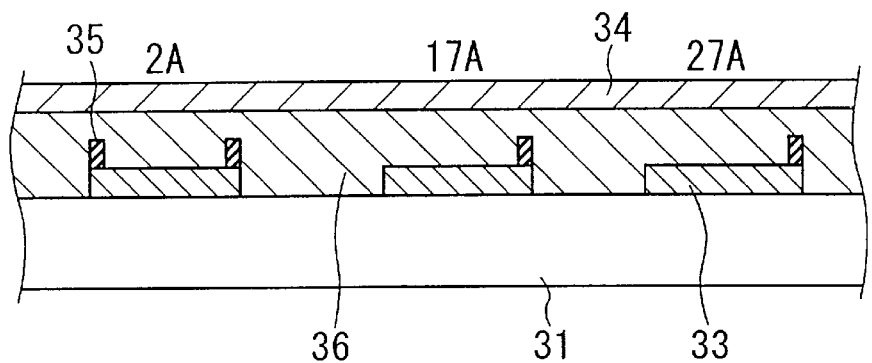
FIG. 15A through FIG. 15H are cross sectional views illustrating the steps of fabricating a working electrode, a counter electrode and a reference electrode in Example 2 according to the present invention successively.
Figure 15B:
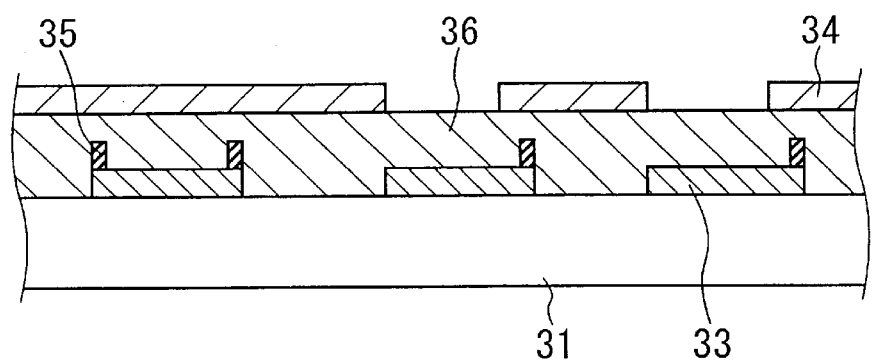
Figure 15C:
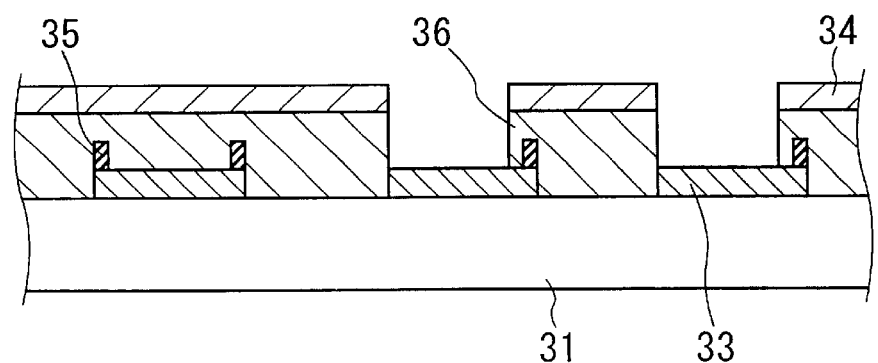

That is, a photoresist 34 was coated by a spin coating method (FIG. 15A), and only the portions for the counter electrode 17A and the reference electrode 27A were opened by exposure/development (FIG. 15B).

Figure 15D:
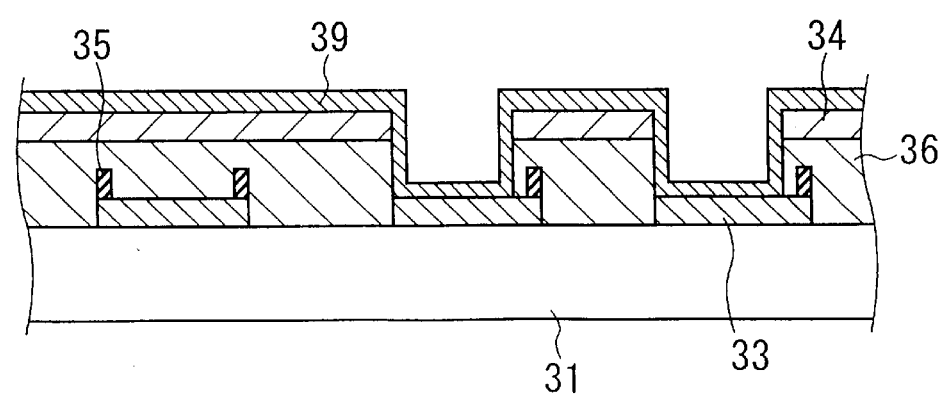

Then, silicon dioxide 36 was removed only for the opened portions by the etching solution (FIG. 15C) and, in this state, platinum as the high melting metal 39 was physically vapor deposited by using an electron beam (FIG. 15D).

Figure 15E:
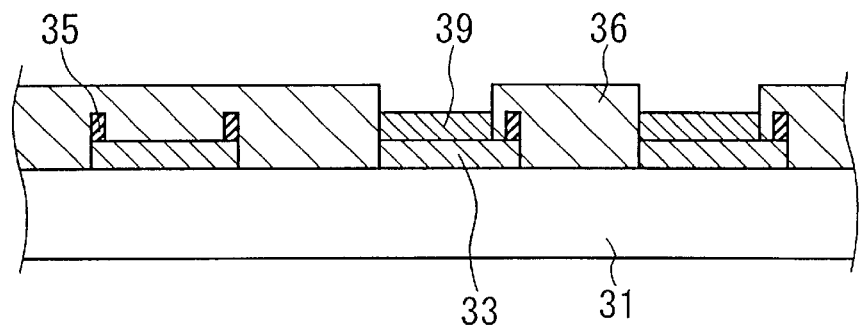
Figure 15F:
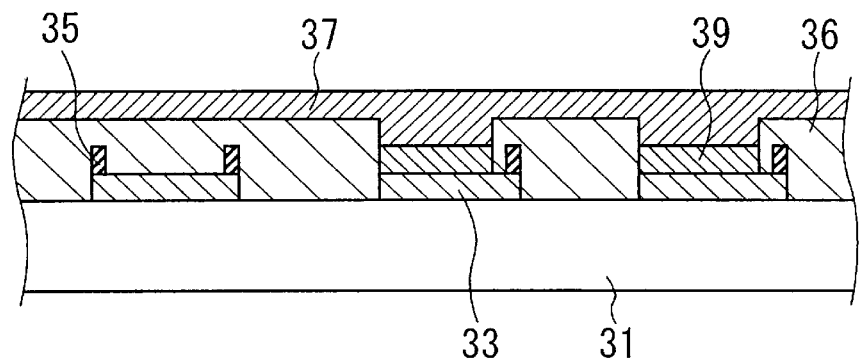

Subsequently, the photoresist 34 and high melting metal 39 (platinum film) thereon were removed by lift-off using a peeling solution (acetone) and ultrasonic cleaning (FIG. 15E).

Figure 15G:
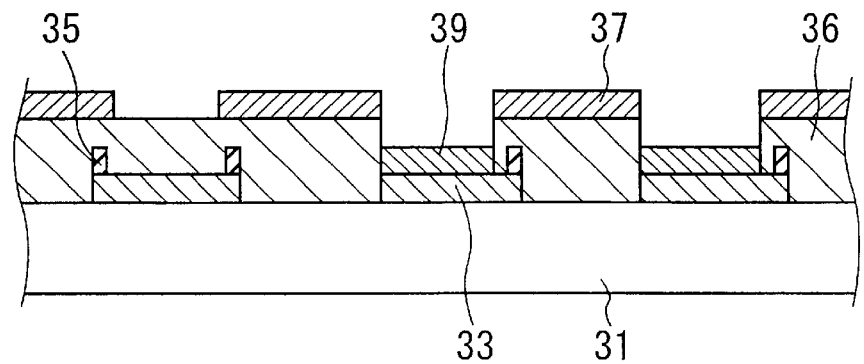

Then, a light sensitive black resist 37 was coated by a spin coating method (FIG. 15F) and exposure/development were applied to remove the black resist for the electrode portions (FIG. 15G).

Figure 15H:
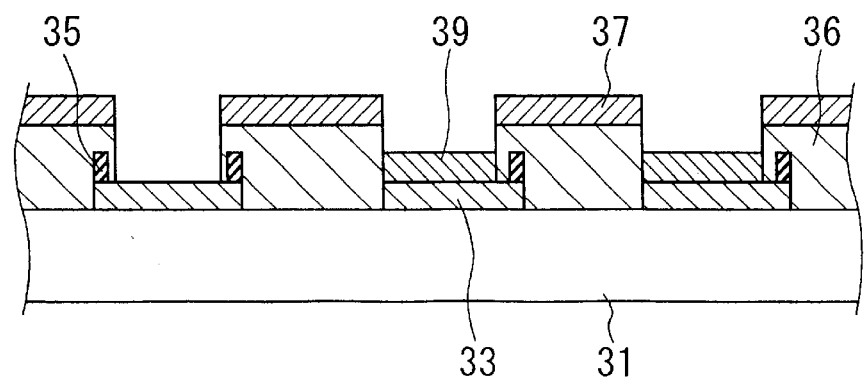

Finally, silicon dioxide 36 at the portion for the working electrode 2A was etched to obtain a desired substrate. The final structure is shown in FIG. 15H.

Figure 16A:
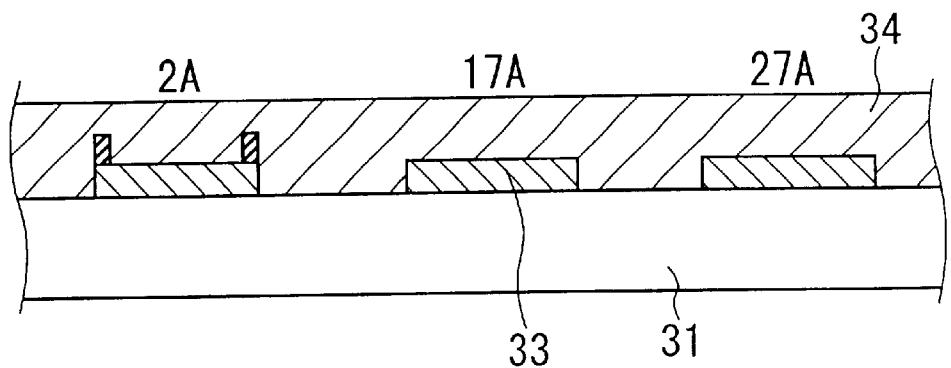
FIG. 16A through FIG. 16F are cross sectional views illustrating the steps of fabricating a working electrode, a counter electrode and a reference electrode in Comparative Example 2 successively.
Figure 16B:
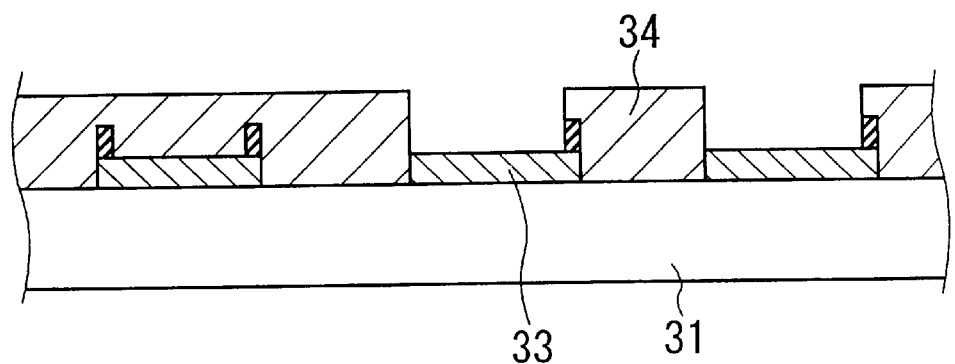

Further, in Comparative Example 2, the device was formed without disposing the insulation layer of silicon dioxide in FIG. 13K and by way of the same steps as those in Example 2 subsequently. The steps are shown in FIG. 16A to and FIG. 16F.

Figure 16C:
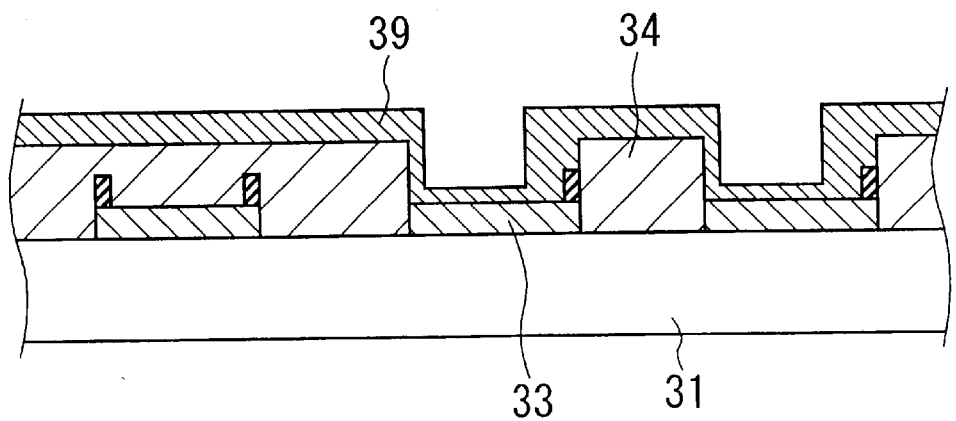
Figure 16D:
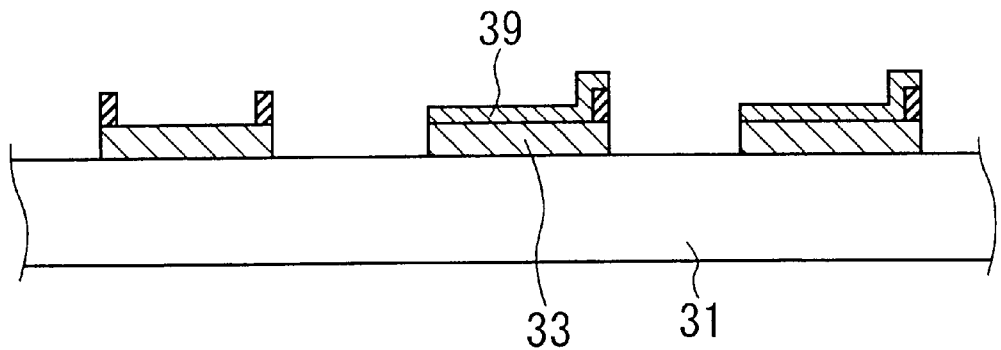
Figure 16E:
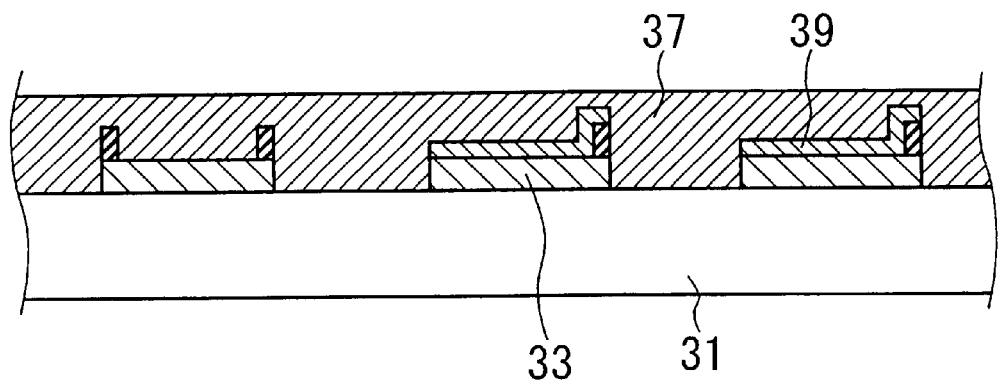
Figure 16F:
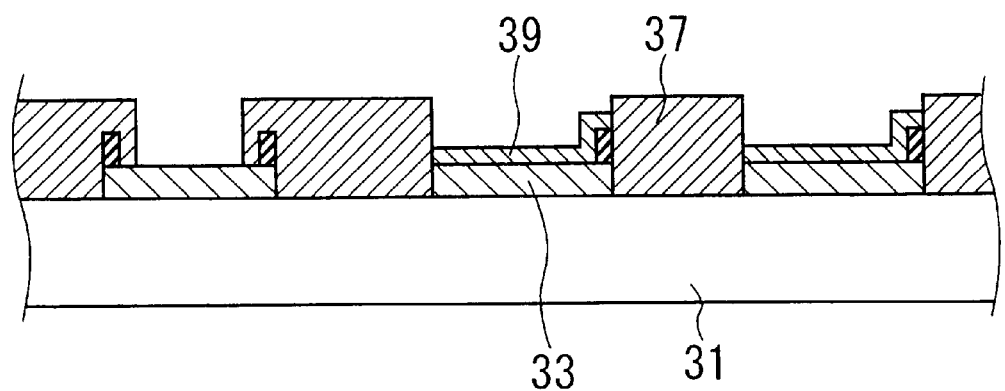

In Example 2 and Comparative Example 2, the melting point of platinum constituting the counter electrode 17A and the reference electrode 27A is as high as 1769° C., and the photoresist 34 was cured upon physical vapor deposition of platinum by the radiation heat. Particularly, when it was adhered directly to ITO on the working electrode 2A as shown in FIG. 16C, the cured photoresist was less peeled in the subsequent lift-off process.

Depending on the case, the photoresist 34 was cracked and vaporized platinum intruded through the cracks. In such a case, intruding platinum was physically deposited on the ITO surface of the working electrode. Platinum on the ITO surface was also less removed.

On the contrary, in the example according to the present invention in which silicon dioxide as the insulation material (insulation film 36) was coated over the entire surface including ITO by the sputtering method, when the insulation layer on the ITO surface was etched, residues of the resist or fine platinum particles described above were removed simultaneously not being left on the ITO surface and undissolved electrodeposits including silver was not observed in subsequent deposition/dissolution.

When electrodeposition/dissolution reaction was repeated on the ITO surface as in Comparative Example 2, undissolved deposition occurred around the residue or particle of the resist and platinum as nuclei. While platinum is effective for the physical modification of the ITO surface as described previously, it has to be applied uniformly. Since platinum particles were scattered not uniformly over the ITO surface in Comparative Example 2, this gave an undesired effect on the characteristics as the optical device.

As has been described above according to the present invention, it was possible to provide an optical device having excellent characteristics in which residues of the photoresist for ITO on the working electrode were not left upon occurrence of heat cure of the photoresist and undissolved deposition did not occur upon electrochemical deposition/dissolution.

Further, with a constitution described above, it was possible to obtain a light control element in which no black resist residue remained on the ITO surface and undissolved deposition did not occur on the ITO surface, either.

Further, like that in Example 1, also in a case of applying a voltage at 3 V or higher relative to silver, reactions such as bubbling from the black resist or discoloration of the surrounding electrolyte were not taken place, either, making it possible to provide a long life optical device having stable characteristics.

Example 3

Then, Example 3 is to be explained. In this example, the cover layer was formed not only with the insulation film but also including another layer different from the insulation film. This example was also constituted like in Example 2, such that platinum was physically vapor deposited on the counter electrodes 17a and 17b, and the reference electrodes 27a and 27b of the cell substrate in FIG. 13A to FIG. 13O illustrating Example 1.

In Example 3, the steps in and after FIG. 13K for Example 1 were altered as below. Explanation is to be made with reference to FIG. 17A to FIG. 17J.

Figure 17A:
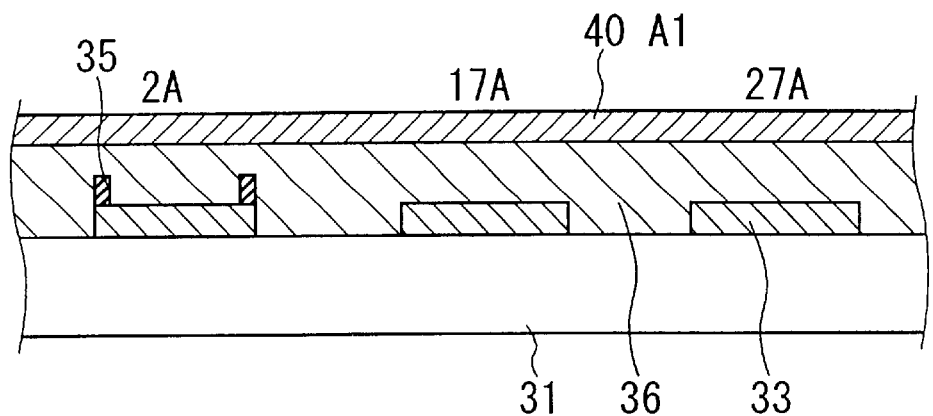
FIG. 17A through FIG. 17J are cross sectional views illustrating the steps of fabricating a working electrode, a counter electrode and a reference electrode in Example 3 according to the present invention successively.
Figure 17B:
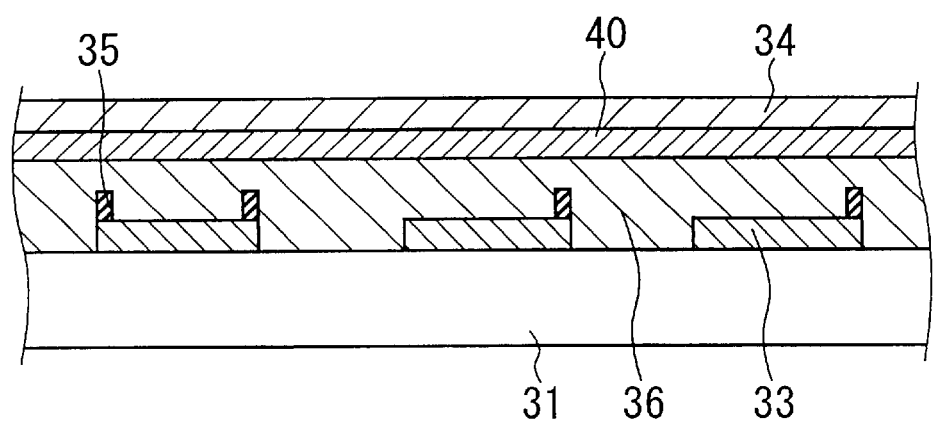

That is, after forming the insulation film 36 of silicon dioxide in FIG. 13K, aluminum was sputtered as a layer 40 different from the $SiO_2$ insulation film 36 to a thickness of about 200 nm by a sputtering method so as to cover the entire surface with a cover layer consisting of two layers (FIG. 17A).

Figure 17C:
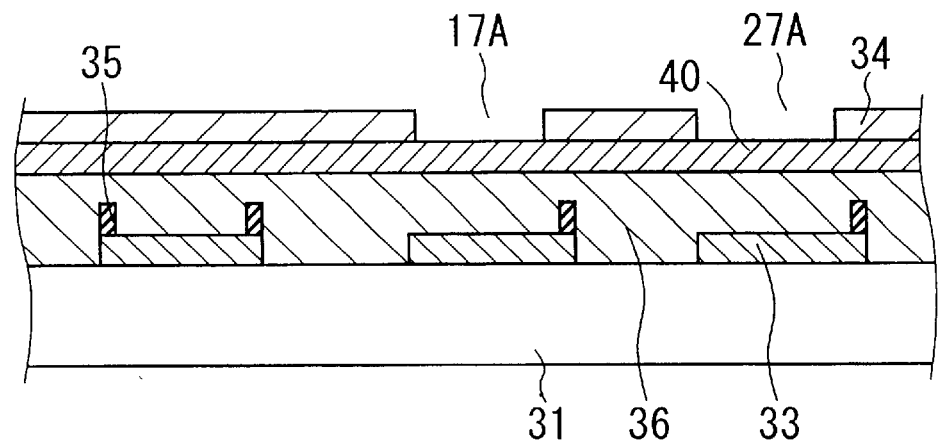

Then, a photoresist 34 was coated by a spin coating method (FIG. 17B), and only the portion for the counter electrode 17A and the reference electrode 27A were opened by exposure/development (FIG. 17C).

Figure 17D:
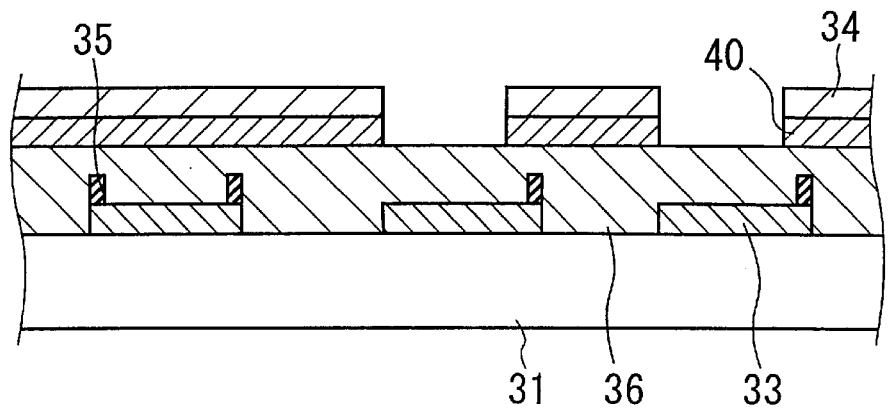
Figure 17E:
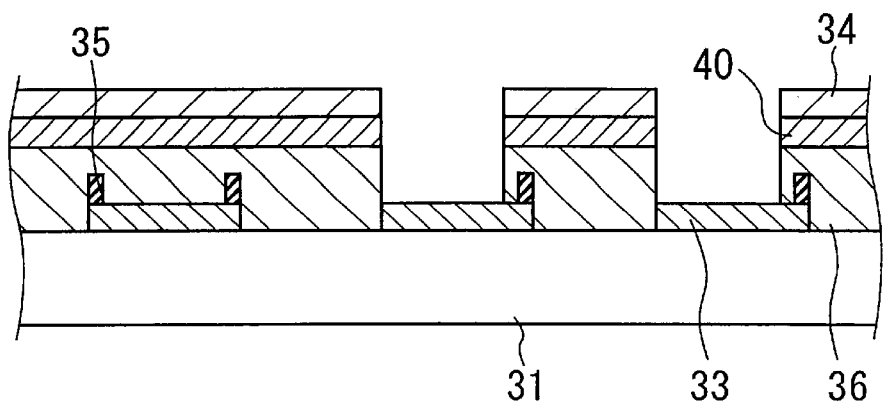
Figure 17F:
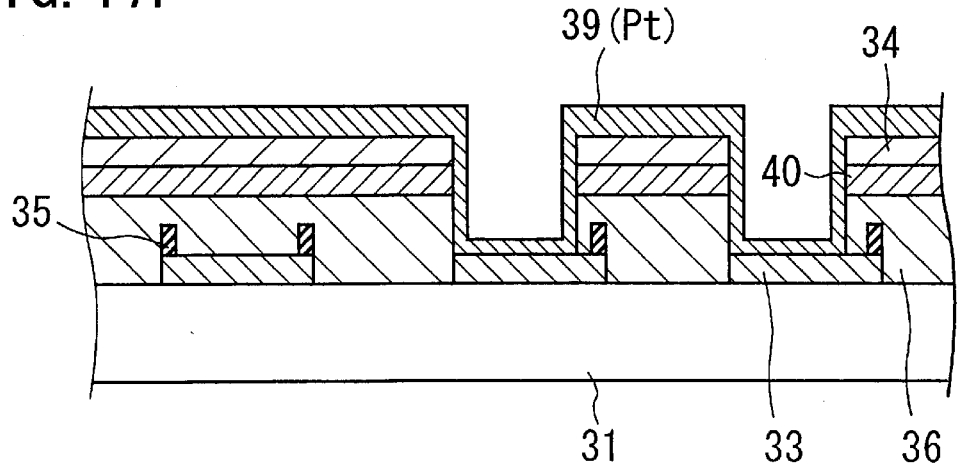

Then, the aluminum layer 40 for the portion of the counter electrode 17A and the reference electrode 27A was etched, for example, with a mixed acid adjusted within a range of phosphoric acid from 70.1 to 74.1%, sulfuric acid from 2.4 to 3.4% and acetic acid from 9.5 to 11.5% at a temperature of 50° C. using the patterned photoresist 34 as a mask (FIG. 17D). Then, the silicon dioxide insulation film 36 was further removed by the etching solution as described in Example 1 (FIG. 17E) and, in this state, platinum as a high melting metal 39 was physically vapor deposited (FIG. 17F).

Figure 17G:
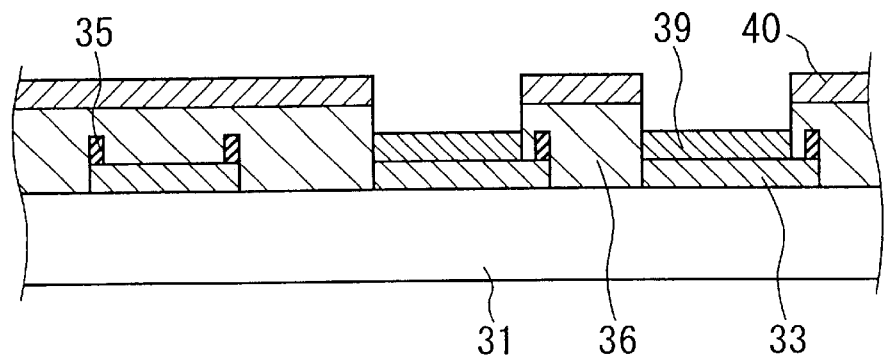
Figure 17H:
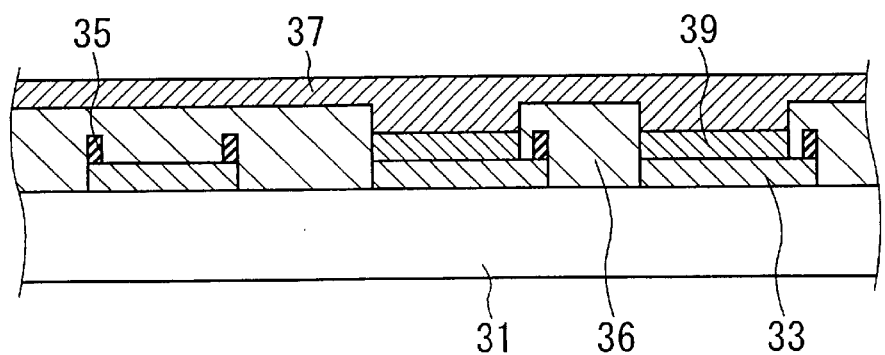

Then, the photoresist 34 and the high melting metal 39 (platinum film) thereon were removed by lift-off using an peeling solution (acetone) and ultrasonic waves (FIG. 17G).

Figure 17I:
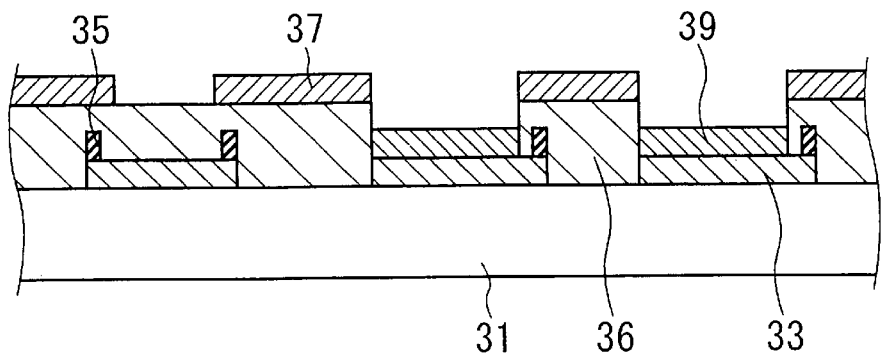

Then, after removing the aluminum layer entirely by etching, a light sensitive black resist 37 was coated by a spin coating method (FIG. 17H) and exposure/development were applied to remove the black resist for the electrode portions (FIG. 17I).

Figure 17J:
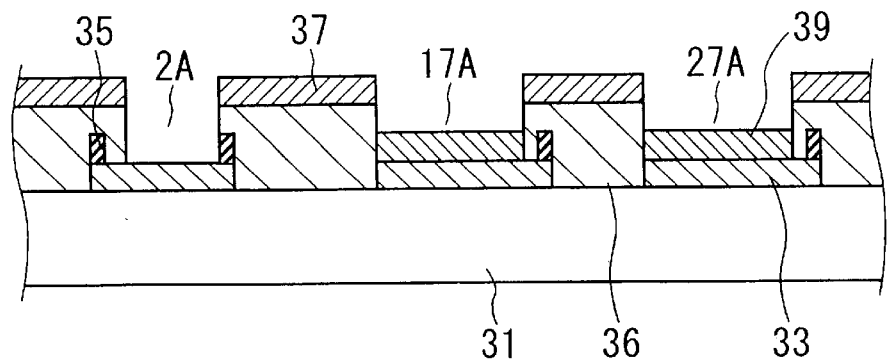

Finally, the silicon dioxide insulation film 36 for the portion of the working electrode 2A was etched to obtain a desired substrate. The final structure is shown in FIG. 17J.

Also in Example 3, since the melting point of platinum constituting the counter electrode 17A and the reference electrode 27A is high (1769° C.), the photoresist 34 was cured upon physical vapor deposition of platinum by radiation heat thereof. Particularly, when it was adhered directly to ITO on the working electrode 2A as in Comparative Example 2, the cured photoresist was less peeled.

Depending on the case, the photoresist 34 was cracked and vaporized platinum intruded through the cracks. In such a case, intruding platinum was physically deposited on the ITO surface of the working electrode in Comparative Example 2. Platinum particles on the ITO surface was also less removable.

On the contrary, in the example according to the present invention since silicon dioxide as the insulation material (insulation film 36) was coated over the entire surface including ITO by the sputtering method, and further the aluminum layer was disposed thereon, residues of the resist or fine platinum particles described above were not left and undissolved electrodeposits were not observed in subsequent deposition/dissolution on the working electrode.

As has been described above according to the present invention, it was possible to provide an optical device having excellent characteristics in which residues of the photoresist for ITO on the working electrode were not left upon occurrence of heat cure of the photoresist and undissolved deposition did not occur upon deposition/dissolution.

Further, with a constitution described above, it was possible to obtain a light control element in which no black resist residue remained on the ITO surface and undissolved deposition did not occur on the ITO surface.

Further, like that in Example 1, also in a case of applying a voltage at 3 V or higher relative to the reference electrode, reactions such as bubbling from the black resist or discoloration of the surrounding electrolyte were not taken place, making it possible to provide a long life optical device having stable characteristics.

As has been described above in this example, a different film was formed further on the insulation film to constitute a cover layer and aluminum was used as the material for the different film but, in addition, various kinds of metals, alloys, metal compounds and insulators could also be used.

The materials usable for the material constituting the cover layer could include metals such as titanium (Ti), zirconium (Zr), tantalum (Ta), chromium (Cr), molybdenum (Mo), tungsten (W), manganese (Mn), iron (Fe), cobalt (Co), nickel (Ni), palladium (Pd), copper (Cu), silver (Ag), gold (Au), zinc (Zn), tin (Sn) and lead (Pb) in addition to titanium (Ti). The effect of using such materials was identical with that of aluminum. When such materials were used, etching could be applied by using the etching solutions and under the conditions (application voltage, temperature) as shown in the following Table 5.

TABLE 5

| Metal | Etching solution | Temperature |
|---|---|---|
| Titanium | Hydrofluoric acid or mixed acid of hydrofluoric acid/nitric acid (mixing ratio: 1:2) | normal temperature |
| Zirconium | Mixed acid of hydrofluoric acid/nitric acid (mixing ratio: about 1:5) | normal temperature |
| Tantalum | Mixture of sodium hydroxide and hydrogen peroxide (mixing ratio: 9:1) | 90° C. |
| Chromium | Mixed acid of ferric chloride (III)/hydrochloric acid (mixing ratio: 2:1) | 80° C. |
|  | Diluted hydrochloric acid or diluted nitric acid | normal temperature |
| Molybdenum | Mixed acid of phosphoric acid/nitric acid/acetic acid (mixing ratio: 38:15:30) | normal temperature |
| Tungsten | Aqueous solution containing $KH_2PO_4$ 34 g, KOH 13.4 g, $K_3Fe(CN)_6$ 33 g dissolved per 1 liter | normal temperature |
| Manganese | Mixed acid of ferric chloride (III)/hydrochloric acid | normal temperature |
|  | Nitric acid | normal temperature |
| Iron | Mixed acid of nitric acid and hydrochloric acid (mixing ratio: 3:7) | 60–70° C. |
|  | Aqueous solution of potassium aluminum sulfate (concentration 10%) | normal temperature |
| Nickel | Ferric chloride (III) | normal temperature |
| palladium | Mixed acid of hydrochloric acid/nitric acid/acetic acid (mixing ratio: 1:10:10) | normal temperature |
| Copper | Ferric chloride (III) | normal temperature |
|  | Mixed acid of nitric acid/phosphoric acid/acetic acid (mixing ratio: 4:11:5) | 60–70° C. |
| Silver | Aqueous solution of iron nitrate (11 g of iron nitrate dissolved in 9 ml water) | 44–49° C. |
|  | Nitric acid | 39–49° C. |
| Gold | Aqueous solution of potassium iodide and iodine (4 g potassium iodide and 1 g iodide dissolved in 40 ml water) | normal temperature |
| Zinc | Nitric acid | 38–49° C. |
| Tin | Ferric chloride (III) | 36–42° C. |
| Lead | Ferric chloride (III) | 36–42° C. |

Further, if the electrolytic etching was conducted for the element, metals such as vanadium (V), niobium (Nb) or indium (In) could also be used in addition to the metals described above. The etching solutions and conditions (applied voltage, temperature) are as shown in the following Table 6.

TABLE 6

| Metal | Etching solution | Applied voltage | Temperature |
|---|---|---|---|
| Vanadium | Mixed acid of perchloric acid/acetic acid (mixing ratio: 1:10) | 50–60 V | normal temperature |
| Niobium | Mixed acid of butiric acid/sulfuric acid/hydrofluoric acid (mixing ratio: 2:1:1) | 15–20 V | normal temperature |
| Cobalt | Mixture of hydrochloric acid/ethanol (mixing ratio: 1:1) | 8–9 V | normal temperature |
| Indium | Mixture of hydrochloric acid and methanol (mixing ratio: 1:3) | 30–40 V | normal temperature |

Further, in case of no requirement for considering the cost, rare metals such as hafnium (Hf), rhenium (Re), ruthenium (Ru), osmium (Os), rhodium (Rh), iridium (Ir), platinum (Pt), thallium (Tl), bismuth (Bi), selenium (Se) and polonium (Po) could also be used.

Further, metals such as cadmium (Cd), arsenic (As), antimony (Sb) and tellurium (Te) could also be used with an utmost care for the toxicity.

Further, materials used for covering the insulation film to constitute the cover layer was able to include alloys (containing inter-metal compounds) in addition to the metals described above. For instance, various alloys such as nickel-chromium (Ni—Cr) alloy, niobium-tin (Nb—Sn) alloy could also be used. Etching solutions and conditions (application voltage, temperature) therefor are as shown in the following Table 7.

TABLE 7

| Alloy | Etching solution | Applied voltage | Temperature |
|---|---|---|---|
| Nickel-chromium | Ferric chloride (III) | — | 36° C. |
| Niobium-tin | Mixed acid of sulfuric acid/nitric acid/fluoric acid (mixing ratio: 5:4:1) | 12 V | normal temperature |

Furthermore, as the materials for covering the insulation film for constituting the cover layer semiconductor materials materials, etching solutions and conditions (temperature) therefor are shown in the following Table 8 and Table 9.

TABLE 8

| Semiconductor | Etching solution | Temperature |
|---|---|---|
| GaAs | Mixture of sulfuric acid/hydrogen peroxide (mixing ratio: 4:1) | 50° C. |
|  | 1M NaOH and 0.76M aqueous hydrogen peroxide | 30° C. |
| GaP | Solution containing 1–20% bromine dissolved in methanol | normal temperature |
| AlN | 10% NaOH solution | 30–80° C. |
| BN | Phosphoric acid or aqueous hydrogen peroxide (3%) | 200° C. |
| BP | Electrolytic etching in 10% NaOH (0.1–10 A/cm$^2$) | normal temperature |
| AlSb | Treated with HF, $H_2O_2$ and then with HCl, $HNO_3$ | normal temperature |
| GaN | 50% NaOH | normal temperature |
| GaSb | Solution of 1 to 20% bromine dissolved in methanol | normal temperature |
| InAs | Solution containing bromine dissolved in mixed acid of nitric acid/hydrofluoric acid/acetic acid | normal temperature |
| InP | Solution containing 1 to 10% bromine dissolved in methanol | normal temperature |
| InSb | Solution containing iodine dissolved in methanol (optional concentration) | normal temperature |
| BeO | 10% KOH solution | normal temperature |
| CdO | Aqueous ammonia | normal temperature |
| CdS | Sulfuric acid (16N) containing 0.5M potassium permanganate | 95° C. |
| CdSe | Mixed acid of nitric acid/sulfuric acid/acetic acid/hydrochloric acid (mixing ratio: 30:20:10:0.1) | 40° C. |
| CdTe | Solution containing 0.5% bromine dissolved in methanol | normal temperature |
| CdTe-HeTe | Mixed acid of nitric acid/hydrochloric acid (mixing ratio: 6:1) | normal temperature |
| HgSe | Mixed acid of nitric acid/sulfuric acid/acetic acid/hydrochloric acid (mixing ratio: 50:20:10:1) | normal temperature |

TABLE 9

| Semiconductor | Etching solution | Temperature |
|---|---|---|
| HeTe | Mixed acid of nitric acid/hydrochloric acid (mixing ratio: 6:1) | normal temperature |
| ZnO | Ammonium chloride solution | normal temperature |
| ZnTe | Mixed acid of hydrofluoric acid/nitric acid (mixing ratio: 4:3) | normal temperature |
| $Ag_2Se$ | Mixture of sulfuric acid/hydrogen peroxide (mixing ratio: 5:1) | normal temperature |
| $Ag_2Te$ | Mixture of $NH_4OH$/hydrogen peroxide (mixing ratio: 3:2) | normal temperature |
| $Bi_2Se_3$ | Mixed acid of nitric acid/hydrochloric acid (mixing ratio: 2:1) | normal temperature |
| $Hg_{1-x}Cd_xTe$ | Solution containing 20% bromine dissolved in methanol | normal temperature |
| ITO | Hydrochloric acid | normal temperature |
|  | Sulfuric acid | 50–60° C. |
| $In_2Te_3$ | Solution containing bromine dissolved in acetic acid (mixing ratio: 19:1) | normal temperature |
| $In_2Te_{3-x}Sb_x$ | Solution containing bromine dissolved in mixed acid of citric acid/nitric acid/hydrofluoric acid (mixing ratio: 4:3:1) | normal temperature |
| PbS | Mixed acid of hydrochloric acid/nitric acid/acetic acid (mixing ratio: 30:10:1) | normal temperature |
| PbSe | Mixture of KOH/ethylene glycol/hydrogen peroxide (mixing ratio: 5:5:1) | normal temperature |
| PbTe | Mixture of ethanol/KOH/glycerol | normal temperature |
| $Pb_{1-x}Sn_xSe$ | Mixture of ethylene glycol/KOH/hydrogen peroxide (mixing ratio: 10:10:1) | normal temperature |
| $Pb_{1-x}Sn_xTe$ | Mixture of hydrogen bromide/bromine (mixing ratio: 95:5) | normal temperature |
| $SnO_2$ | zinc powder dispersed in hydrochloric acid | normal temperature |

1) $0 < x < 1$ could be used. For example, semiconductor materials based on silicon or semiconductor materials based on materials other than silicon was able to be used.

Semiconductor materials based on silicon and germanium could be etched easily at a normal temperature by an etching solution comprising hydrofluoric acid with addition of nitric acid or the like. While there are various other methods as the etching method of silicon and germanium, substantially identical effect was able to be obtained unless the device was heated considerably (specifically, for example, at a temperature lower than 200° C.).

Further, in addition to the semiconductor materials based on silicon or germanium, other semiconductor materials such as compound semiconductor materials could also be used in the present invention. Various semiconductor Further, as the material for covering the insulation film for constituting the cover layer, materials for insulation film shown in Tables 3 and 4 could be used being stacked as a matter of fact. In this case, while the material for the insulation film for covering the lead electrode and material for the insulation film formed thereon might be identical or different with each other, generally, they were preferably different from each other for taking advantage of the merits in both of the materials.

In the foregoing explanation, descriptions have been made for the method of fabricating the materials for the insulation film and other materials constituting the cover layer by fabrication with etching technology using etching solutions, etching may be applied by other methods. For example, etching could be applied by using the method such as ion milling utilizing plasmas such as of gaseous fluorine.

The effect of the present invention was able to be provided substantially identically also by such a method.

The different kind of cover layer used for covering the insulation film explained above could be used for the element by proceeding the foregoing steps while leaving the cover layer as it was and, finally, removing only the effective region for electrodepositing/dissolving the material containing metal by etching or the like upon driving of the optical device unless the electrolyte taking place reaction with the cover layer spontaneously, since the insulation film was interposed between the cover layer and the lead electrode. Further, in case of the material being reactive with the electrolyte with which the material was in contact after assembling the cell, the cover layer might be previously removed entirely as shown in Example 3.

Examples 4 to 7

Comparative Examples 3 to 9

Figure 3:
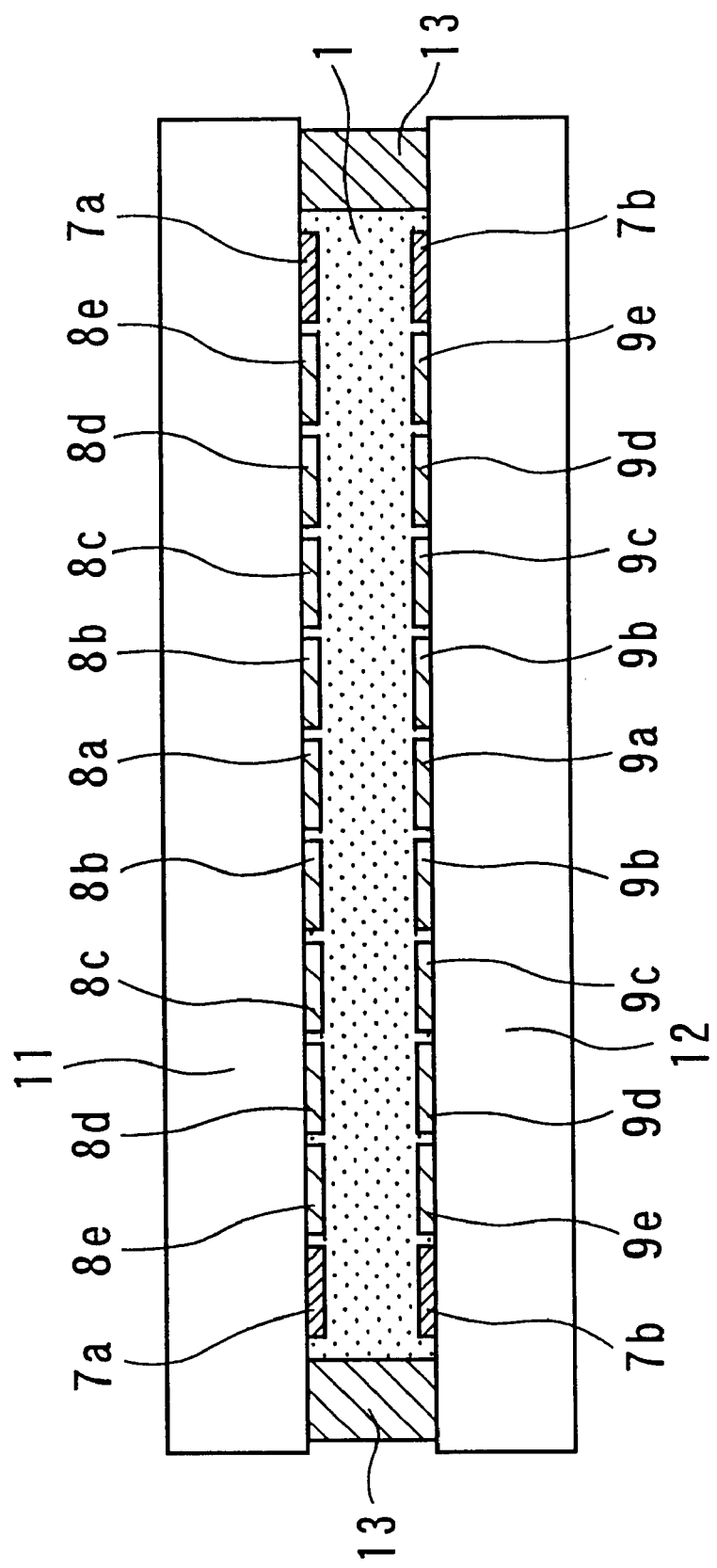
FIG. 3 is an enlarged cross sectional view illustrating the constitution of another existent optical device.

An embodiment of applying the present invention to an optical filter (electrochemical light control element) like that explained for FIG. 3 to FIG. 4 is to be explained with reference to FIG. 6.

In this example, as shown in FIG. 6, a pair of transparent substrates 4 and 5 made of glass constituting the cell were disposed at a predetermined gap. Pairs of working electrodes 2a, 2b, 2c, 2d and 2e, and 3a, 3b, 3c, 3d and 3e were opposed to each other on the inner surfaces (opposed surfaces) of each of the substrates 4 and 5, and counter electrodes 17a and 17b and reference electrodes 27a and 27b were disposed to the outer circumference thereof. The substrates 4 and 5 were kept at a predetermined distance by spacers 6 between which a silver salt solution was sealed as an electrolyte 1.

In this example, the working electrodes 2a to 2e and 3a to 3e and the counter electrodes 17a and 17b are constituted as described below. That is, an ITO film was formed on the substrates 4 and 5 to a thickness of about 250 to 450 nm by a sputtering method to form a collector layer. The planer shape for the working electrodes 2a–2e and 3a–3e, as well as the counter electrodes 17a and 17b was substantially identical with that shown in FIG. 4.

Fabrication steps for the working electrodes 2a–2e and 3a–3e and the counter electrodes 17a and 17b of the appended cell in the example are to be explained with reference to FIG. 18A to FIG. 18O. In addition to the working electrodes and the counter electrodes, reference electrodes 27A may also be provided for monitoring the potential of both or either of the electrodes in order to control driving of the element. The fabrication method for the reference electrodes was in accordance with the fabrication method for the counter electrodes described below.

Figure 18A:
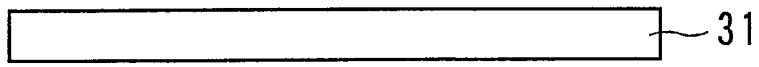
FIG. 18A through FIG. 18F are cross sectional views illustrating the steps of fabricating an optical filter in Example 4 through Example 7 successively.

At first, a transparent conductive film 33 varied for the elemental composition ratio of indium and tin was formed to a thickness of about 250 to 450 nm on a substrate 31 shown in FIG. 18A by a sputtering method. Sputtering was conducted by using a polycrystal material with varied In/Sn compositional ratio as a target. Some properties of the sputtered film thus formed are as shown in Table 10.

The film compositions in the table were analyzed by atomic absorption spectrometry.

TABLE 10

| | Film thickness (nm) | Surface resistivity ($\Omega/cm^2$) | Film composition (In:Sn wt %) | In/Sn ratio (element ratio) |
|---|---|---|---|---|
| Comp. Example 3 | 420 | 3.7 | 89.9:10.1 | 8.9 |
| Comp. Example 4 | 430 | 3.8 | 88.2:11.8 | 7.5 |
| Comp. Example 5 | 420 | 4.2 | 86.1:13.9 | 6.2 |
| Comp. Example 6 | 370 | 9.5 | 80.8:19.2 | 4.2 |
| Comp. Example 7 | 390 | 14.0 | 75.0:25.0 | 3.0 |
| Comp. Example 8 | 400 | 18.0 | 66.6:33.4 | 2.0 |
| Comp. Example 9 | 410 | 19.0 | 59.2:37.0 | 1.6 |
| Example 4 | 360 | 20.0 | 58.0:41.0 | 1.4 |
| Example 5 | 260 | 32.0 | 35.0:65.0 | 0.54 |
| Example 6 | 320 | 140.0 | 20.8:79.2 | 0.26 |
| Example 7 | 400 | 210.0 | 0.0:100 | 0.0 |

Figure 18B:
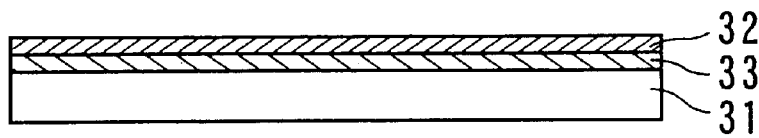
Figure 18C:
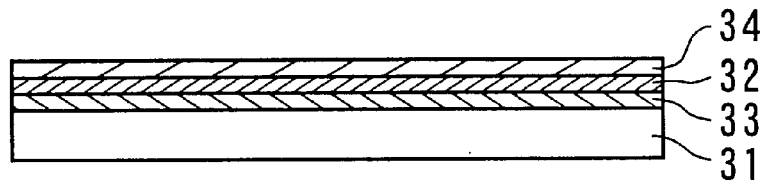
Figure 18D:
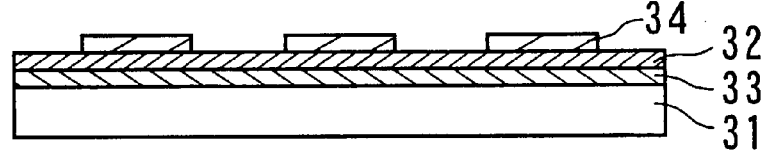

Then, a chromium film 32 was formed on the transparent conductive film 33 to a thickness of about 200 nm also by the sputtering method (FIG. 18B). A photoresist 34 was coated on the substrate by a spin coating method (FIG. 18C) and exposed/developed to a desired pattern by using a predetermined photomask (FIG. 18D).

Figure 18E:
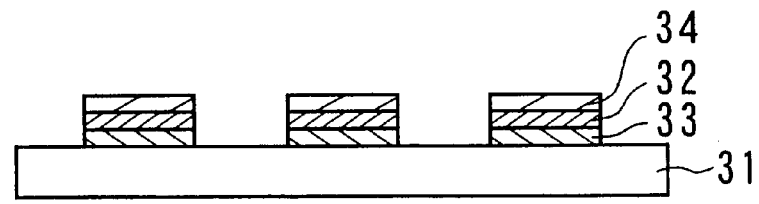
Figure 18F:
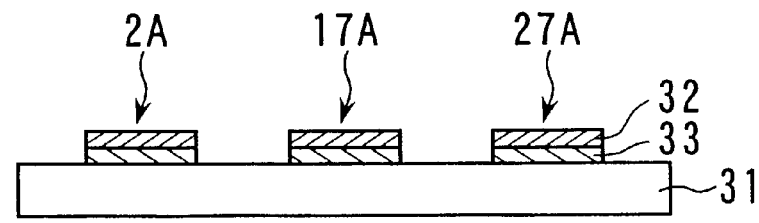

Subsequently, the chromium layer 32 was partially etched and, further, the transparent conductive film layer 33 was etched while varying the In/Sn ratio with a mixed acid of hydrochloric acid and nitric acid (FIG. 18E). Further, in Example 4 and Example 5 at a high tin content, the transparent conductive film layer 33 was etched by properly using ion milling together (high frequency voltage was applied to the substrate in a plasma atmosphere to collide ions and etching was applied by physical action thereof). Subsequently, remaining resist was peeled to form a working electrode 2A and a counter electrode 17A and, if necessary, a reference electrode 27A each of a predetermined planer shape (FIG. 18F).

Figure 18G:
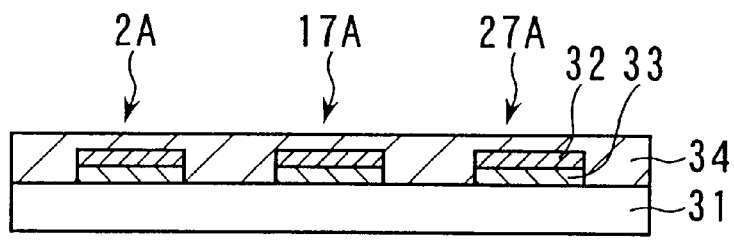
FIG. 18G through FIG. 18L are schematic views illustrating other steps of the fabrication method in Example 4 through Example 7 successively.
Figure 18H:
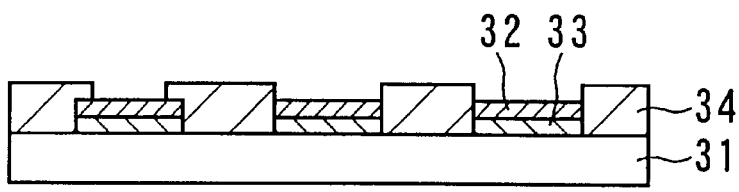
Figure 18I:
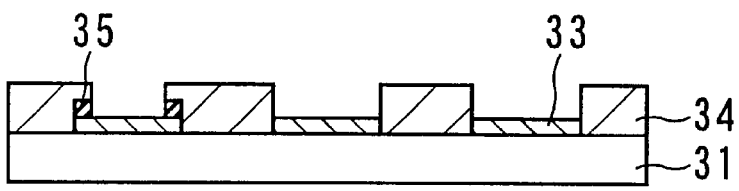

Then, a photoresist 34 was coated again (FIG. 18G), exposure/development were applied by using a different mask (FIG. 18H) and chromium was etched again to form a lead electrode 35 on each electrode. The lead electrode 35 is shown only on the working electrode 2A in the drawing, whereas not shown for the counter electrode 17A and the reference electrode 27A (FIG. 18I). However, the counter electrode 17A and the reference electrode 27A have the same constitutions as those of Example 1.

Figure 18J:
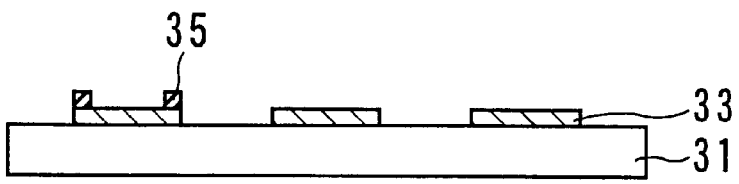
Figure 18K:
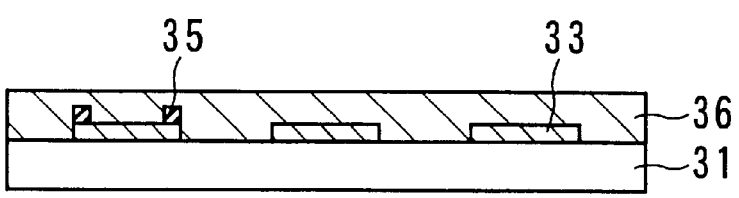

After peeling the photoresist 34 again (FIG. 18J), a film of silicon dioxide 36 was formed by a sputtering method like that in Example 1 to Example 3 to cover the entire surface of each electrode (FIG. 18K).

Figure 18L:
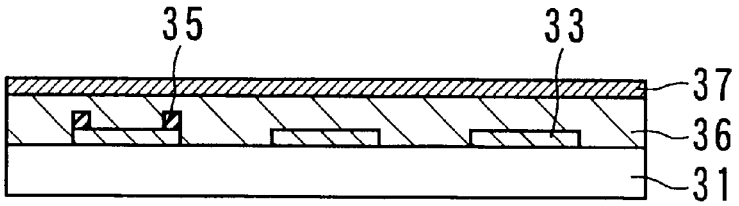
Figure 20:
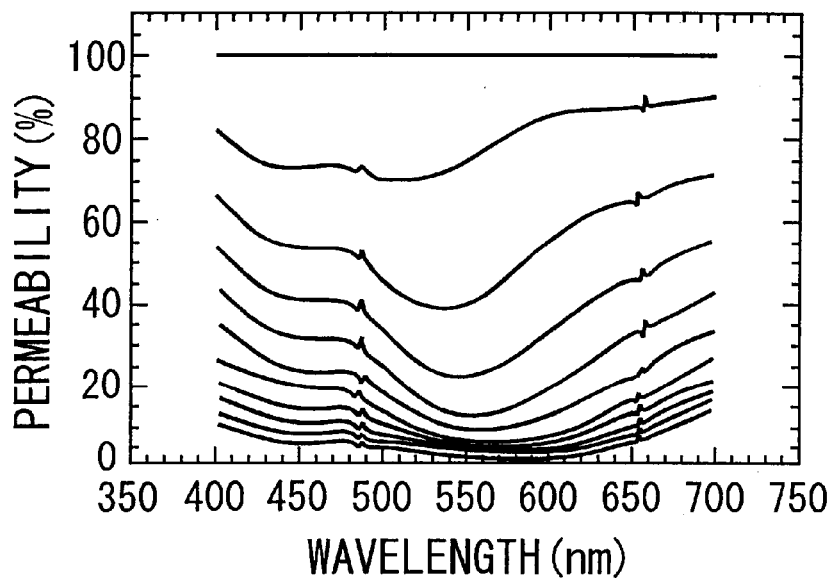
FIG. 20 is a graph showing the spectral characteristics upon electrodeposition on a working electrode in Comparative Example 4.
Figure 21:
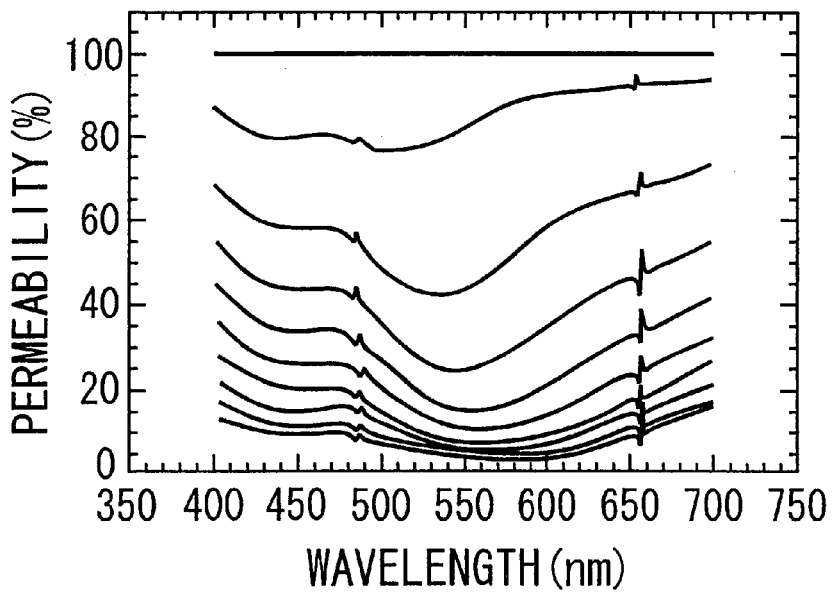
FIG. 21 is a graph showing the spectral characteristics upon electrodeposition on a working electrode in Comparative Example 5.
Figure 22:
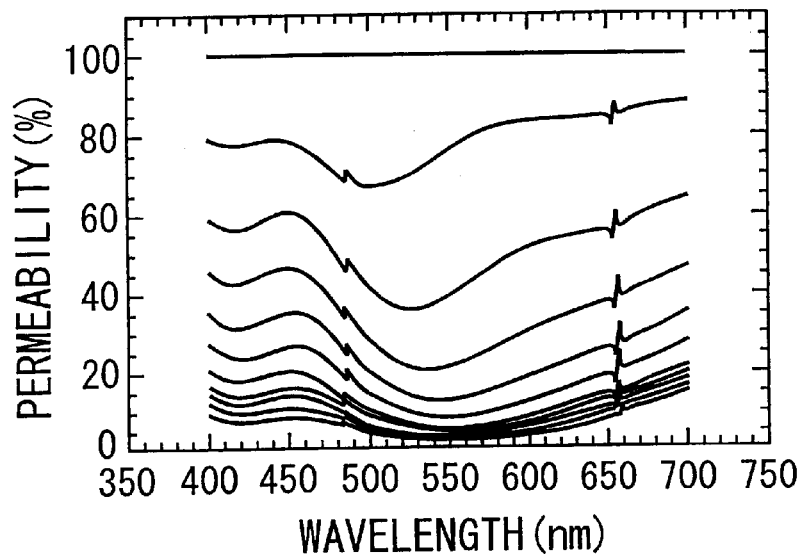
FIG. 22 is a graph showing the spectral characteristics upon electrodeposition on a working electrode in Comparative Example 6.
Figure 23:
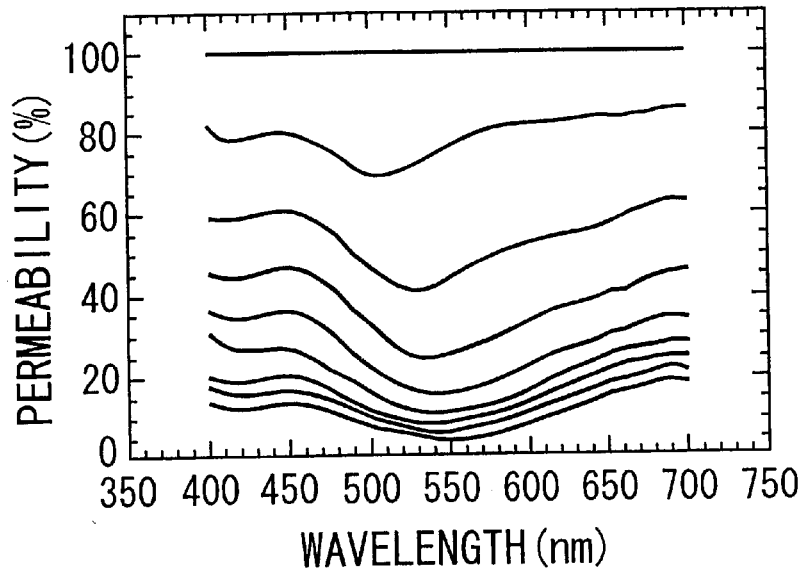
FIG. 23 is a graph showing the spectral characteristics upon electrodeposition on a working electrode in Comparative Example 7.
Figure 24:
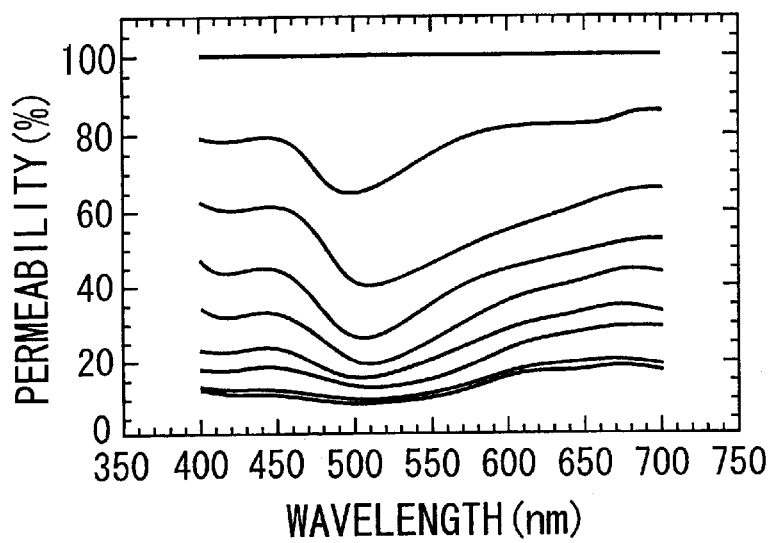
FIG. 24 is a graph showing the spectral characteristics upon electrodeposition on a working electrode in Comparative Example 8.
Figure 25:
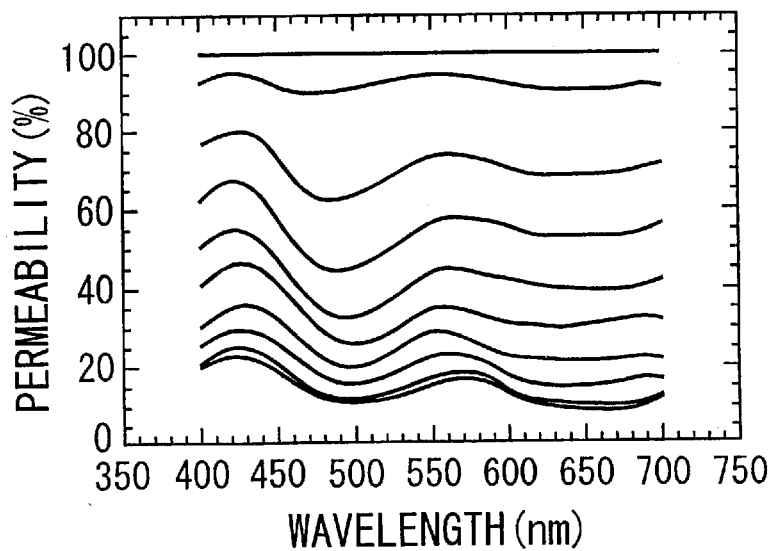
Figure 26:
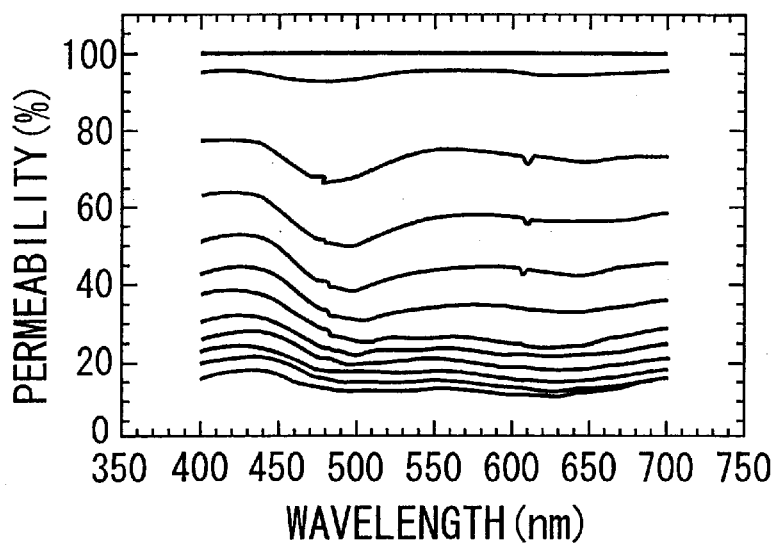
FIG. 26 is a graph showing the spectral characteristics upon electrodeposition on a working electrode in Example 4.
Figure 27:
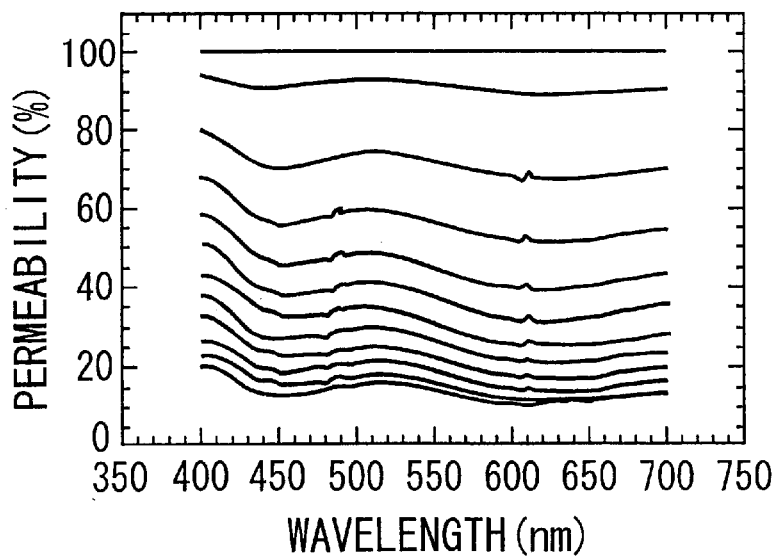
FIG. 27 is a graph showing the spectral characteristics upon electrodeposition on a working electrode in Example 5.
Figure 28:
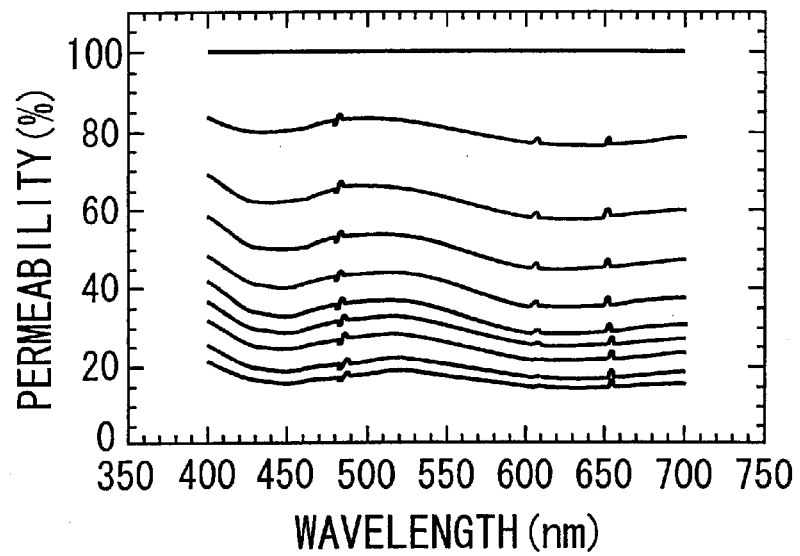
FIG. 28 is a graph showing the spectral characteristics upon electrodeposition on a working electrode in Example 6.
Figure 29:
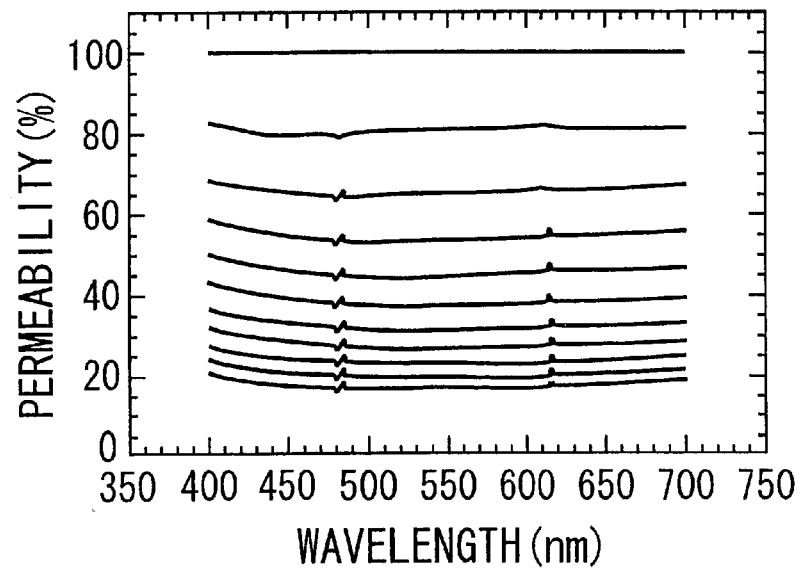
FIG. 29 is a graph showing the spectral characteristics upon electrodeposition on a working electrode in Example 7.

Then, although not shown entirely in FIGS. 7A and 7B, a black resist 37 for light shielding was coated by a spin coating method in order not to allow light to permeate through the portion other than the working electrode 2A (FIG. 18L). Further, the working electrode 2A, the counter electrode 17A and the reference electrode 27A were exposed by applying exposure/development using another photomask to obtain a desired substrate (FIG. 18M).

Then, silicon dioxide on the surface of the electrode portion (not covered with the black resist) was etched with a mixed solution of hydrofluoric acid and ammonium fluoride (both at about 15 wt %) to expose the surface of the transparent conductive film for the electrode portion (FIG. 18N).

Subsequently, a paste 38 comprising a carbon material and a cellulosic binder in which silver powder (grain size 1–3 μm) dispersed in the same weight, 10% by weight, as that for carbon was screen printed to the counter electrode 17A and reference electrode 27A to form the electrodes (FIG. 18O).

An optical device was obtained by using the substrates applied with the desired pattern through the fabrication steps described above, which were arranged such that the working electrodes 2a–2e and 3a–3e, as well as the counter electrodes 17a and 17b were opposed to each other as shown in FIG. 7A, and appended by way of spacers and sealing a silver salt solution 1 at inside. For the silver salt solution 1, 500 mM of silver bromide and 750 mM of sodium iodide dissolved in a mixed solvent of dimethylsulfoxide (DMSO)/ dimethylacetoamide (DMAc)=50/50 was used.

A constant current was supplied between the ITO electrodes 2a, 2b, 2d, 2e and 2e, and 3a, 3b, 3c, 3d and 3e as the working electrodes, and the counter electrodes 17a and 17b of a light control element formed by appending the substrates to deposit and dissolve electrodeposits including silver on the ITO electrodes. Electric current was supplied for 2 sec both for deposition and dissolution at the current density of 18 mA/cm$^2$ in the ITO electrodes. This is defined as one cycle of deposition and dissolution.

FIG. 19 to FIG. 29 show spectral characteristics of each of transparent electrodes at a room temperature (22° C.). According to the graphs, it can be seen that while no improvement was shown for the spectral characteristics in the spectrum of FIG. 20 to FIG. 25, the spectrum was flattened and spectral characteristics were improved in FIG. 26 to FIG. 29 in which the In/Sn ratio (elemental ratio) was 1.5 or less.

Figure 30:
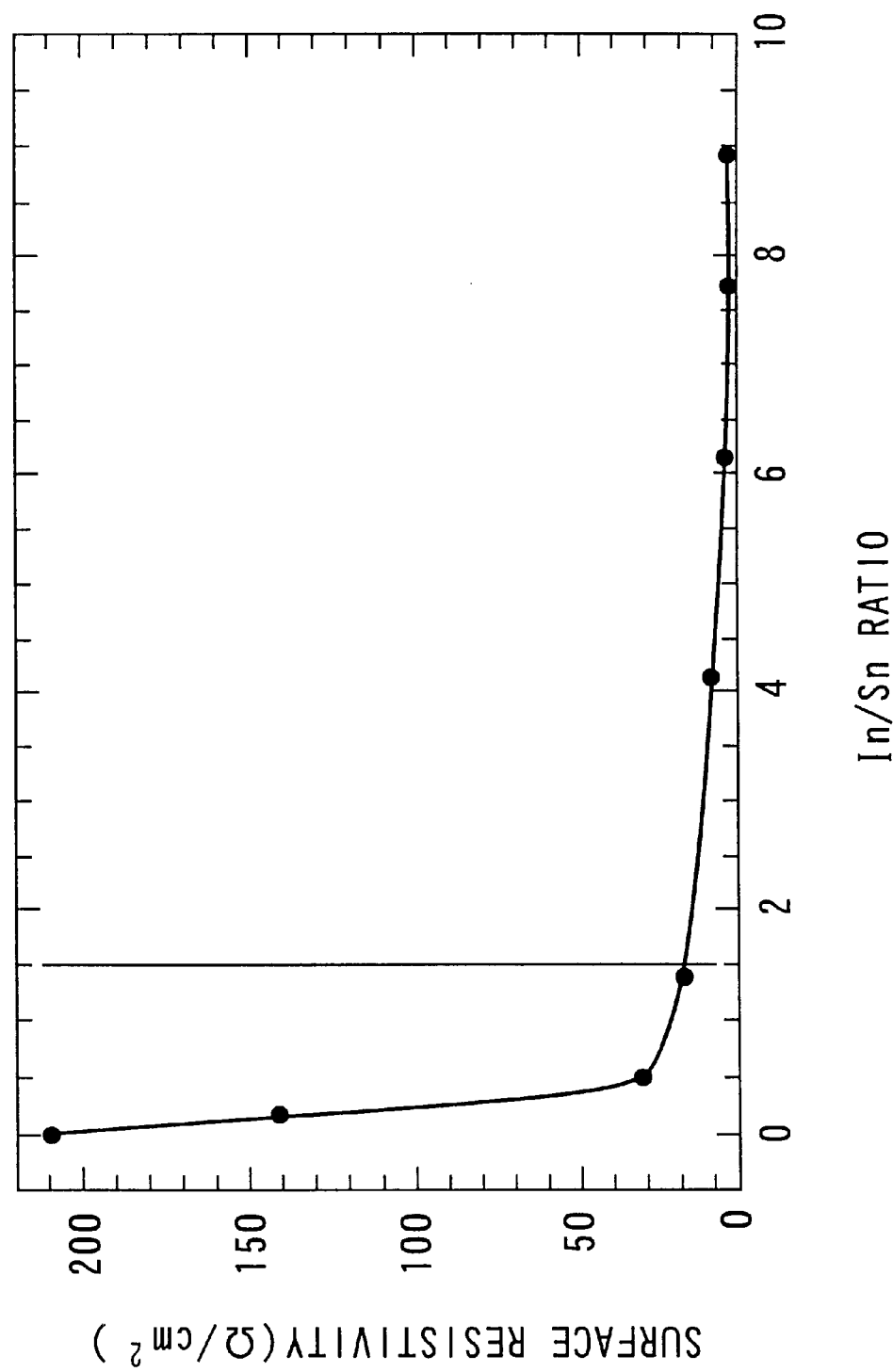
FIG. 30 is a graph illustrating a relationship between the In/Sn ratio and the surface resistivity constituting the working electrode.

Further, as shown in FIG. 30, the surface resistivity increased abruptly at the In/Sn ratio of the conductive film near 0.5. Increase in the surface resistivity leads to increase in the polarization during driving to increase the electric power consumption and, further, induction of side reaction at the working electrode. Accordingly, in order to suppress the polarization of the optical device according to the invention during driving, it is desirable that the In/Sn ratio is within a range from 0.5 to 1.5.

Examples 8–10

An embodiment of applying the present invention to an optical filter (electrochemical control element) like that explained for FIG. 3 to FIG. 4 is to be explained with reference to FIG. 7.

In the example, as shown in FIG. 7A, a pair of transparent substrates 4 and 5 made of glass constituting the cell were disposed at a predetermined gap. Pair of working electrodes 2a, 2b, 2c, 2d and 2e, and 3a, 3b, 3c, 3d and 3e were opposed to each other on the inner surfaces (opposed surfaces) of each of the substrates 4 and 5, and counter electrodes 17a and 17b and reference electrodes 27a and 27b were disposed to the outer circumference thereof. The substrates 4 and 5 were kept at a predetermined distance by spacers 6 between which a silver salt solution was sealed as an electrolyte 1.

Then, the working electrodes 2a–2e and 3a–3e described above were constituted as described blow. That is, as shown in the enlarged figure of FIG. 7B, a dual layer structure was provided by disposing a tin oxide layer on ITO of about 200 nm thickness (In/Sn=9) on the substrates 4 and 5 by a sputtering method. Three types of tin oxide layers were formed with a thickness of 5 nm in Example 8, 10 nm in Example 9 and 50 nm in Example 10. The planar shape for the working electrodes 2a–2e and 3a–3e, as well as the counter electrodes 17a and 17b was substantially identical with that shown in FIG. 4.

Figure 31A:
FIG. 31A through FIG. 31F are schematic cross sectional views illustrating the fabrication steps of the optical filter in Example 8 through Example 10 according to the present invention.
Figure 31B:
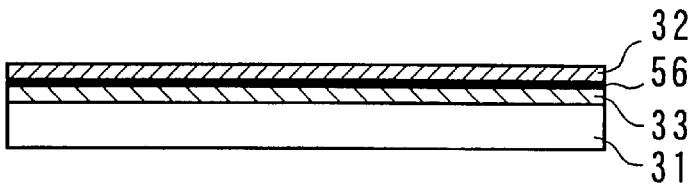
Figure 31C:
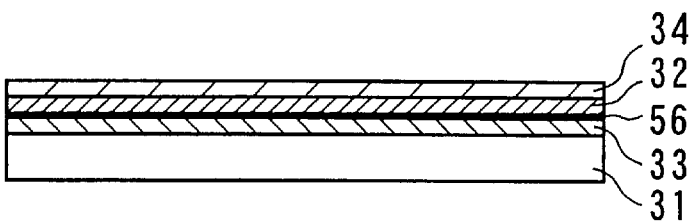
Figure 31D:
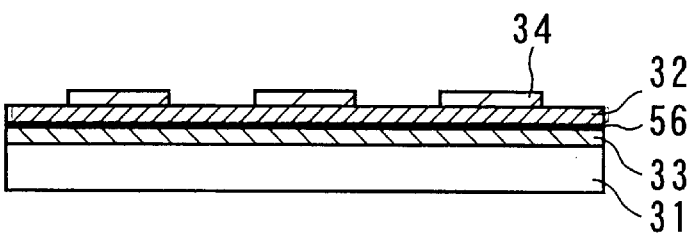
Figure 31E:
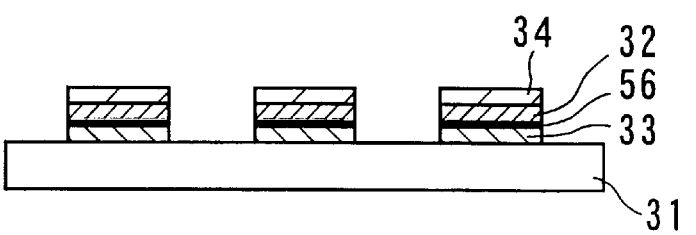
Figure 31F:
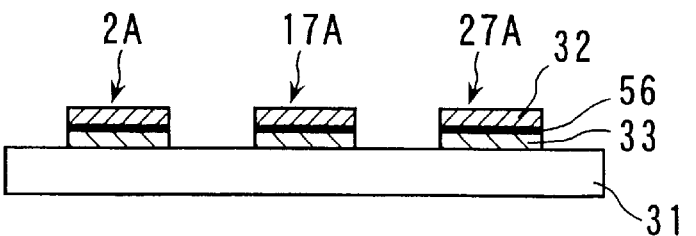
Figure 31G:
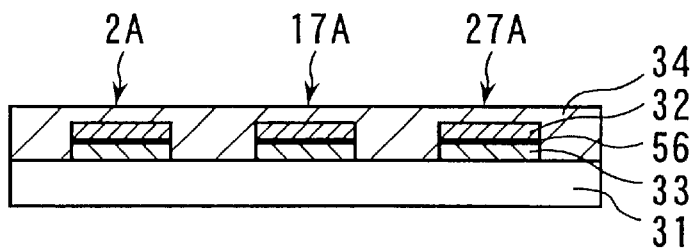
FIG. 31G through FIG. 31L are schematic views illustrating other steps of fabrication method of the optical filter in Example 8 through Example 10 successively.
Figure 31H:
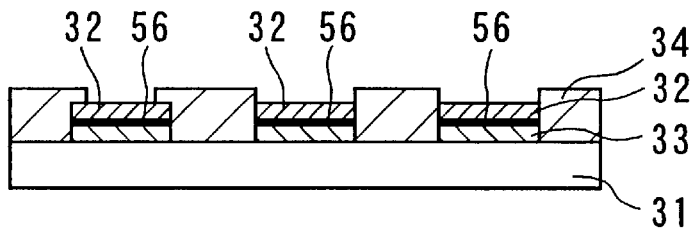
Figure 31I:
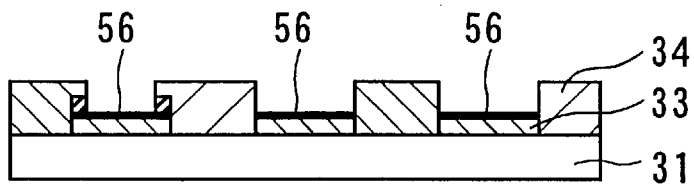
Figure 31J:
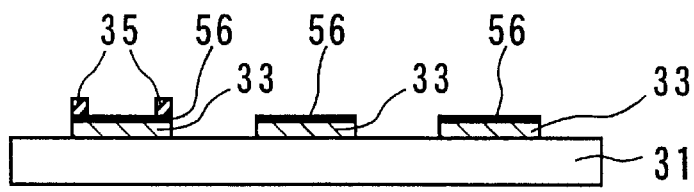
Figure 31K:
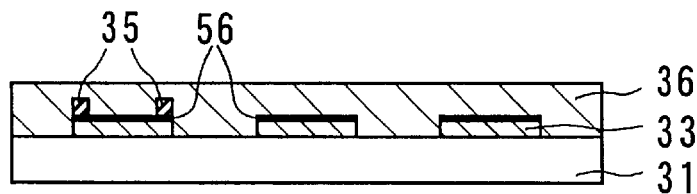
Figure 31L:
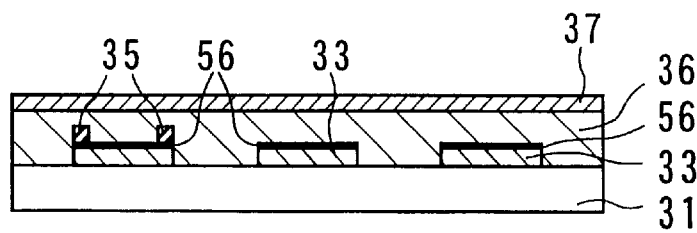
Figure 31M:
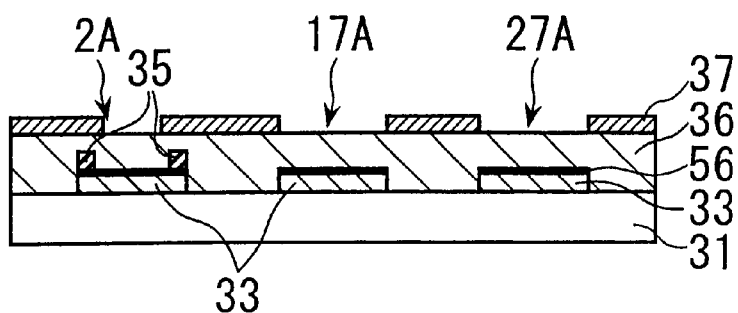
FIG. 31M through FIG. 31O are schematic views illustrating further other steps of fabrication method of the optical filter in Example 8 through Example 10 successively.
Figure 31N:
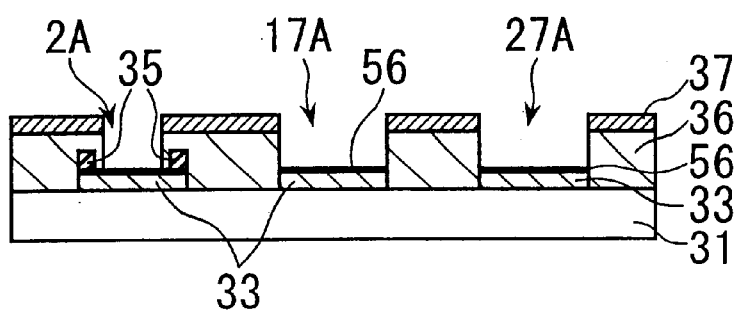
Figure 31O:
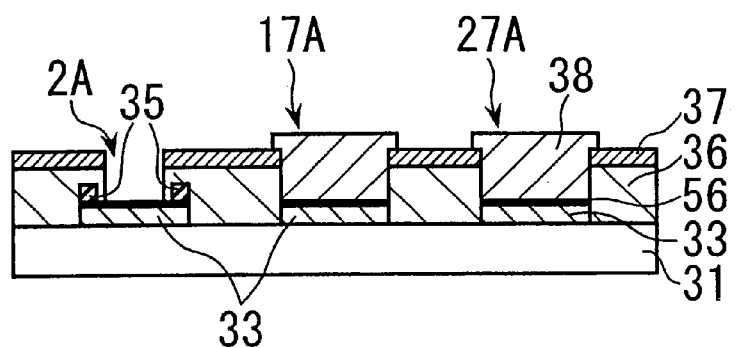

The fabrication steps are shown in FIG. 31A to FIG. 31O. While the tin oxide layer is to be explained to a case of Example 8, fabrication steps in Example 9 and Example 10 were also identical. Further, each of the figures schematically illustrates a portion in FIG. 7A.

At first, as shown in FIG. 31A, an ITO layer 33 with an elemental compositional ratio for indium and tin of about 9 (In:Sn=9:1) was formed to a thickness of about 200 nm on a substrate 31, on which a thin tin oxide layer 56 was further formed to a thickness of about 5 nm by the same sputtering method. Sputtering for the transparent conductive layer (ITO layer) 33 was conducted using a polycrystal material of ITO containing 5% by weight of tin oxide as a target, while sputtering for the tin oxide layer 56 was conducted by using a polycrystal body as a target.

Then, as shown in FIG. 31B, a chromium layer 32 was formed to a thickness of about 200 nm on the tin oxide layer 56 also by the sputtering method. Then, as shown in FIG. 31C, a photoresist 34 was coated thereon by a spin coating method, which was then exposed/developed as shown in FIG. 31D into a desired pattern by using a mask.

Then, as shown in FIG. 31E, the chromium layer 32 was partially etched and the tin oxide layer 56 was partially etched by ion milling (high frequency voltage was applied to the substrate in a plasma atmosphere to collide ions and etching was applied by physical action thereof) and, further, the ITO layer 33 was etched with a mixed acid of hydrochloric acid and nitric acid. Then as shown in FIG. 31F, remaining photoresist 34 was peeled to form a working electrode 2A and a counter electrode 17A and, if necessary, a reference electrode 27A each of a desired planer shape.

Then, as shown in FIG. 31G, a photoresist 34 was coated again and exposed/developed by using a different mask as shown in FIG. 31H. Then, as shown in FIG. 31I, the chromium layer 32 was etched again to form a lead electrode 35 on the working electrode 2A. The lead electrode 35, in actuality, was formed on the counter electrode 17A and the reference electrode 27A as well as the working electrode 2A, but is shown in the drawing only on the working electrode 2A and not illustrated on the counter electrode 17A and the reference electrode 27A (FIG. 31I) (here and hereinafter).

Then, as shown in FIG. 31J, after peeling the photoresist layer 34 again, a film of silicon dioxide 36 was formed by a sputtering method as shown in FIG. 31K so as to cover the entire surface of each of the electrodes.

Subsequently, although not illustrated partially in FIGS. 7A and 7B, a black resist 37 for light shielding was coated by a spin coating method in order not to allow light to permeate through the portion other than the working electrode 2A as shown in FIG. 31L. Then, as shown in FIG. 31M, exposure/development were conducted by using a further photomask to remove the black resist 37 on the working electrode 2A, the counter electrode 17A and the reference electrode 27A.

Then as shown in FIG. 31N silicon dioxide 36 on the surface of the electrode portion not covered with the black resist 37 was etched with a mixed solution of hydrofluoric acid and ammonium fluoride (both at about 15 wt %) to expose the surface of the working electrode 2A, the counter electrode 17A and the reference electrode 27A.

Then as shown in FIG. 31O, a paste 38 comprising a carbon material and cellulosic binder in which a silver powder (grain size 1 to 3 μm) was dispersed by the same weight as that for the carbon was screen printed to the counter electrode 17A and the reference electrode 27A to form the electrodes.

The light control element was prepared by using the substrates applied with the desired pattern through the fabrication steps described above which were arranged such that the working electrodes 2a–2e and 3a–3e, as well as the counter electrodes 17a and 17b were opposed to each other as shown in FIGS. 7A and 7B, appended by way of the spacers 6 and sealing, at the inside, a silver salt solution 1 comprising 500 mM of silver bromide and 750 mM of sodium iodide dissolved in a mixed solvent of dimethylsulfoxide (DMSO)/dimethylacetoamide (DMAc)=50/50.

Comparative examples were also fabricated for comparison with the examples described above.

Comparative Example 10

A sample of a light control element was fabricated as Comparative Example 10 in the same manner without forming the thin oxide layer in the manufacturing steps as described above.

Comparative Example 11

A sample of a light control element was fabricated as Comparative Example 11 in the same manner as in the fabrication steps described above without disposing the ITO layer and a film was formed to a thickness of about 200 nm only with the tin oxide layer 56.

Then, a constant current was supplied between the ITO electrodes 2a, 2b, 2c, 2d and 2e, and 3a, 3b, 3c, 3e and 3e as the working electrodes and the counter electrodes 17a and 17b of the light controlling element formed by appending the substrates in Examples 8, 9 and 10 and Comparative Examples 10 and 11 described above, to deposit and dissolve electrodeposits including silver on the ITO electrodes. The current was supplied at a density of 18 mA/cm$^2$ in the ITO electrode for 2 sec both for deposition and dissolution. This was defined as one cycle for deposition and dissolution.

Figure 32:
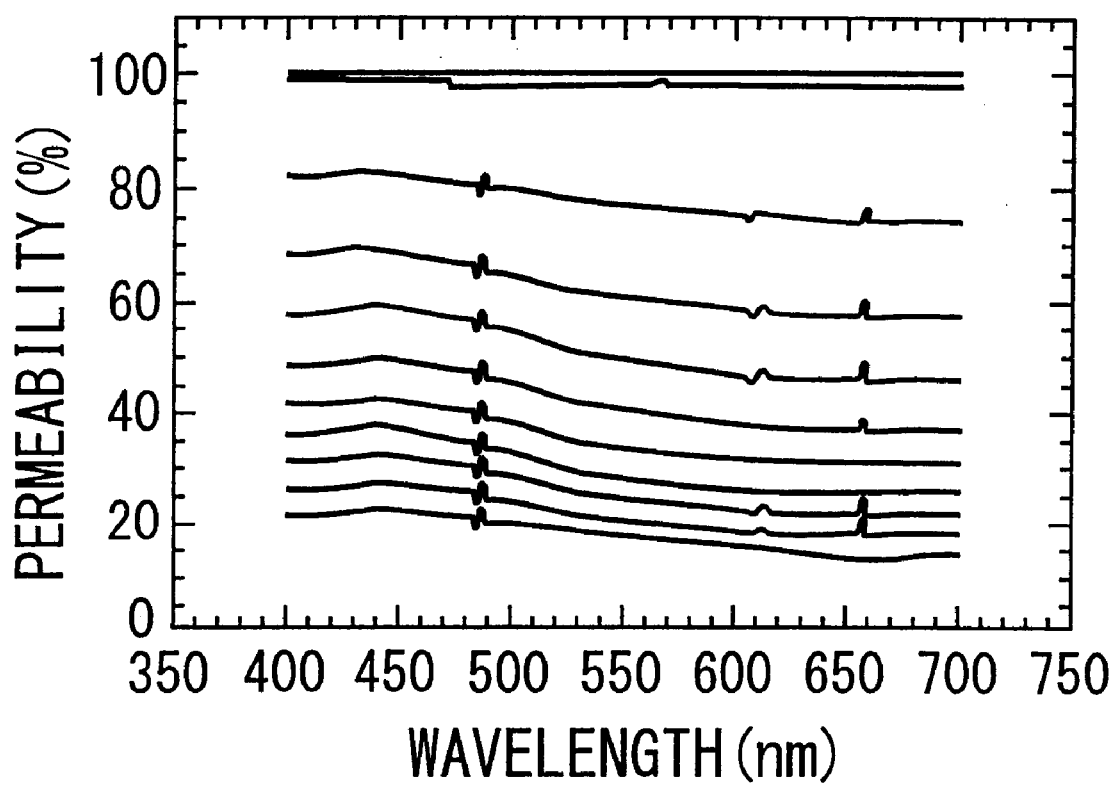
FIG. 32 is a graph showing the spectral characteristics upon electrodeposition on a working electrode in Example 8 of the optical filter.

FIG. 32 shows the spectral characteristics of the working electrode of Example 8 upon electrodeposition at a room temperature (22° C.). Since spectral characteristics of Example 9 and Example 10 were substantially identical with those of Example 8, they are not illustrated.

Figure 33A:
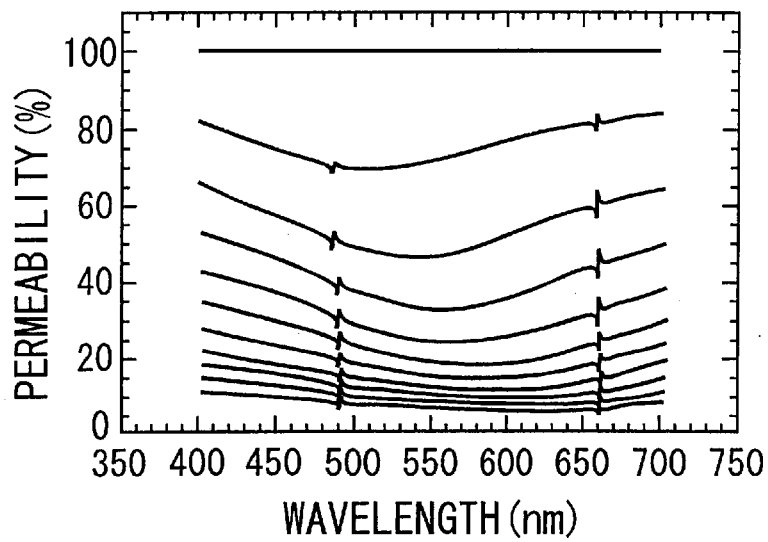
FIG. 33A and FIG. 33B are graphs, showing the spectral characteristics upon electrodeposition on a working electrode in Comparative Example 10 and Comparative Example 11.

According to the graph, when a driving voltage was applied in 2 seconds of oxidation/reduction cycle, the spectrum exhibited a flat state even at the change of the potential and, accordingly, it is apparent that the spectral characteristics could be improved compared with the spectrum in Example 10 not disposed with tin oxide layer (refer to FIG. 33A).

Further, FIG. 33A shows spectral characteristics of the working electrode in Comparative Example 10 upon electrodeposition at a room temperature (22° C.).

According to the graph, while the flatness of the spectrum was disturbed in accordance with the change of the potential of the applied voltage and it can be seen that this was because the spectral characteristics were not favorable due to the absence of the tin oxide layer.

Figure 33B:
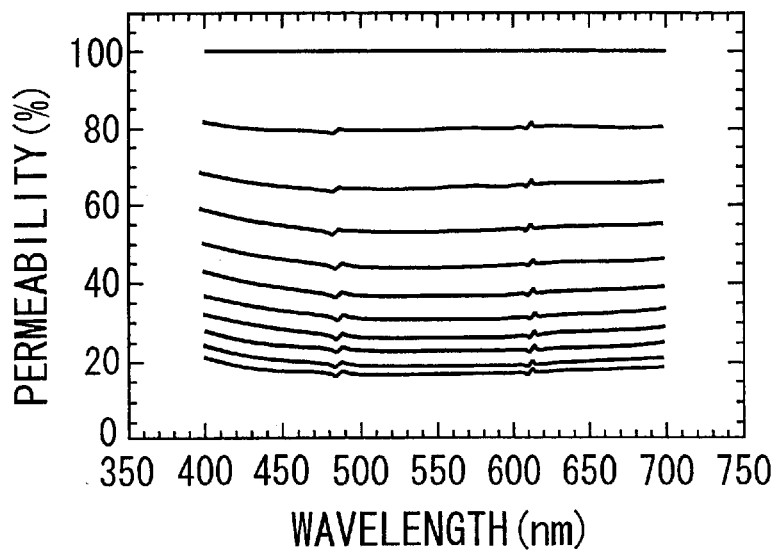

Further, FIG. 33B shows spectral characteristics of the working electrode in Comparative Example 11 upon electrodeposition at a room temperature (22° C.).

According to the graph, the spectrum was flattened even when the applied potential changed and it clearly shows the excellent spectrum in a case of the single tin oxide element.

Figure 34:
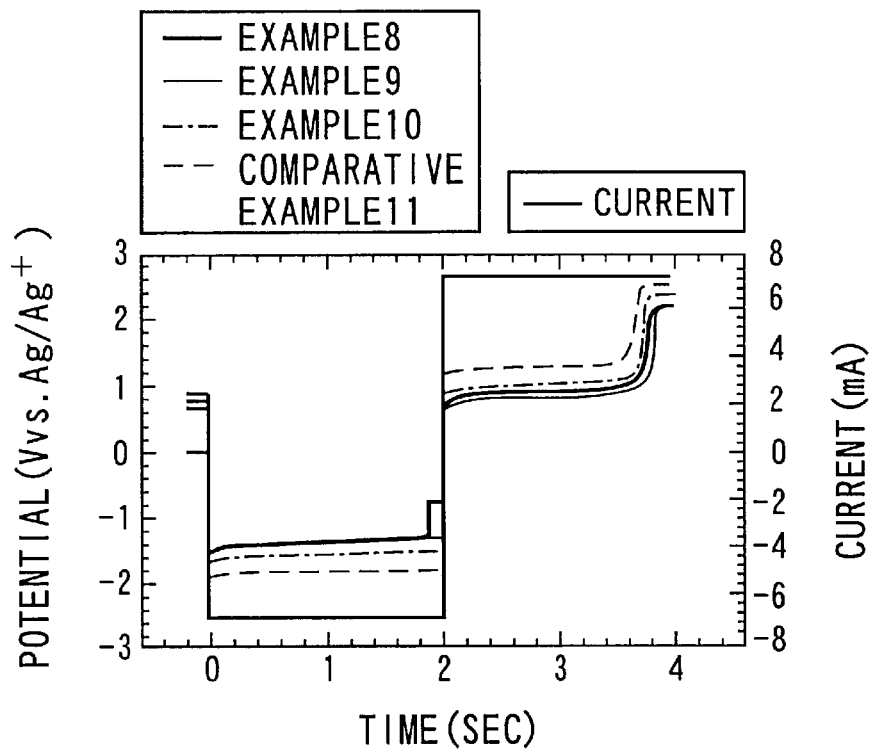
FIG. 34 is a graph illustrating change with time of the polarization upon electrodeposition on the working electrode in Example 8 through Example 10 and Comparative Example 11.

However, Comparative Example 11 has a drawback as follows. FIG. 34 shows polarization characteristics of the working electrode of each of the examples and Comparative Example 11 at a room temperature (22° C.).

According to the graph, while polarization at the working electrode upon electrodeposition was about −2 V vs. Ag/Ag$^+$ in Comparative Example 11, it was restricted as low as −1.5 V vs. Ag/Ag$^+$ in the examples. Further, the polarization was suppressed in the example compared with Comparative Example 11 also upon dissolution, which not only contributes to the reduction of the electric power consumption but also prevented side reaction due to the oxidation of the electrolyte ingredient upon dissolution (oxidation). On the contrary, yellowing of the electrolyte was observed in Comparative Example 11 after a number of deposition/dissolution cycles. This is considered to be attributable mainly to the formation of iodine caused by oxidation of iodic ions as anions contained in the electrolyte.

Figure 35:
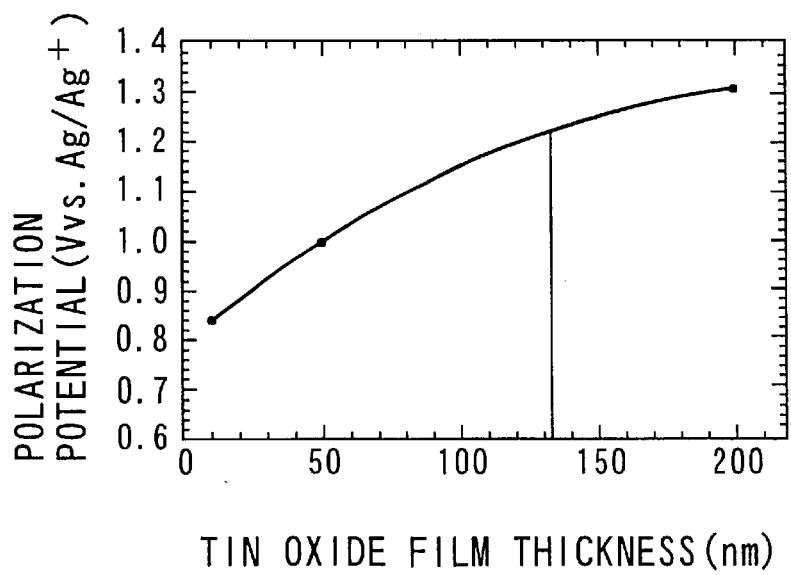
FIG. 35 is a graph illustrating the change of the polarization potential relative to the thickness of a tin oxide film.

FIG. 35 shows the change of the polarization potential relative to the film thickness of the tin oxide.

FIG. 35 shows the polarization potential value at 3 sec and 4 sec just before rising potential upon oxidation in FIG. 34 described above relative to the thickness of the tin oxide layer on the ITO layer (film thickness: 200 nm). As shown in the graph, the driving potential was 1.3 V vs. Ag/Ag$^+$ in a case where the thickness of the tin oxide film was 200 nm as in Comparative Example 11, which exceeded a limit value 1.2 V vs. Ag/Ag$^+$ of the potential which might possibly denature the electrolyte (mainly formation of iodine). Accordingly, it was desirable that the upper limit for the thickness of the tin oxide layer was 130 nm, which corresponds to the limit value 1.2 V of the potential in FIG. 35, while the lower limit thereof was 5 nm in view of the controllability for the film formation, that is, it was desirably within a range from 5 nm to 130 nm and, more preferably, 10 nm or less, and it could be seen that excellent spectral characteristics could be obtained without increasing the polarization of the working electrode.

In Examples 8 to 10, since the working electrodes 2a–2e, and 3a–3e were formed as a dual layer structure by thinly laminating the tin oxide layer 56 on the ITO layer 33, by which the electrodeposited film was in a state similar with the case of electrodeposition on the thin film of the single tin oxide material, so that coloration of the deposited film could be suppressed to provide excellent spectral characteristics, as well as the resistance for the entire film of the working electrode could be minimized since the thickness of the tin oxide layer 56 was enough thin to suppress the polarization of the working electrodes 2a–2e and 3a–3e upon driving.

Figure 36:
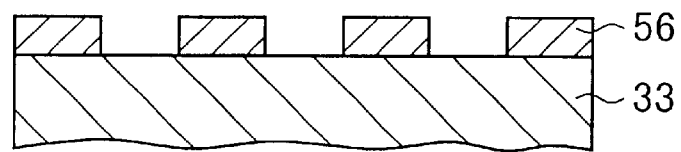
FIG. 36 is a schematic view illustrating a modified embodiment for the optical filter in Example 8 through Example 10.

Further, as a method of forming the tin oxide layer 56 in Examples 8 to 10, it was also able to be formed also intermittently on the ITO layer 33, for example, as shown in FIG. 36.

Example 11

Comparative Example 12

An example of the present invention was applied to the same optical filter (electrochemical light control element) as explained for FIG. 3 and FIG. 4 referring to FIG. 6.

In this example, as shown in FIG. 6, a pair of transparent substrates 4 and 5 made of glass constituting the cell were disposed at a predetermined gap. Pairs of working electrodes 2a, 2b, 2c, 2d and 2e, and 3a, 3b, 3c, 3d and 3e were opposed to each other on the inner surfaces (opposed surfaces) of each of the substrates 4 and 5, and counter electrodes 17a and 17b and reference electrodes 27a and 27b were disposed to the outer circumference thereof. The substrates 4 and 5 were kept at a predetermined distance by spacers 6 between which a silver salt solution was sealed as an electrolyte 1.

Then, counter electrodes 17a and 17b disposed to the outer circumference of the working electrodes 2a–2e and 3a–3e were constituted as described below. That is, an ITO film was formed to a thickness of about 200 nm on the substrates 4 and 5 by a sputtering method to form a current collector layer. The planer shape of the working electrodes 2a–2e and 3a–3e, as well as the counter electrodes 17a and 17b was substantially identical with that shown in FIG. 4.

Subsequently, by using the apparatus shown in FIG. 9, the substrate was dipped in an aqueous solution of aniline and electric current was supplied to the ITO portion corresponding to the counter electrodes 17a and 17b to electrochemically polymerize polyaniline on the ITO surface.

An aqueous solution of aniline used in the process described above was prepared by mixing 10 ml of hydrochloric acid and 35 ml of purified water to 5 ml of aniline. Electrochemical polymerization of polyaniline was conducted at a current density of 0.5 mA/cm$^2$ for 2 min.

After applying electrochemical polymerization of polyaniline on the ITO surface, it was thoroughly washed with water and dried and then a paste, prepared by mixing conductive particles and a binder as described for Example 1 or Examples 4 to 9, was printed thereon to form counter electrodes 17a and 17b.

Further, only the paste was printed to a thickness of about 20 μm on ITO 33 with no electrochemical polymerization of polyaniline, to fabricate counter electrodes 17a and 17b of Comparative Example 12.

As the electrolyte 1, the silver salt solution, 500 mM of silver bromide, and 750 mM of sodium iodide dissolved in a mixed solvent of dimethylsulfoxide (DMSO)/acetonitrile (AN)=55/45, was used to assemble the light control elements of Example 11 and Comparative Example 12 were assembled respectively.

A constant current was supplied between the ITO electrodes 2a, 2b, 2c, 2d and 2e, and 3a, 3b, 3c, 3e and 3e as the working electrodes and the counter electrodes 17a and 17b of a light control element formed to deposit and dissolve electrodeposits including silver on the ITO electrodes. The current was supplied at a density of 18 mA/cm$^2$ for the ITO electrode in 2 sec both for deposition and dissolution. This was defined one cycle of deposition and dissolution.

When the oxidation reduction cycles were repeated so many times, while electrolyte turned yellow at 20000 cycles or more in Comparative Example 12, no discoloration of the electrolyte was recognized in Example 11.

Figure 37:
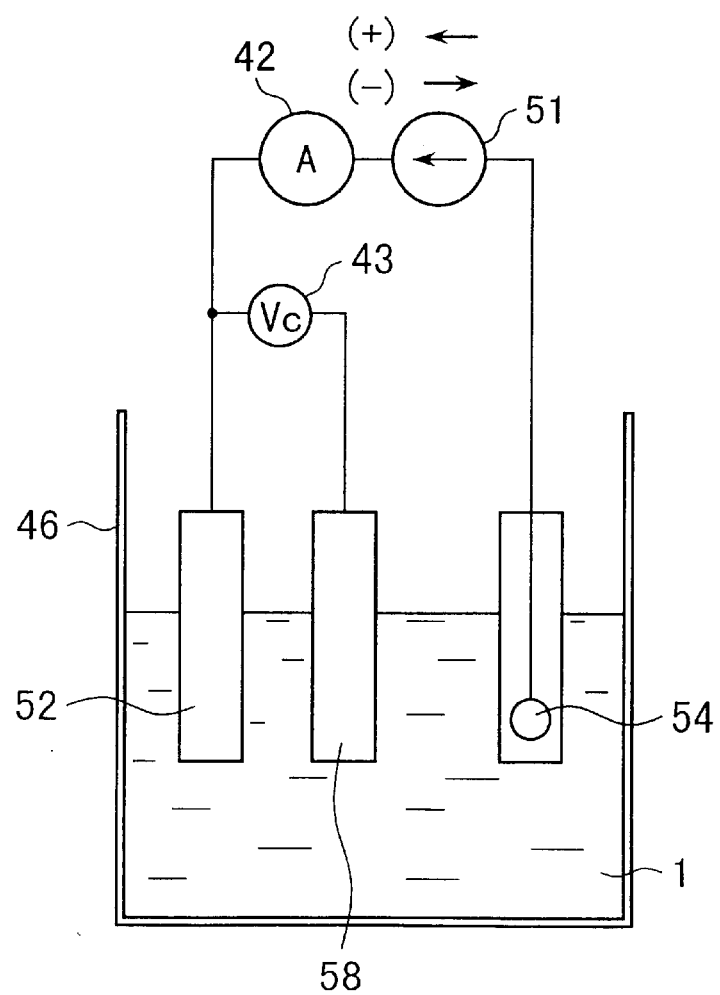
FIG. 37 is a schematic view illustrating a beaker cell.

For examining the cause, change of the potential difference of the ITO electrode relative to the counter electrode (cell voltage) and the change of the potential of the ITO electrode and the counter electrodes 17a and 17b relative to the silver plate 58 (reference electrode) were measured when oxidation/reduction (each 2 seconds) cycles were repeated such that the current density was at 18 mA/cm$^2$ for the transparent electrode by using the silver plate 58 as the reference electrode and for the identical transparent electrode 54 and counter electrode 52 as those used in Example 11 and Comparative Example 12 by the beaker cell 46 shown in FIG. 37. In the drawing, are shown a current meter 42, a volt meter 43 and a constant current source 51.

In the beaker cell 46 in FIG. 37, the counter electrode 52 was prepared by forming an ITO film on a rectangular glass substrate, electrochemically polymerizing polyaniline thereon and further printing a carbon paste thereon. A predetermined current density was supplied by controlling the area to be dipped.

Figure 38:
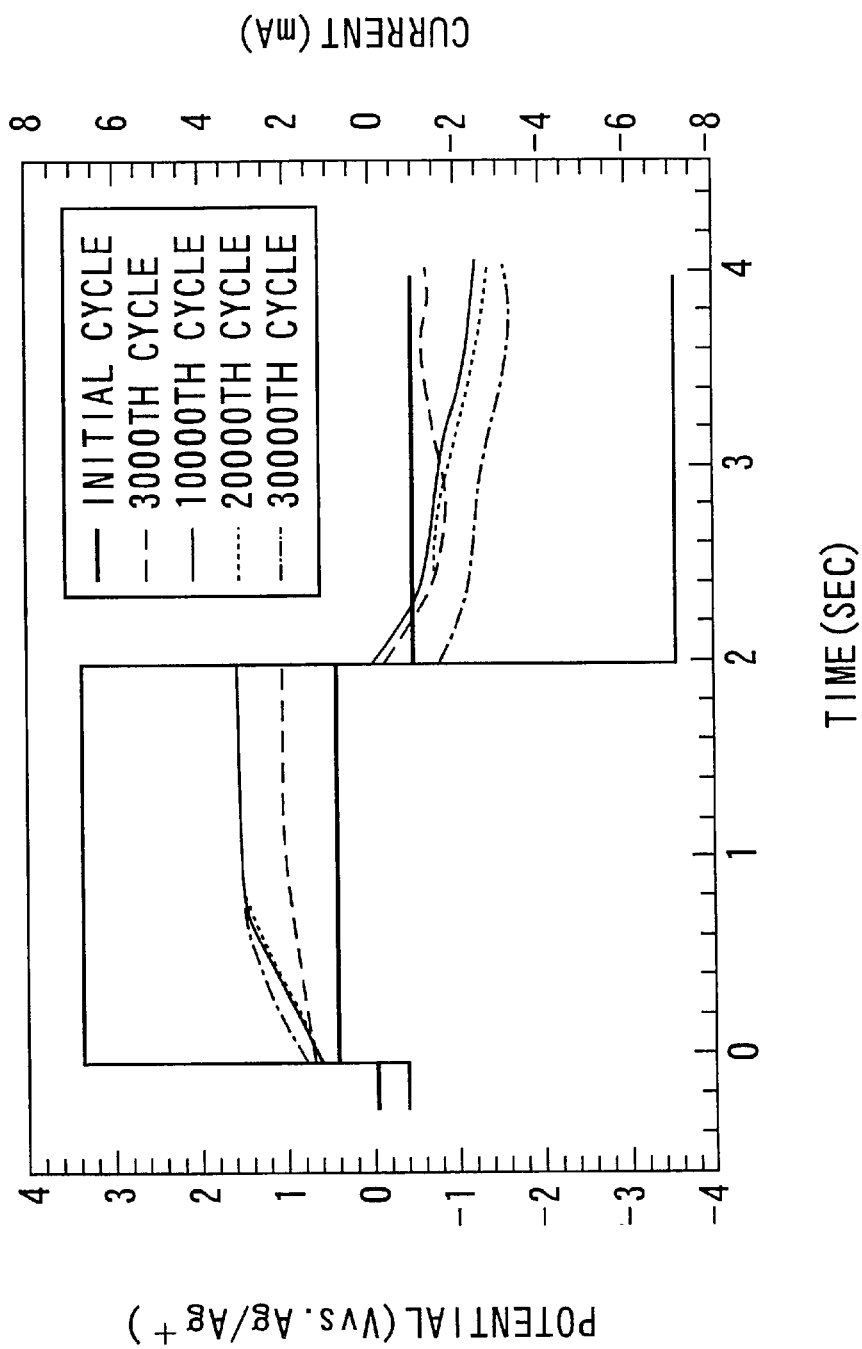
FIG. 38 is a graph showing the change with time for the counter electrode potential relative to silver potential and current value in Example 11 of the present invention.
Figure 39:
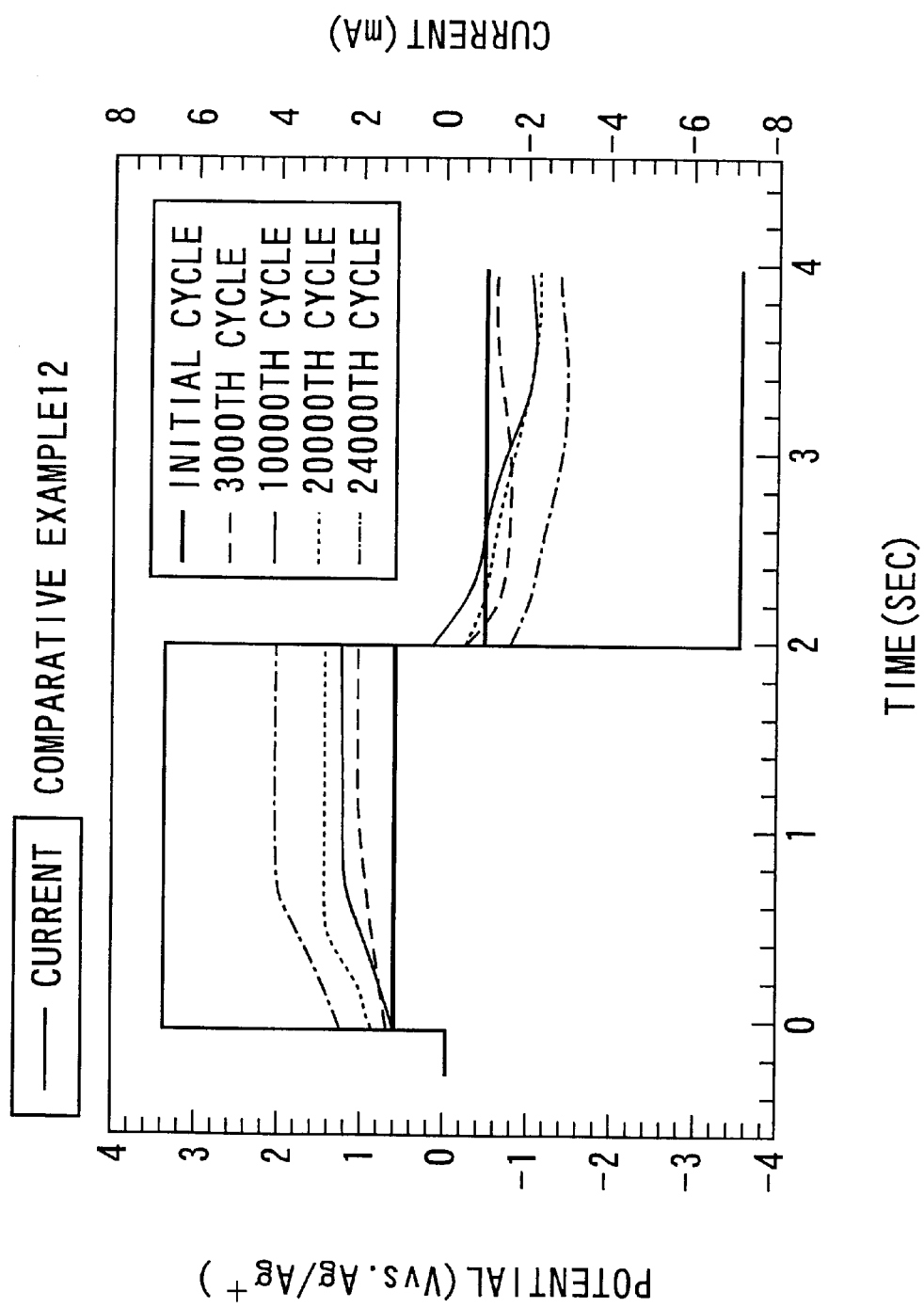
FIG. 39 is a graph showing the change with time for the counter electrode potential relative to silver potential and current value in Comparative Example 12.

FIG. 38 shows the change with time of the potential on the same counter electrode as that of Example 11 and FIG. 39 shows the change with time of the potential on the same counter electrode as that of Comparative Example 12. There was no significant change in the polarization potential for the potential of the transparent electrode even when oxidation/reduction cycles were repeated, which is not shown in the figures. According to FIG. 38 and FIG. 39, however, it can be seen that the polarization potential of the counter electrode increased gradually as the number of oxidation/reduction cycles increased.

Figure 40:
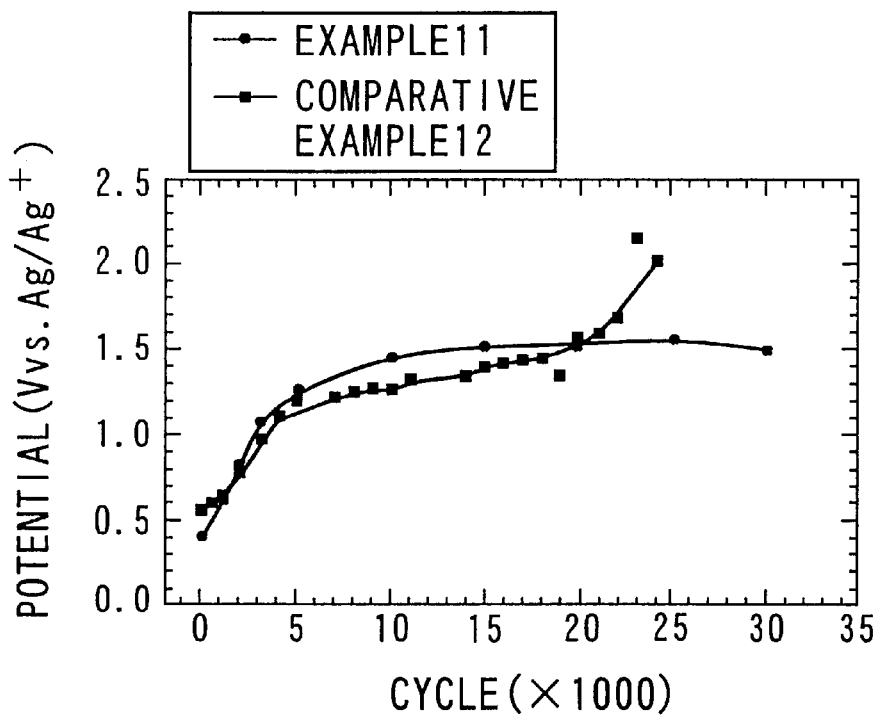
FIG. 40 is a graph plotting the maximum value for the polarization potential relative to silver potential of a counter electrode upon repeating electrodepositing/dissolving cycles on the counter electrode in Example 11 and Comparative Example 12.

In FIG. 40, the value of polarization just before rising abruptly upon counter electrode oxidation in oxidation/reduction cycles was plotted in Example 11 and Comparative Example 12. According to the graph, while the maximum value for the polarization upon oxidation was suppressed to about 1.5 V even when the oxidation/reduction cycles reached 30,000 cycles in Example 11, whereas the maximum value for the polarization upon oxidation was 2 V vs. Ag/Ag$^+$ or more when oxidation/reduction exceeded 20,000 cycles in Comparative Example 12.

In such a state, changes such as yellowing of the electrolyte near the counter electrode occurred, which might be attributable mainly to the oxidation of iodic ions I$^-$ ionized from sodium iodide as the supporting salt dissolved in the electrolyte. The coloration of the electrolyte gave an undesired effect on the spectral characteristics of the optical device.

In view of the above, Example 11 could increase the life of the optical element since the electrolyte suffered from no denaturation but favorable spectral characteristics was able to be maintained even after a plurality cycles of oxidation and reduction.

In this example, since the paste material was used by being printed or coated for forming the counter electrodes 17a and 17b, corners at the end edge of the counter electrode were rounded by the fluidity and the surface tension of the paste material to form the counter electrodes 17a and 17b with no substantial presence of angled corners. Accordingly, concentration of electric fields as explained in FIG. 5 was moderated and, as a result, particles deposited from the electrolyte 1 were not formed not larger. That is, undesired phenomenon could be prevented that the deposited particles were suspended in the electrolyte to deteriorate the transparency upon color extinction on the working electrode or cause short-circuit between the electrodes.

Example 12

In this example, counter electrodes 17a and 17b were constituted in the same manner as in Example 11 except for electrochemically polymerizing polypyrrole instead of electrochemically polymerizing polyaniline in Example 11. That is, a substrate was dipped in a solution containing pyrrole, current was supplied to ITO as the underlying layer for the counter electrodes 17a and 17b to electrochemically polymerize polypyrrole and then carbon paste was printed.

The solution of pyrrole used in this case was prepared by using acetonitrile removed with oxygen by blowing an inert gas as a solvent, controlling the concentration of pyrrole to 0.1 mol/l and dissolving lithium iodide as a supporting salt. When the substrate was dipped into the solution and about 3.5 V of positive potential was applied to ITO as the underlying layer for the counter electrode, polypyrrole was formed on ITO.

Polypyrrole doped with iodic ions as the electrolyte anions was obtained by thoroughly washing with acetonitrile followed by drying. The method of assembling and evaluating the appended cell in each of the examples subsequently were identical with those in Example 11.

Figure 41:
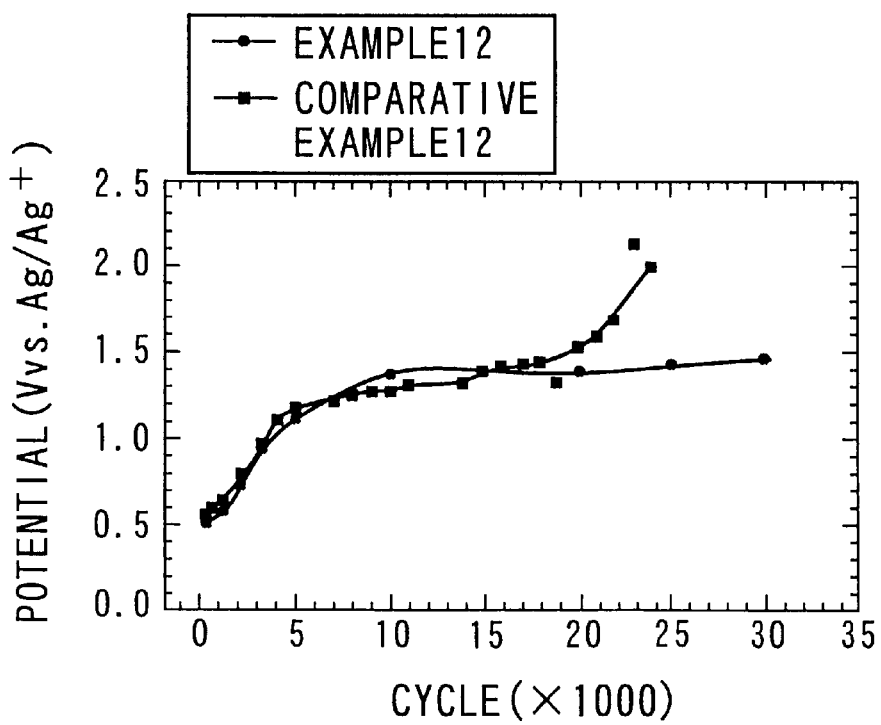
FIG. 41 is a graph plotting the maximum value for the polarization potential relative to silver potential of a counter electrode upon repeating electrodepositing/dissolving cycles on the counter electrode in Example 12 and Comparative Example 12.

In the appended cell in this example, even when oxidation/reduction cycles accompanied by the electrodeposition/dissolution reaction were repeated for 30,000 cycles, yellowing of the electrolyte as in the comparative example described above was not observed. Further, the polarization potential for the counter electrode was examined in a beaker cell like that in Example 11. The results is shown in FIG. 41.

According to the result, while the value of the polarization potential just before rising up abruptly upon oxidation of the counter electrode gradually increased as the number of cycles of oxidation/reduction increases but it was suppressed to about 1.5 V relative to silver even if the oxidation/reduction was repeated by 30,000 cycles and the electrolyte was not yellowed as in the Comparative Example 12.

Also in this example, since the paste material was used by being coated for forming the counter electrodes 17a and 17b, corners at the end edge of the counter electrodes were rounded by the fluidity and the surface tension of the paste material to form the counter electrodes 17a and 17b with no substantial presence of angled corners. Accordingly, concentration of electric fields as explained in FIG. 5 was moderated and, as a result, particles deposited from the electrolyte 1 were not formed larger. That is, undesired phenomenon could also be prevented that the deposited particles were suspended in the electrolyte to deteriorate the transparency upon color extinction on the working electrode or cause short-circuit between the electrodes.

Example 13

In this example, counter electrodes 17a and 17b were constituted in the same manner as in Example 11 except for electrochemically polymerizing polythiophene instead of electrochemically polymerizing polyaniline in Example 11. That is, a substrate was dipped in a solution containing thiophene, current was supplied to ITO as the underlying layer for the counter electrodes 17a and 17b to electrochemically polymerize polythiophene and then carbon paste was printed.

Figure 42:
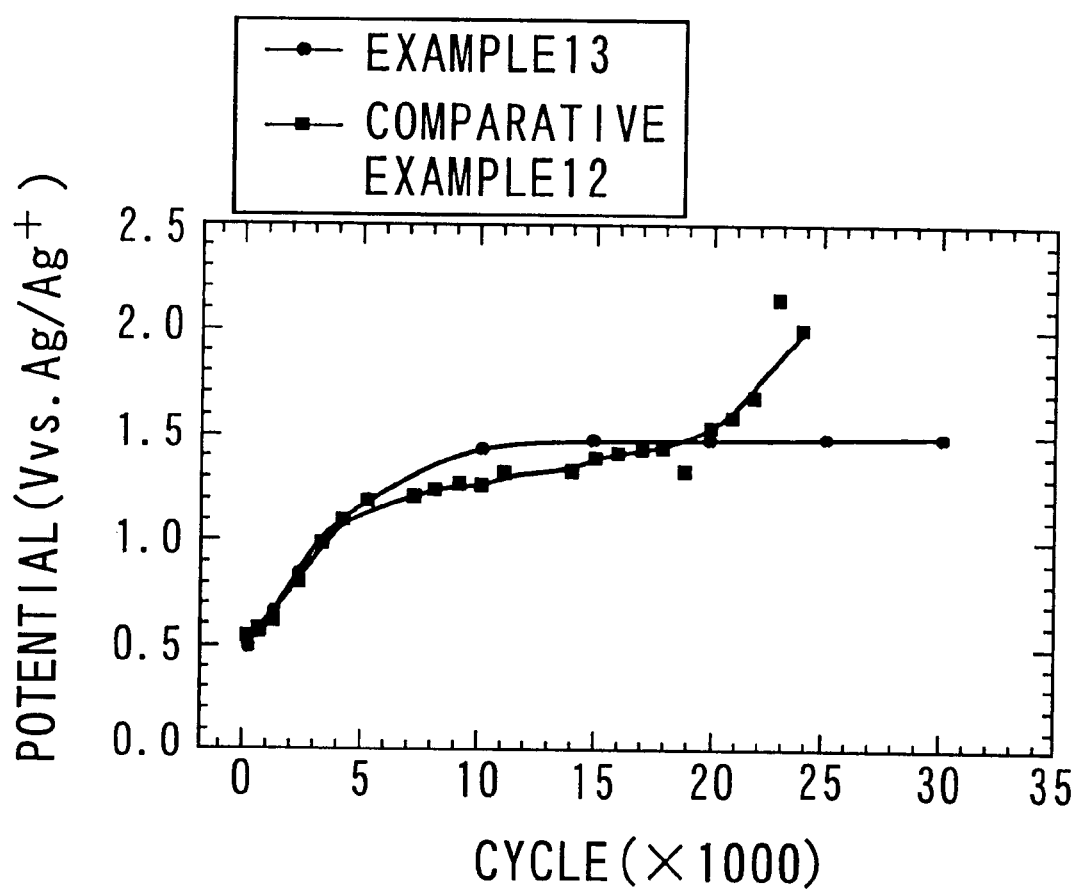
FIG. 42 is a graph plotting the maximum value for the polarization potential relative to silver potential of a counter electrode upon repeating electrodepositing/dissolving cycles on the counter electrode in Example 13 and Comparative Example 12.

The solution of thiophene used in this case was prepared by using acetonitrile removed with oxygen by blowing an inert gas as a solvent, adjusting the concentration of thiophene to 0.1 mol/l and dissolving lithium iodide as a supporting salt. When the substrate was dipped into the solution and about 3.5 V of positive potential was applied to ITO as the underlying layer relative to the counter electrode, polythiophene was formed on ITO. Polythiophene doped with iodic ions as the electrolyte anions was obtained by thoroughly washing was acetonitrile followed by driving. In the appended cell in this example, even when oxidation/reduction cycles accompanied by the electrodeposition/dissolution reaction were repeated for 30,000 cycles, yellowing of the electrolyte as in the Comparative Example 12 described above was not observed. Further, like that in Example 11, the polarization potential for the counter electrode was examined in a beaker cell 46 in FIG. 37. The result is shown in FIG. 42.

According to this result, while the maximum value of the polarization potential upon oxidation of the counter electrode gradually increased as the number of cycles of oxidation/reduction increased but it was suppressed to about 1.5 V relative to silver even if oxidation/reduction were repeated by 30,000 cycles and the electrolyte was not yellowed as in the Comparative Example 12 described above. In view of the above, Example 13 can also attain a longer life of the optical element like that in Example 11.

In each of the Examples 10, 11 and 12 described above, when a third layer comprising a current collector and a first layer comprising conductive particles were bonded and a second layer comprising the polymeric layer disposed between both of them for preventing peeling of them was formed by the electrochemical polymerization method, no significant change was observed for the polarization potential on the counter electrode even when the oxidation/reduction reached 30,000 cycles in each case of using polyaniline, polypyrrole and polythiophene as the conductive polymer and the potential was suppressed to about 1.5 V and the electrolyte did not suffer from yellowing. However, if the electrochemical polymerization was not applied (if the second layer comprising the conductive polymer was not disposed), the polarization potential on the counter electrode increased abruptly to 2 V or higher as the oxidation/reduction cycles exceeded 20,000 cycles and the electrolyte discolored yellow, so that the optical filter according to this example could maintain favorable spectral characteristics and make the life of the element longer.

Furthermore, also in this example, since the paste material was used by being coated for forming the counter electrodes 17a and 17b, corners at the end edge of the counter electrode were rounded by the fluidity and the surface tension of the paste material to form the counter electrodes 17a and 17b with no substantial presence of angled corners. Accordingly, concentration of electric fields as explained in FIG. 5 was moderated and, as a result, particles deposited from the electrolyte 1 were not formed larger. That is, undesired phenomenon could be prevented that the particles were suspended in the electrolyte 1 to deteriorate the transparency upon color extinction on the working electrode or cause short-circuit between the electrodes.

Example 14

Also in this example, the present invention was applied to substantially the same optical filter (electrochemical light control element) as explained for FIG. 3 and FIG. 4 as shown in FIG. 6.

In this embodiment, as shown in the drawing, a pair of transparent substrates 4 and 5 made of glass constituting the cell were disposed at a predetermined gap. Pairs of working electrodes 2a, 2b, 2c, 2d and 2e, and 3a, 3b, 3c, 3d and 3e were opposed to each other on the inner surfaces (opposed surfaces) of each of the substrates 4 and 5. The substrates 4 and 5 were kept at a predetermined distance by spacers 6 between which a silver salt solution was sealed as an electrolyte 1.

Then, as shown in FIG. 10, a constant current source 51 for supplying current between the working electrode 54 and the counter electrode 52, a temperature detector 53 for detecting the temperature of the electrolyte 63 in the cell and a control device 55 for controlling the constant current source 51 were disposed to the outside of the cell.

Further, in this embodiment, counter electrodes 17a and 17b and reference electrodes 27a and 27b were disposed to the outer circumference of the working electrodes 2a–2e and 3a–3e. The counter electrodes 17a and 17b were disposed by forming an ITO film to a thickness of about 200 nm on the substrates 4 and 5 by a sputtering method to form a current collector layer. The planar shape for the working electrodes 2a–2e and 3a–3e, as well as the counter electrodes 17a and 17b were substantially identical with that shown in FIG. 4.

The working electrodes 2a–2e and 3a–3e, as well as the counter electrodes 17a and 17b of the appended cell in this embodiment were fabricated by the fabrication steps as shown in FIG. 31A to FIG. 31O like that in Example 8 to obtain substrates 4 and 5 applied with a desired patterning. A polymeric layer in accordance with Example 11 was disposed to the counter electrode. Further, in addition to the working electrode and the counter electrode, reference electrodes 27a and 27b for monitoring the potential of both or either of the electrodes were disposed in order to control the driving of the element. The fabrication method for the reference electrode was in accordance with the fabrication method for the counter electrode described above except for disposing the polymeric layer. In FIG. 10, the reference electrode shown in FIG. 6 is not illustrated.

Subsequently, as shown in FIG. 6, working electrodes 2a–2e and 3a–3e, as well as the counter electrodes 17a and 17b were opposed to each other, both of the substrates 4 and 5 were appended to each other by way of spacers 6 having a probe of a temperature detector (not illustrated) and an electrolyte 1 was sealed at the inside and, further, an electric circuit provided with unnecessary control means was formed.

For the electrolyte 1 in this example, the silver salt solution, 500 mM of silver bromide and 750 mM of sodium iodide dissolved in a mixed solvent of dimethylsufoxide (DMSO)/dimethylacetoamide (DMAc)=50/50 was used.

Current values were controlled by the control device to 6 mA, 4 mA and 3 mA per the electrode area 0.28 cm$^2$ at the temperature of the electrolytes of 22° C., 40° C. and 60° C. An average transmissivity of light when silver was deposited for 2 sec was measured. The results are shown in the following table.

TABLE 11

| Temperature | 22° C. | 40° C. | 60° C. |
|---|---|---|---|
| Average transmissivity | 20.1% | 18.5% | 19.6% |

According to the results, the average transmissivity is reduced to about 20% in each of the cases. Further, when an oxidation current at the same value as above was supplied for two sec, the electrodeposited silver film was dissolved to recover 100% transmissivity.

From the results, it is apparent that the present invention can provide an optical device having excellent characteristics by attaining stable average transmissivity by supplying a reduction current and an oxidation current in accordance with the temperature.

Further, in case that the optical control cell was provided with by a heater 59 and a temperature controller 57 as shown in FIG. 10B, a temperature of the electrolyte 1 could be controlled to 60° C. Accordingly, the constant light transmissivity 20% was able to be always obtained by 3 mA constant current per the electrode area for 2 sec.

Example 15

Comparative Example 13

In this example, the present invention was also applied to substantially the same optical filter (electrochemical light control element) as explained for FIG. 3 and FIG. 4 as shown in FIG. 6.

Also in this embodiment, as shown in the drawing, a pair of transparent substrates 4 and 5 made of glass constituting the cell were disposed at a predetermined gap. Pairs of working electrodes 2a, 2b, 2c, 2d and 2e, and 3a, 3b, 3c, 3d and 3e were opposed to each other on the inner surfaces (opposed surfaces) of each of the substrates 4 and 5. The substrates 4 and 5 were kept at a predetermined distance by spacers 6 between which a silver salt solution was sealed as an electrolyte 1.

Then, as shown in FIGS. 11A to 11C, a driving power source 51 and a reduction current power source 50 for supplying current between the working electrode 54 and the counter electrode 52, a temperature detection means 53 such as a sensor for detecting the temperature of the electrolyte 1 in the cell and a control device 55 for controlling the driving power source 51 and reduction current power source 50 were provided to the outside of the cell.

Further, in this embodiment, the counter electrodes 17a and 17b and the reference electrodes 27a and 27b were disposed to the outer circumference of the working electrodes 2a–2e and 3a–3e. The counter electrodes 17a and 17b were disposed by forming an ITO film to a thickness of about 200 nm on the substrates 4 and 5 by a sputtering method to form a current collector layer. Further, the planar shape of the working electrodes 2a–2e and 3a–3b, as well as the counter electrodes 17a and 17b was substantial identical with that shown in FIG. 4.

The appended cell in this example was fabricated in the same manner as in Example 8, in which the electrolyte 1 was sealed at the inside and attached with the driving power source 51, the reduction current power source 50, the control circuit 55 and the temperature sensor 53 were attached to obtain an optical device of this example as shown in FIG. 11.

For the electrolyte 1, the silver salt solution, 500 mM of silver bromide and 750 mM of sodium iodide dissolved in a mixed solvent of dimethylsufoxide (DMSO)/dimethylacetoamide (DMAc)=50/50, was used.

Figure 43:
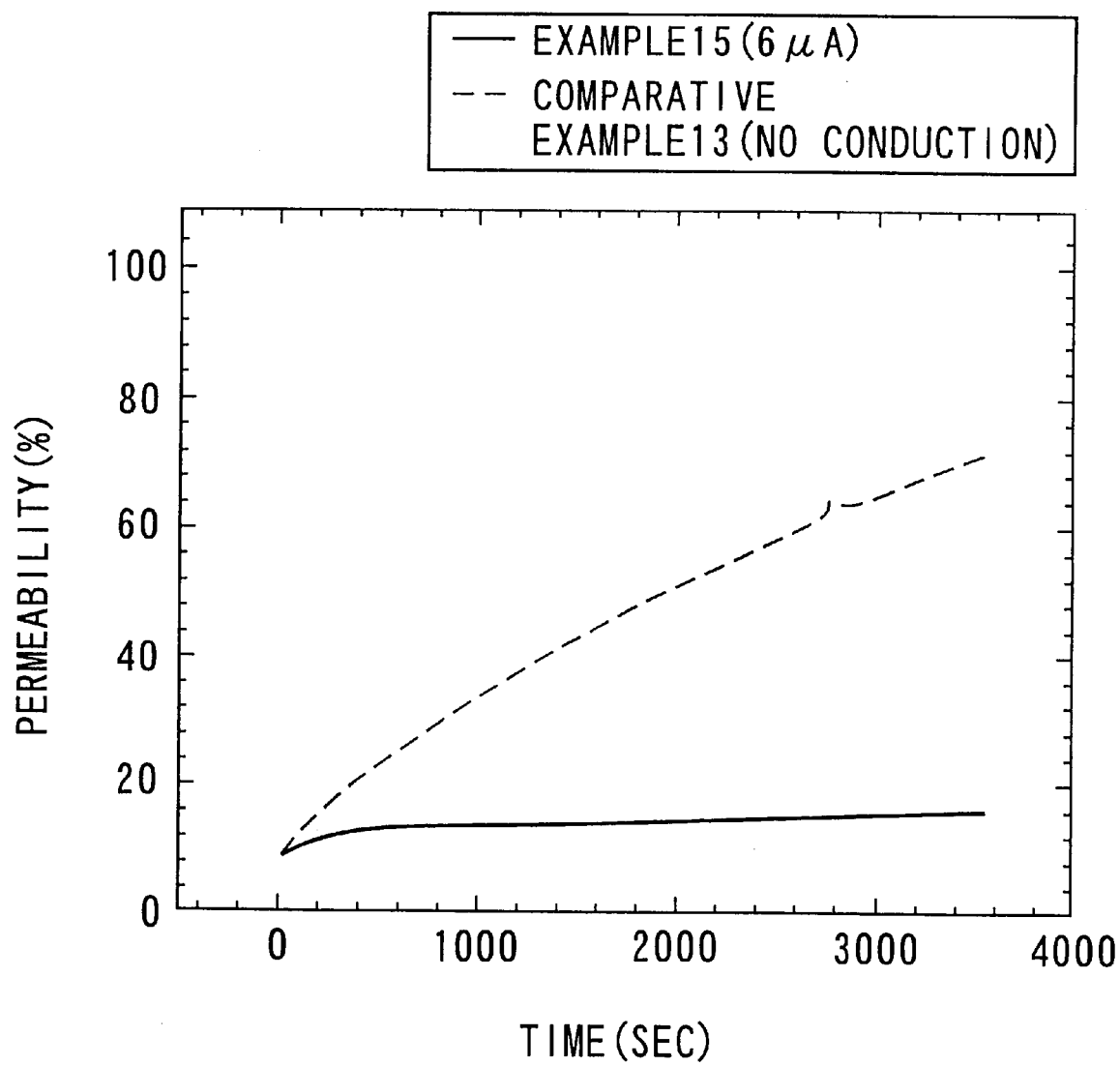
FIG. 43 is a graph illustrating the change of transmissivity in Example 15 and Comparative Example 13 after electrodepositing on a transparent electrode at a solution temperature of 22° C.
Figure 44:
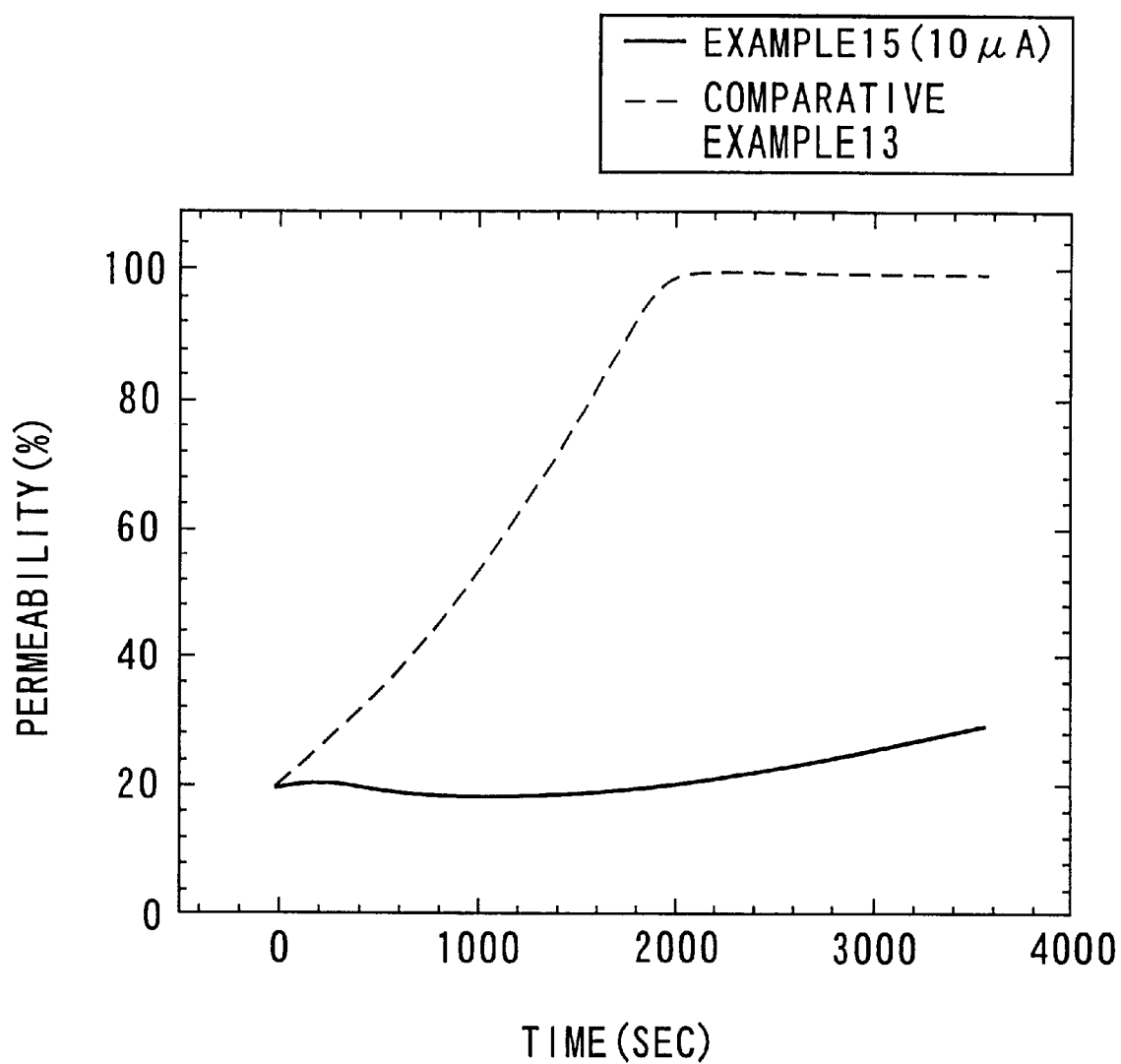
FIG. 44 is a graph illustrating the change of transmissivity in Example 15 and Comparative Example 13 after electrodepositing silver on a transparent electrode at a solution temperature of 40° C.
Figure 45:
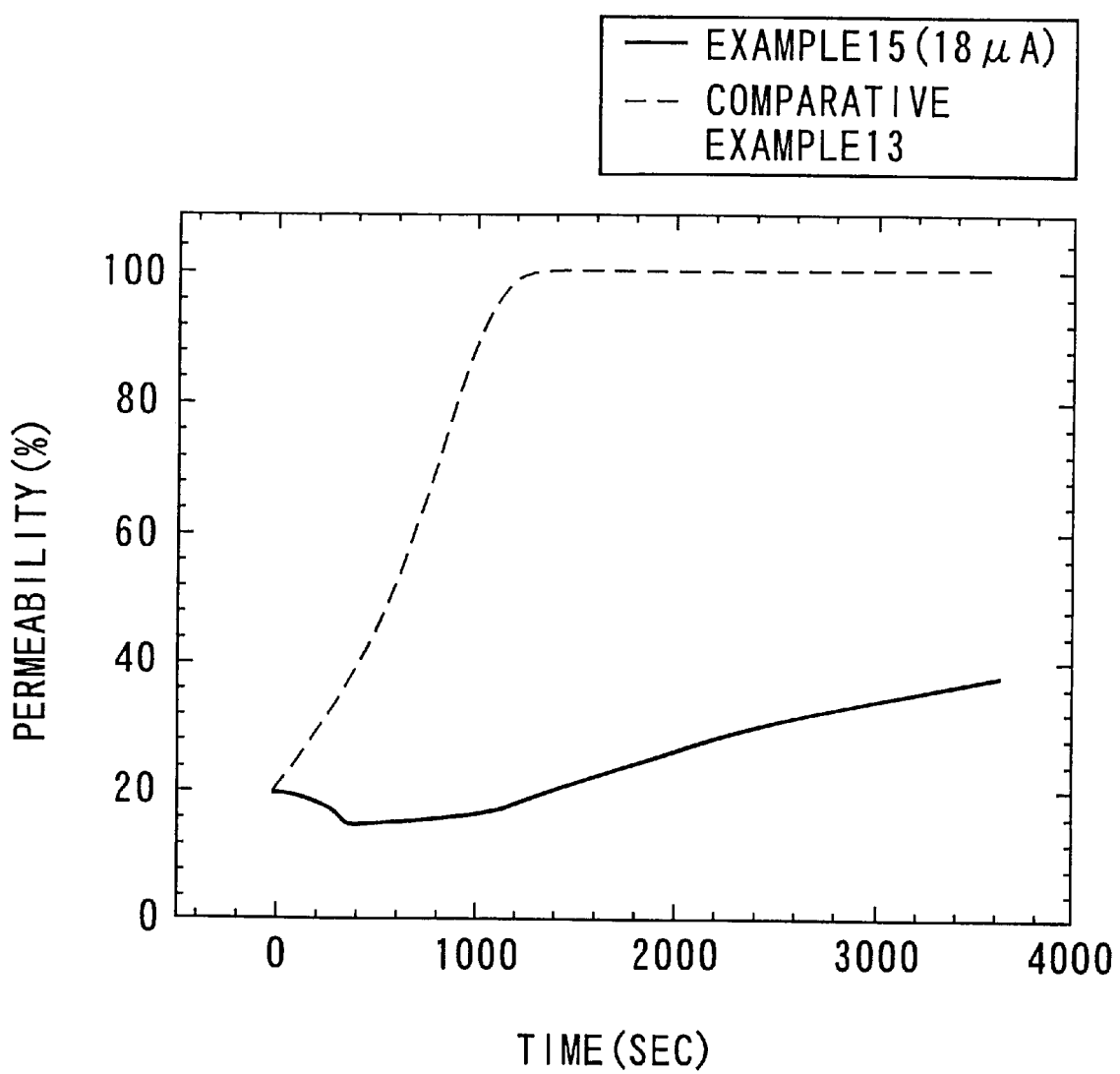
FIG. 45 is a graph illustrating the change of transmissivity in Example 15 and Comparative Example 13 after electrodepositing on a transparent electrode at a solution temperature of 60° C.

FIG. 43 to FIG. 45 show the change of transmissivity in average in Example 15 and Comparative Example 13. FIG. 43 is for 22° C., FIG. 44 is for 40° C. and FIG. 45 is for 60° C. Electrodeposits including silver were deposited to the working electrode and, subsequently, a predetermined reduction current was supplied in Example 15 and not supplied in Comparative Example 13. The average transmissivity was measured for 3600 sec (1 hour).

FIG. 43 shows the result at 22° C. In Comparative Example 13, since the reduction current was not supplied, electrodeposits were gradually dissolved and, as a result, transmissivity increased. On the contrary, in Example 15, since the reduction current at 6 μA was supplied during the measurement period, dissolved electrodeposits could be supplemented and the increase in the transmissivity was suppressed remarkably.

At 40° C., since the temperature was high, spontaneous dissolving rate of electrodeposits was high and the transmissivity increased from 20% to the total transmission (100%) in about 2000 sec. However, in Example 15 supplying the reduction current, change of the transmissivity was suppressed. In this case, since the spontaneous dissolving rate of electrodeposits was high, the reduction current was set to 10 μA, that is, a larger current was required compared with that at 22° C. (FIG. 44).

Further at 60° C., the spontaneous dissolving rate of the electrodeposits was further higher and the transmissivity increased from 20% to the total transmission (100%) in about 1200 sec when the reduction current was not supplied (Comparative Example 13). On the contrary, when the reduction current was supplied (Example 15), change of the transmissivity was suppressed although somewhat larger in a case of 22° C. or 40° C. The reduction current in this case was 18 μA (FIG. 45).

As described above, increase of the transmissivity could be suppressed effectively by supplying the reduction current but the value of the current differed depending on the temperature. Accordingly, the solution temperature was monitored by the temperature sensor and the reduction current suitable to the temperature was supplied.

In view of the results, it was possible in Example 15 to reduce the increase of the transmissivity along with spontaneous dissolving of electrodeposits and an optical device having excellent characteristics could be provided.

Example 16

Comparative Example 14

Example 16 of applying the present invention to the same optical filter (electrochemical light control element) as explained for FIG. 3 and FIG. 4 is to be explained referring to FIG. 6.

Also in this example, the appended cell of the constitution as shown in FIG. 6 was fabricated by the same fabrication method as described in Example 8. To the outside of the cell, were provided, as shown in FIG. 10, a driving power source 51 for supplying current between a transparent electrode 54 and a counter electrode 52, a temperature sensor 53 for detecting the temperature of an electrolyte 63(1) in a cell 60 and a control circuit 55 for controlling the driving power source 51 in accordance with the temperature. In FIG. 10, the reference electrode shown in FIG. 6 is not illustrated.

In the cell of this constitution, the working electrode 54 was polarized to the oxidation direction before electrodeposition as Example 16. The polarization value differed depending on the temperature since remarkable side reaction had to be suppressed between the working electrode (coated with SnO$_2$ (or tin oxide) to a thickness of 5 nm on ITO of 200 nm) and the electrolyte 63 and, in this example, it was positive about 1.3 V, 1.2 V and 1.1 V relative to silver electrode potential at each of temperatures 22° C., 40° C. and 60° C. This was controlled by the control device 55. Further, polarization to the oxidation direction was not conducted in Comparative Example 14.

Subsequently, a current of a predetermined value was supplied for 2 sec in order to electrically deposit a material containing a metal from the electrolyte onto the surface of the working electrode 54. The current value was increased from 3 mA by every 1 mA, and absence or presence of peeling for the electrodeposition film was visually confirmed. The results are shown in the following Table 12 and Table 13.

As the evaluation method, absence of peeling is indicated by "○" and presence of peeling is indicated by "X".

TABLE 12

| | Example 16 | | | |
|---|---|---|---|---|
| | 3 mA | 4 mA | 5 mA | 6 mA |
| 22° C. | ○ | ○ | — | — |
| 40° C. | ○ | ○ | ○ | — |
| 60° C. | ○ | ○ | ○ | ○ |

TABLE 13

| | Comparative Example 14 | | | |
|---|---|---|---|---|
| Current value | 3 mA | 4 mA | 5 mA | 6 mA |
| 22° C. | X | X | — | — |
| 40° C. | ○ | ○ | X | — |
| 60° C. | ○ | ○ | ○ | X |

From the results described above, it has been found that occurrence of peeling of the electrodeposited film can be suppressed at a greater current value by polarizing the working electrode 54 to the oxidation direction before electrodepositing on the surface of the working electrode 54.

From the results, it was demonstrated that Example 16 could provide excellent characteristics since electrically deposited film was less peeled from the working electrode 54 and the degree of light shielding was not reduced.

According to this example, since the working electrode was polarized to the oxidation direction and then electrodeposition was conducted before electrodeposition onto the working electrode, the peeling preventive performance could be excellent even at a large current value and tended to be maintained even if the temperature of the electrolyte increased.

Example 17

Figure 46:
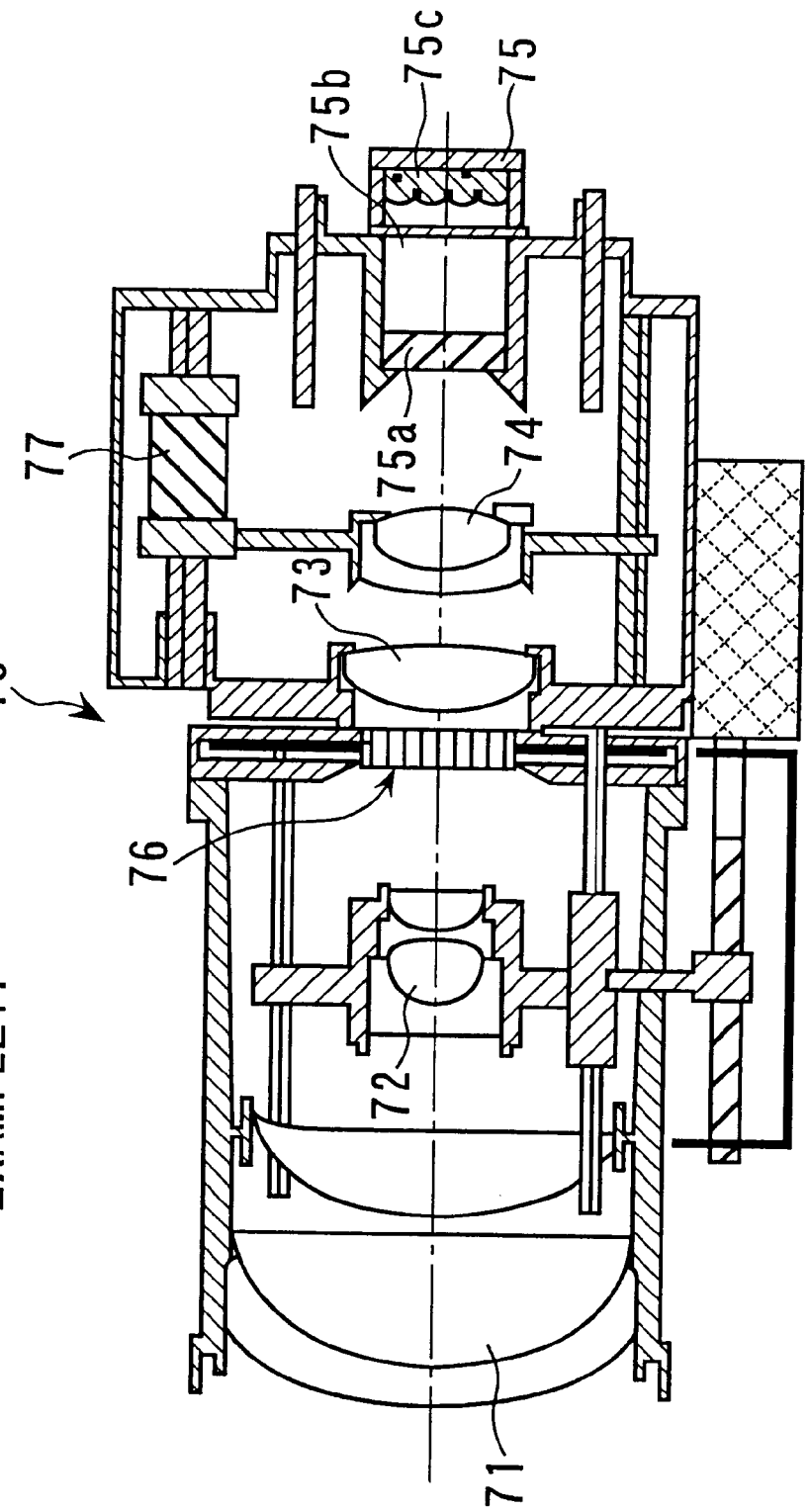
FIG. 46 is a cross sectional view illustrating the constitution of a camera system of Example 17 according to the present invention.

Then, as Example 17, explanation is to be made for the embodiment of incorporating optical devices of Example 1 to Example 16 or Combination of several examples (for example as illustrated in FIG. 6 and application of the optical device according to the present invention having an electrode pattern as shown in FIG. 4) into a CCD (Charge Coupled Device) camera with reference to FIG. 46. This is a preferred example of a camera system according to the present invention but the invention is not restricted only to the illustrated embodiment.

In a CCD camera 70 shown in FIG. 46, a first group lens 71, a second group lens 72 (for zooming), a third group lens 73, a fourth group lens 74 (for focusing) and a CCD package 75 were disposed each at an appropriate distance in this order along an optical axis (shown by single dot & dash line). The CCD package 75 contained an infrared cut filter 75a, a liquid crystal optical low path filter system 75b and a CCD camera element 75c. An optical device 76 based on the present invention described above was attached between the second group lens 72 and the third group lens 73 at a position nearer to the third group lens 73 on one identical optical path for the controlling amount of light (optical diaphragm).

The fourth group lens 74 for focusing was disposed movably by a linear motor 77 between the third group lens 73 and the CCD package 75 along the optical path, and the second group lens 72 for zooming was moveably disposed along the optical path between the first group lens 71 and the optical device 76.

Figure 47:
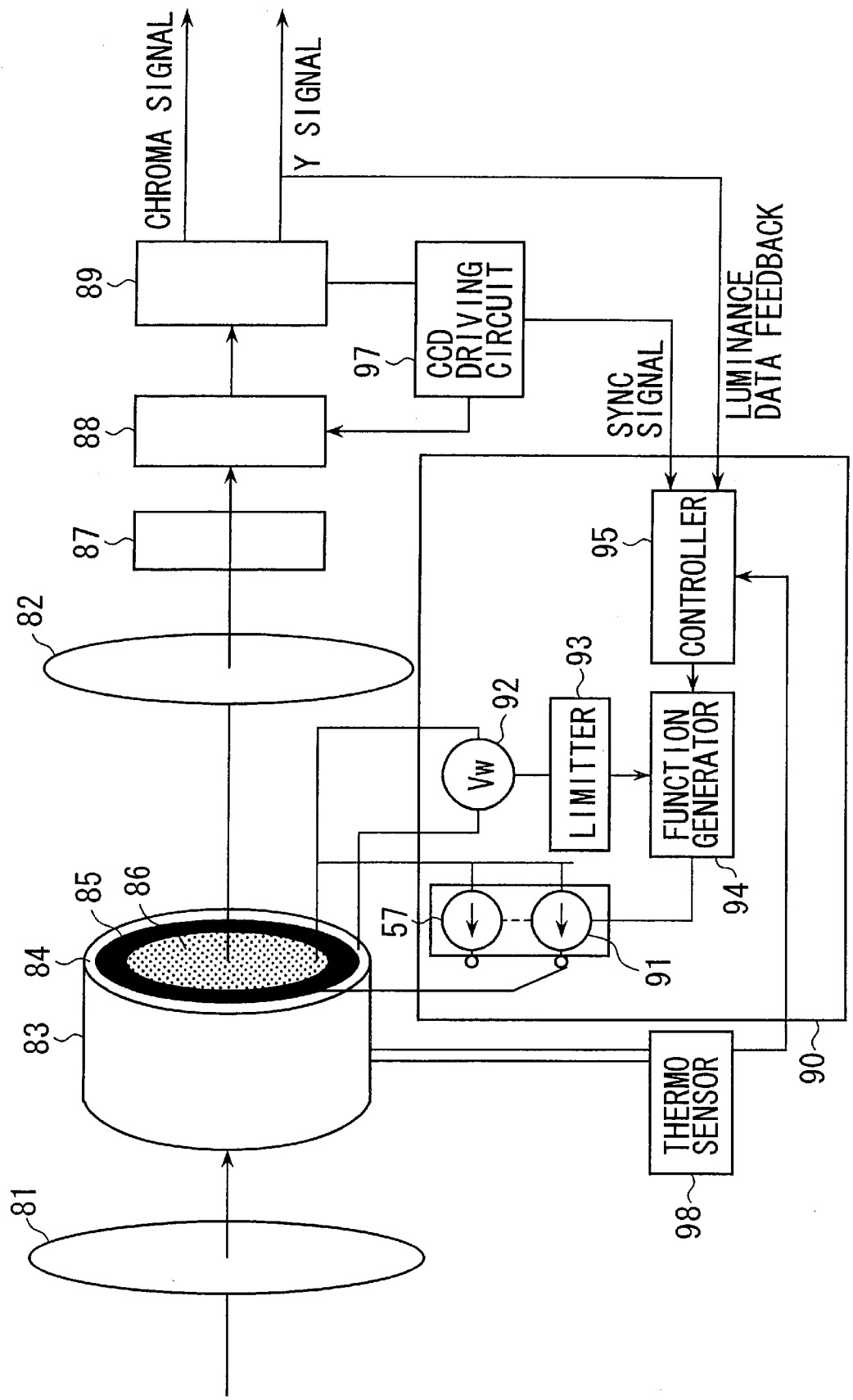
FIG. 47 is a block diagram of a camera system of Example 17 according to the present invention.

Further, FIG. 47 shows a block diagram of a driving circuit constituting the camera system according to the present invention. The system had a driving circuit section 97 for a CCD camera element 88 disposed on the light emission side of a light controlling cell 83 in which output signals from the CCD camera element 88 was processed in an Y/C signal processing section 89 and fed back as a luminance signal (Y signal) to a light controlling cell circuit section 90. The control signal from the controlling circuit section was synchronized with a basic clock from the driving circuit 97. Further, a volt meter 92 detected the potential difference of a working electrode 86 relative to a reference electrode 84 in the light controlling cell 83 and, when the value, reached a predetermined value, a value of current supplied to the power source 91 from the limiter 93 was controlled by a function generator 94 to control the transmissivity of the light controlling cell 83.

Figure 48:
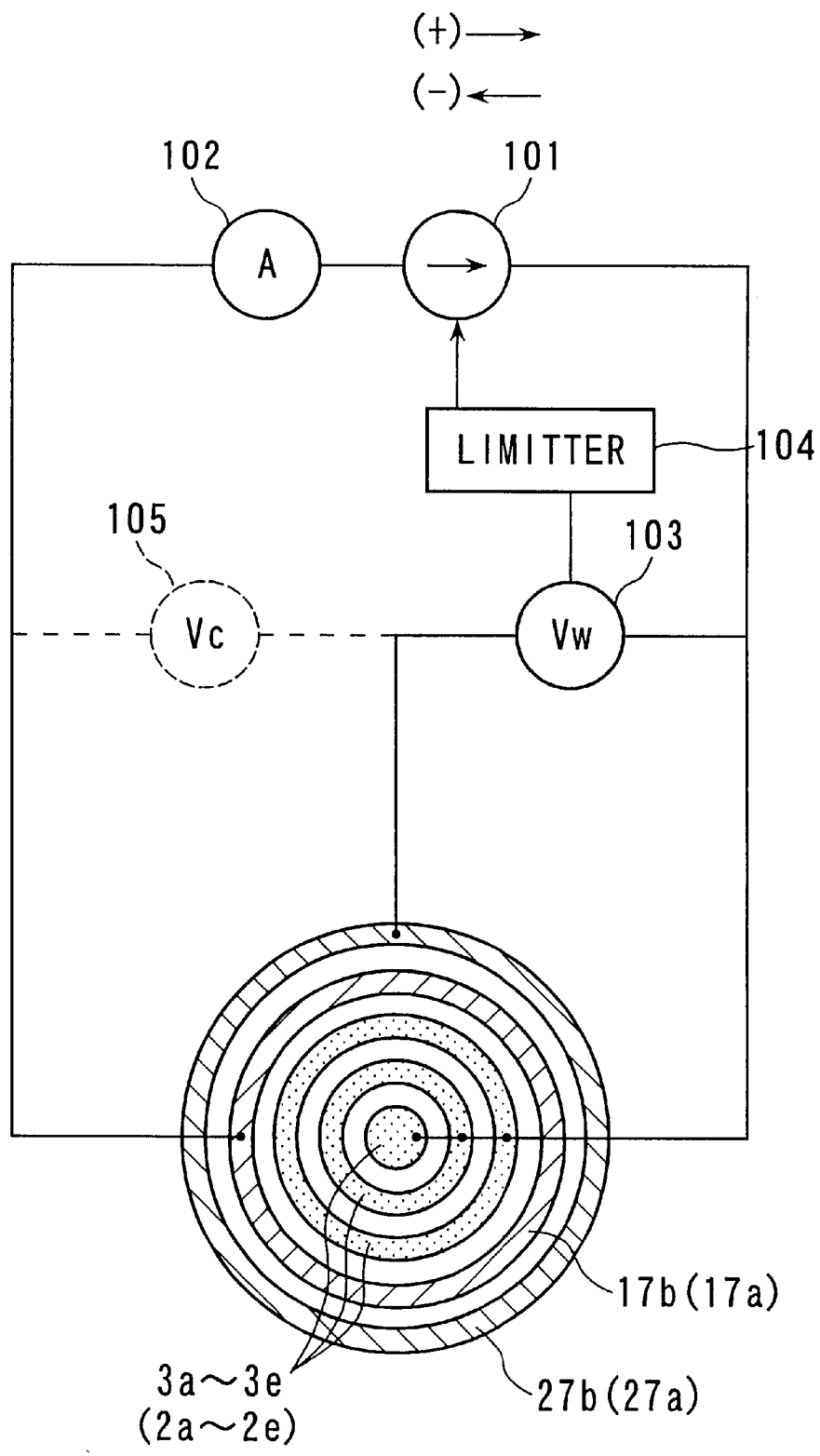
FIG. 48 is a conceptional view illustrating connection between a working electrode, a counter electrode and a reference electrode with an external circuit (in a light control cell of the optical device).

FIG. 48 is a conceptional view showing connection between the working electrode, the counter electrode and the reference electrode in the light controlling cell with an external circuit.

That is, an external power source 101 and a current meter 102 were connected in series to working electrodes 2a–2e, 3a–3e and counter electrodes 17a and 17b. Further, a voltmeter 103 was connected in parallel with the external power source 101 between the reference electrodes 27a and 27b and the working electrodes 2a–2e and 3a–3e. Further, a (current) limiter 104 was connected between the voltmeter 103 and the constant current power source 101 such that the current flowing from the constant current power source 101 was controlled by the potential difference measured by the voltmeter 103 (Vw).

In this case, the voltmeter 103 (Vc) may be disposed between the reference electrode 27a (27b) and the counter electrode 17a (17b) for measuring the potential of the counter electrode 17a (17b) relative to the reference electrode 27a (27b).

Then, based on the reference electrodes 27a and 27b, the potential difference relative to the working electrodes 2a–2e and 3a–3e was measured by the voltmeter 92 (103) and current supply by the external circuit power source 91 (101) was controlled based on the potential difference by the limiter 93 (104).

In a case where the optical device of Examples 1 to 3 was incorporated in the camera system, at least one insulation layer was formed on the lead electrodes of at least the working electrodes 2a–2e and 3a–3e (or 86 in FIG. 47) in the optical device. Since the surfaces of the working electrodes were kept clean, no undissolved residue of electrodeposits occurred at the working electrodes. Further, discoloration of the electrolyte, which was attributable mainly to the decomposition of the black resist, could be provided to keep the transparency of the optical device even when a high voltage was applied to the lead electrodes. Accordingly, a highly reliable camera system could be attained.

In a case where the optical device of Examples 4 to 7 was incorporated in the camera system, the working electrodes 2a–2e and 3a–3e (or 86 in FIG. 47) were constituted with an oxide layer, In/Sn ratio of which was 1.5 or less, in the optical device. Since an electrodeposited film on the working electrodes was less colored, the optical device had an excellent spectrum characteristic. Accordingly, a camera system of good quality was able to be provided.

In a case where the optical device of Examples 8 to 10 was incorporated in the camera system, the working electrodes 2a–2e and 3a–3e (or 86 in FIG. 47) had a two-layered structure, in which a thin tin oxide layer of 5 nm to 130 nm was formed on ITO layer. Since an electrodeposited film on the working electrodes was less colored, the optical device had an excellent spectrum characteristic. Further, since a polarization at the working electrodes was suppressed, the electric power consumption was reduced and the reaction of the electrolyte ingredient was prevented. Accordingly, a camera system of low power consumption and high reliability could be provided.

In a case where the camera system incorporated the optical device of Examples 11 to 13, the counter electrodes 17a and 17b were constituted with the first layer of the conductive particles (carbon particles and silver particles) and a cellulose binder, the second layer of polymer and the third layer as a current collector. Since the second layer was interposed between the first layer and the third layer as an adhesion layer, the first layer was less peeled even when electrodeposition/dissolution was repeated so many times on the working electrodes and the counter electrodes. Denaturation (discoloration) of the electrolyte near the counter electrodes, which might be probably attributable to the oxidation of iodic ions (I$^-$) as anions of supporting salt, could be suppressed to keep the transparency of the optical device even when the electrodeposition/dissolution was repeated so many times. Accordingly, a highly reliable camera system was able to be attained.

In a case where the optical device of Example 14 was incorporated in the camera system, the optical device had a control device 95 capable of controlling the electric current supplied to the working electrodes 2a–2e and 3a–3e (or 86 in FIG. 47) in accordance with the temperature of the electrolyte. The current could be controlled so as to attain a stable average transmissivity of the optical device irrespective of the temperature. Accordingly, a camera system of high reliability and high quality was able to be provided.

Further, in a case where the camera system incorporated the optical device having a temperature control device and a thermostat (not shown in FIG. 47) as described in Example 14 instead of a current control device, a temperature of the electrolyte could be controlled to 60° C. The constant light transmissivity 20% was able to be attained by 10.7 mA/cm$^2$ for 2 sec. Accordingly, a highly reliable camera system could be provided.

In a case where the optical device of Example 15 was incorporated in the camera system, the optical device had the reduction current power source 50 for supplementing the spontaneously dissolved portion of electrodeposits on the working electrodes 2a–2e and 3a–3e (or 86 in FIG. 47) in accordance with the temperature measured by the thermosensor 96. An appropriate driving of the reduction current power source 50 with the thermo-sensor 96 was able to suppress the change of the optical properties such as increase of the transmissivity, that is, lowering of the light shielding degree. Accordingly, high quality of a camera system could be attained.

In a case where the method of driving of a camera system could be attained Example 16 in the camera system, the working electrodes 2a–2e and 3a–3e (or 86 in FIG. 47) were polarized to an oxidation direction before electrodeposition on the working electrodes. Since the state of the working electrode surfaces was stabilized by the polarization to the oxidation direction, the material including silver was electrodeposited/dissolved easily on the working electrodes without peeling the deposited film from the electrodes. As a result, the transmissivity of the optical device could be maintained, in which the amount of light was able to be controlled successfully by the application of the electric field to the electrolyte. Accordingly, a camera system of high quality and reliability could be provided.

In a case where the optical device of Examples 1 and 4 to 16 was incorporated in the camera system, since the counter electrodes 17a and 17b and the reference electrodes 27a and 27b were constituted with a conductive particle layer 38 formed by dispersing/mixing a silver powder by the same amount as the graphite as the binder, the dipping potential of the reference electrodes 27a, 27b was identical with that of silver.

During operation of the camera system, electrolytic deposition including silver (Ag) on the working electrodes 2a–2e and the 3a–3e and dissolution of the deposited material (including Ag) from the working electrodes were conducted to control the amount of incident light. In this case, current supply by the external power source 91 (101) was controlled such that the potential difference of the working electrodes 2a–2e and 3a–3e relative to the reference electrodes 27a and 27b is kept respectively at +1.2 V or lower by the limiter 93 (104).

Further, when an optical element in which the counter electrodes 17a and 17b and reference electrodes 27a and 27b were constituted with platinum as described in Example 2 or 3 was incorporated into the camera system, since the surface of the counter electrode and the reference electrode in contact with the electrolyte was constituted with platinum having lower ionization tendency (high standard electrode potential) than that of silver, the dipping potential on the reference electrodes 27a and 27b was at the dipping potential of platinum.

In this case, current supply from the external power source 91 (101) was controlled such that the potential difference of the working electrodes 2a–2e and 3a–3e relative to the reference electrodes 27a and 27b was kept at +0.8 V or lower by the limiter 93 (104).

Also with either constitution of the counter electrode, even when the camera system was operated for a long period of time, no undissolved residue of electrodeposits occurred at the working electrodes 2a–2e and 3a–3e and, further, denaturation (discoloration) of the electrolyte which might be attributable mainly to the oxidation reaction of iodic ions ($I^-$) as anions of the supporting salt of the electrolyte could be prevented to keep the transparency of the optical device and a highly reliable camera system was able to be attained.

Further, in an optical device in which electrodeposits including silver was electrolytically deposited on platinum, palladium or gold for the reference electrodes 27a and 27b, since the dipping potential of the reference electrodes 27a and 27b was equal with that of silver, by controlling the current supply from the external power source 91 (101) such that the potential difference of the working electrodes 2a to 2e and 3a to 3e relative to the reference electrodes 27a and 27b was kept at +1.2 V or lower by the limiter 93 (104) during operation of the camera system in the same manner as incorporating the optical device of Example 1 into a camera system, no undissolved deposition of electrodeposits occurred at the working electrodes 2a to 2e and 3a to 3e even for the long time operation and denaturation (discoloration) of the salt considered to be attributable mainly to the oxidation reaction of iodic ions ($I^-$) as the anions of the supporting electrolyte of the electrolyte to attain a highly reliable camera system capable of keeping the transparency of the optical device.

According to this example, since the optical device 76 based on the present invention set between the second group lens 72 and the third group lens 73 could control the amount of light by the application of the electric field as described previously, and this was basically different from the function of existent mechanical optical diaphragm and the diaphragm driven mechanical constitution was no more required, the size of the system could be reduced substantially to an extent of the effective range of the optical path. Accordingly, it was possible to reduce the size of the CCD camera. Further, since the optical amount could be controlled properly depending on the level of the voltage applied to the patterned electrodes, diffraction phenomenon as in the related art could be prevented and a sufficient amount of light can be applied to the camera element thereby eliminating blur of images.

Further, in this camera system, the penetrating light through the light controlling cell 83 could be received by photomultiplier in another system, the luminance information of the emission light was fed back to the control circuit section 95, and a driving pulse under waveform control could be obtained from the function generator in synchronization with clocks from a light controlling cell circuit section (not illustrated).

As described above, the present invention has been explained in accordance with preferred embodiments but the embodiment can be modified variously within the technical scope of the present invention.

For example, with respect to each of the electrodes described above, the electrode pattern shown in FIG. 4 is not restricted only to the coaxial pattern but can be changed variously such as stripe or lattice. Further, different cells can be provided on every divisional electrodes and the arrangement for each of the electrodes can freely be modified in the inside of the cell.

Further, the optical element according to the present invention can be used in combination with other known filter materials (for example, organic electrochromic materials, liquid crystals and electroluminescent materials).

Further, the optical element according to the present invention is applicable generally for CCD, to various types of optical system including an optical diaphragm, for example, for light amount control in optical communication equipments of an electronic photographic copying machine. Further, the optical device to which the optical element of the present invention is applied, is applicable to various kinds of image display elements for displaying characters or images in addition to the optical filter.

The camera system according to the present invention can be effectively embodied as a camera system while taking advantages of the optical element by using the optical element according to the present invention as an optical diaphragm for CCD.

In accordance with the present invention, since an insulation film comprising an insulation material such as silicon dioxide is previously provided on the surface of the transparent electrode in an electrochemical optical element utilizing electrodeposition/dissolution reaction of a material containing a metal, it is possible to provide an element capable of overcoming the problem caused by the presence of a black resist or the like as a light shielding material, as well as provide a fabrication method capable of fabricating an optical element that can maintain the optical characteristics without causing undissolved residue of electrically deposited material caused by photoresist or the residue such as of the light shielding black resist.

Further, since the lead electrode for the transparent electrode and/or the counter electrode is covered with the insulation film, stable driving is enabled with no reaction of the black resist with electrolyte even when a high voltage is applied to the lead electrode and it is possible to provide an optical element capable of attaining a longer life of the element.

According to the optical device of the present invention, since the oxide layer in which tin is doped to indium such that the indium/tin elemental ratio is within an appropriate range of 1.5 or less is used for the electrode, when the electrode is used, for example, as a working electrode, the spectral characteristics can be improved effectively such as suppression for the coloration of the electrodeposited film. Further, by setting the indium/tin compositional ratio to 0.5 or more, the resistance as the oxide electrode can be reduced relatively.

Further, according to the fabrication method of the present invention, since the oxide layer can be formed to a desired quality or thickness while varying the target or discharging conditions in one identical vacuum apparatus by using, for example, sputtering or vacuum vapor deposition as a gas phase film forming method, an optical device capable of providing the same effect as described above can be provided.

Further, since the electrode is formed with a laminate of an oxide layer in which tin is toped to indium (for example, transparent electrode) and a tin oxide layer thereon in the optical device of the present invention, when a deposition material containing a metal is deposited on the electrode by the tin oxide layer, the spectral characteristics thereof can be improved and, in addition, the resistivity for the entire electrode can be suppressed by reducing the thickness of the tin oxide layer (for example, to 130 nm or less). As a result, it is possible to suppress the polarization of the electrode upon driving of the device.

Further, according to the fabrication method, since the tin oxide layer can be formed in contiguous with the oxide layer and the tin oxide layer can be formed into desired quality and thickness, by varying the target or the discharging conditions, for example, by a sputtering or a vacuum vapor deposition method as a gas phase film forming method in one identical vacuum apparatus, it is possible to provide a fabrication method for an optical device capable of providing the same effect as described above and having favorable reproducibility.

Further, since the optical device according to the present invention has a control device capable of controlling the value of current supplied in accordance with the temperature of the electrolyte, the amount of current supply can be controlled stably and it is possible to attain a stable average transmissivity irrespective of the temperature.

Further, in the driving method according to the present invention, stable average transmissivity can be attained irrespective of temperature, by adjusting the value of current supplied depending on the temperature in the element.

Further, in accordance with the optical device and the driving method therefor of the present invention, since a predetermined material is electrically deposited on the working electrode and then the dissolved portion of the electrodeposition material is supplemented by current supply corresponding to the temperature, change of the optical properties such as increase of the transmissivity, that is, lowering of the light shielding degree (or lowering of reflectivity) can be suppressed effectively.

Further, according to the present invention, in an optical device having a working electrode, a counter electrode and an electrolyte disposed in contact with both of the electrodes, in which light is controlled electrochemically by an electric field applied to the electrolyte, since the working electrode is polarized to the oxidation direction before electrodeposition of the material containing the predetermined metal on the working electrode, the state of the working electrode surface is stabilized so as to be easily electrodeposited and when electrodepositing the material on the working electrode thereafter, peeling of the electrically deposited film can be prevented. As a result, it is possible to provide an optical device of excellent characteristics which can suppress reduction of the light shielding and increase of the transmissivity, and in which the amount of light can be controlled by the application of the electric field.

Further, according to the camera system of the present invention, since the optical device capable of controlling the amount of light under the application of the electric field is applied to the optical amount diaphragm, a large sized mechanical constitution is no more necessary being different from existent mechanical light amount diaphragm but it is possible to reduce the size substantially within an effective range of the optical path, and the amount of light can be controlled depending on the level of the applied electric field in order to prevent diffraction, as well as blurring image effectively.

What is claimed is:

1. An optical device, comprising:
   a working electrode;
   a counter electrode;
   a lead electrode on the electrode; and
   an electrolyte disposed in contact with the electrode;
   wherein a plurality of insulation layers comprised of at least one of a silicon compound, metal compound, and an organic polymeric compound is formed on the lead electrode.

2. An optical device as claimed in claim 1, wherein the silicon compound is at least one of the following silicon compounds:
   $SiO_2$, $SiO$, $Si_xO_yN_z$, $Si_3N_4$, $Si_xN_yH_z$, CuSiO, PSG (phosphorus glass), BSG (boron glass), AsSG (arsenic glass), AlSG (aluminum glass) and PbSG (lead glass).

3. An optical device as claimed in claim 1, wherein the metal compound is at least one of a metal oxide, metal nitride, metal silicide, metal carbide and glass.

4. An optical device, comprising:
   a working electrode;
   a counter electrode;
   a lead electrode on the electrode; and
   an electrolyte disposed in contact with the electrode;
   wherein an insulation layer is formed on the lead electrode;
   wherein the metal compound is at least one of a metal oxide, metal nitride, metal silicide, metal carbide and glass; and
   wherein the metal oxide is at least one of the following metal oxides: $TiO_2$, $Ta_2O_5$, $ZrO_2$, $Al_2O_3$, GaAs oxide, $HfO_2$, $Nb_2O_5$, $GeO_2$, $AgO_2$, $CrO_3$, $Cr_2O_3$, CuO, FeO, $Fe_2O_3$, $MoO_3$, PbO and $WO_3$.

5. An optical device, comprising:
   a working electrode;
   a counter electrode;
   a lead electrode on the electrode; and
   an electrolyte disposed in contact with the electrode;
   wherein an insulation layer is formed on the lead electrode;
   wherein the metal compound is at least one of a metal oxide, metal nitride, metal silicide, metal carbide and glass; and
   wherein the metal nitride is $Ge_3N_4$.

6. An optical device, comprising:
   a working electrode;
   a counter electrode;
   a lead electrode on the electrode; and
   an electrolyte disposed in contact with the electrode;

wherein an insulation layer is formed on the lead electrode;

wherein the metal compound is at least one of a metal oxide, metal nitride, metal suicide, metal carbide and glass; and wherein the metal silicide is at least one of the following metal silicides: CuSi, CoSi, CrSi and NiSi.

7. An optical device, comprising:

a working electrode;

a counter electrode;

a lead electrode on the electrode; and an electrolyte disposed in contact with the electrode;

wherein an insulation layer is formed on the lead electrode;

wherein the metal compound is at least one of a metal oxide, metal nitride, metal silicide, metal carbide and glass; and wherein the metal carbide is WC.

8. An optical device as claimed in claim 1, wherein the organic polymeric compound is at least one of polyimide, polyamide and novalac series resin.

9. An optical device as claimed in claim 1, wherein at least one layer selected from one of metal, alloy and semiconductor is formed on said plurality of insulation layers.

10. An optical device as claimed in claim 9, wherein the metal is at least one member selected from metals belonging to groups 4A, 5A, 6A, 7A, 8A, 1B, 2B, 3B, 4B, 5B, and 6B of the periodic table.

11. An optical device as claimed in claim 9, wherein the metal is selected from at least one of the following metals: Ti, Zr, V, Nb, Ta, Cr, Mo, W, Mn, Fe, Co, Ni, Pd, Cu, Ag, Au, Zn, Al, In, Sn and Pb.

12. An optical device, comprising:

a working electrode;

a counter electrode;

a lead electrode on the electrode; and an electrolyte disposed in contact with the electrode;

wherein an insulation layer is formed on the lead electrode;

wherein at least one layer selected from one of metal, alloy and semiconductor is formed on said insulation layer; and wherein the alloy is one of Ni—Cr alloy and Nb—Sn alloy.

13. An optical device, comprising:

a working electrode;

a counter electrode;

a lead electrode on the electrode; and an electrolyte disposed in contact with the electrode;

wherein an insulation layer is formed on the lead electrode;

wherein at least one layer selected from one of metal, alloy and semiconductor is formed on said insulation layer; and wherein the semiconductor is at least one member selected from the following semiconductors: Si, Ge, GaAs, GaP, AlN, BN, BP, AlSb, GaN, GaSb, InAs, InP, InSb, BeO, CdO, CdS, CdSe, CdTe, CdTe—HgTe, HgSe, HgTe, ZnO, ZnTe, $Ag_2Se$, $Ag_2Te$, $Bi_2Se_3$, $Hg_{1-x}Cd_xTe$, ITO (compound in which tin is doped to indium oxide), $In_2Te_3$, $In_2Te_{3-x}Sb_x$, PbS, PbSe, PbTe, $Pb_{1-x}Sn_xSe$, $Pb_{1-x}Sn_xTe$, and $SnO_2 (0 \leq X \leq 1)$.

14. An optical device as claimed in claim 1, wherein a light shielding material is formed to a portion of a transparent electrode other than a light passing portion constituting the working electrode and a portion other than the counter electrode, and the plurality of insulation layers is interposed between the light shielding material and the lead electrode.

15. An optical device, comprising:

a working electrode;

a counter electrode;

a lead electrode on the electrode; and an electrolyte disposed in contact with the electrode;

wherein an insulation layer is formed on the lead electrode;

wherein a light shielding material is formed to a portion of a transparent electrode other than a light passing portion constituting the working electrode and a portion other than the counter electrode, and the insulation layer is interposed between the light shielding material and the lead electrode; and wherein the light shielding material is a light sensitive composition.

16. An optical device as claimed in claim 14, wherein the light shielding material is a black resist.

17. An optical device as claimed in claim 1, wherein the electrolyte is a silver salt electrolyte.

18. An optical device as claimed in claim 1, wherein the counter electrode has a layer containing at least one kind of conductive particles.

19. An optical device, comprising:

a working electrode;

a counter electrode;

a lead electrode on the electrode; and an electrolyte disposed in contact with the electrode;

wherein an insulation layer is formed on the lead electrode;

wherein a surface of the counter electrode in contact with the electrolyte is formed of a material having a lower ionization tendency than that of a material one of deposited and dissolved at the working electrode.

20. An optical device as claimed in claim 17, wherein a surface of the counter electrode in contact with the electrolyte is formed of a material having a lower ionization tendency than that of silver.

21. An optical device, comprising:

a working electrode;

a counter electrode;

a lead electrode on the electrode; and an electrolyte disposed in contact with the electrode;

wherein an insulation layer is formed on the lead electrode; and wherein a material one of deposited and dissolved at the working electrode is previously deposited on a surface of another material having a lower ionization tendency than that of a material in the counter electrode.

22. An optical device, comprising:

a working electrode;

a counter electrode;

a lead electrode on the electrode; and an electrolyte disposed in contact with the electrode;

wherein an insulation layer is formed on the lead electrode;

wherein the electrolyte is a silver salt electrolyte; and wherein silver is previously deposited on a surface of a material having a lower ionization tendency than that of silver in the counter electrode.

23. An optical device as claimed in claim 1, further comprising a third electrode different from the working electrode and the counter electrode.

24. An optical device as claimed in claim 23, further comprising an external circuit connected electrically with the third electrode, and at least one of the working electrode and the counter electrode.

25. An optical device as claimed in claim 23, wherein the third electrode comprises one of a single layer and a laminate structure of at least two layers.

26. An optical device as claimed in claim 25, wherein one of the single layer and the first layer of the laminate structure present on a side of the electrolyte contains one of a metal dissolved in the electrolyte and a metal having a lower ionization tendency than that of said metal and a second layer covered with the first layer comprises a metal different from that for one of the first layer and an oxide thereof.

27. An optical device as claimed in claim 26, wherein the electrolyte is a silver salt solution.

28. An optical device as claimed in claim 25, wherein said one of the single layer and the first layer of the laminate structure present on a side of the electrolyte of the third electrode is formed of at least one member selected from the group consisting of palladium, platinum and gold.

29. An optical device as claimed in claim 25, wherein the second layer covered with the first layer of the laminate structure present on a side of the electrolyte of the third electrode is formed of at least one metal selected from the group consisting of titanium, chromium and tungsten.

30. An optical device as claimed in claim 25, wherein the second layer covered with the first layer of the laminate structure present on a side of the electrolyte of the third electrode is formed of indium-tin oxide in which tin is doped to one of indium oxide and tin oxide.

31. An optical device as claimed in claim 25, wherein the second layer covered with the first layer of the laminate structure present on a side of the electrolyte of the third electrode is disposed as an adhesion layer of the first layer relative to a substrate.

32. An optical device, comprising:

a working electrode;

a counter electrode;

a lead electrode on the electrode; and an electrolyte disposed in contact with the electrode;

wherein an insulation layer is formed on the lead electrode;

a third electrode different from the working electrode and the counter electrode;

wherein the third electrode comprises one of a single layer and a laminate structure of at least two layers; and wherein the third electrode has a third layer on one of the single layer and on the first layer of the laminate structure present on a side of the electrolyte, said third layer comprising a material different from that for said layer.

33. An optical device as claimed in claim 32, wherein the third layer comprises silver.

34. An optical device as claimed in claim 32, wherein the third layer comprises a conductive particle layer containing silver particles.

35. An optical device as claimed in claim 32, wherein the third layer contains a carbonaceous material.

36. An optical device as claimed in claim 32, wherein the third layer contains a binder.

37. An optical device, comprising:

a working electrode;

a counter electrode;

a lead electrode on the electrode; and an electrolyte disposed in contact with the electrode;

wherein an insulation layer is formed on the lead electrode;

a third electrode different from the working electrode and the counter electrode;

wherein the third electrode comprises one of a single layer and a laminate structure of at least two layers; and wherein one of the single layer and the first layer present on a side of the electrolyte and the second layer covered with the first layer of the laminate structure are formed by one of a gas phase film forming method and a plating method.

38. An optical device as claimed in claim 32, wherein the third layer is formed by one of a gas phase film forming method and a plating method.

39. An optical device, comprising:

a working electrode;

a counter electrode;

a lead electrode on the electrode; and an electrolyte disposed in contact with the electrode;

wherein an insulation layer is formed on the lead electrode;

a third electrode different from the working electrode and the counter electrode;

wherein no angled edge is substantially present at an end edge of the third electrode.

40. An optical device, comprising:

a working electrode;

a counter electrode;

a lead electrode on the electrode; and an electrolyte disposed in contact with the electrode;

wherein an insulation layer is formed on the lead electrode;

a third electrode different from the working electrode and the counter electrode;

wherein one of a circumferential edge and a peripheral portion for each of the working electrode, the counter electrode and the third electrode is covered with a light shielding layer and a main surface for each of the working electrode and the counter electrode is present on a side of a substrate than a surface of the light shielding layer.

41. An optical device as claimed in claim 40, wherein the light shielding layer comprises a black resist.

42. An optical device as claimed in claim 23, comprising one of a pair of transparent and semitransparent substrates opposed to each other, at least one of a pair of transparent and transparent working electrodes each disposed to opposing surfaces of said one of pair of transparent and semitransparent substrates and opposed to each other, an electrolyte comprising a silver salt disposed in contact with the pair of working electrodes, and the counter electrode and the third electrode disposed in contact with the electrolyte and located at a periphery of the working electrode.

43. An optical device as claimed in claim 24, wherein the external circuit has measuring means for measuring a potential difference of at least one of the working electrode and the counter electrode relative to the third electrode.

44. An optical device, comprising:

a working electrode;

a counter electrode;

a lead electrode on the electrode; and an electrolyte disposed in contact with the electrode;

wherein an insulation layer is formed on the lead electrode;

a third electrode different from the working electrode and the counter electrode; and an external circuit connected electrically with the third electrode, and at least one of the working electrode and counter electrode;

wherein the external circuit has control means for controlling an external power source so that a potential difference of at least one of the working electrode and the counter electrode relative to the third electrode is kept within a predetermined range.

45. An optical device, comprising:

an electrode formed of an oxide layer, wherein indium is doped to tin and indium/tin is 1.5 or less by an element ratio.

46. An optical device as claimed in claim 45, wherein the indium/tin is 1.5 to 0.5 by the element ratio.

47. An optical device as claimed in claim 45, having a working electrode as the electrode having a transmissibility of 70% or more in a visible light region, a counter electrode and an electrolyte disposed in contact with the electrodes in which light is controlled electrochemically by application of an electric field to the electrolyte.

48. An optical device as claimed in claim 45, wherein the oxide layer is formed by a gas phase film forming method.

49. An optical device as claimed in claim 47, having a pair of one of transparent and semitransparent substrates opposed to each other, the working electrode disposed on at least one of opposing surfaces of the pair of one of transparent and semitransparent substrates and a silver salt solution as the electrolyte disposed between the one of transparent and semitransparent substrates in contact with the working electrode and the counter electrode.

50. An optical device comprising:

a transparent electrode;

wherein the electrode is formed of a laminate having an oxide layer in which indium is doped to tin and a tin oxide layer.

51. An optical device, comprising:

an electrode;

wherein the electrode is formed of a laminate having an oxide layer in which indium is doped to tin and a tin oxide layer; and a working electrode as the electrode having a transmissibility of 70% or more in a visible light region, a counter electrode and an electrolyte disposed in contact with the electrodes in which light is controlled electrochemically by application of an electric field to the electrolyte.

52. An optical device as claimed in claim 50, wherein the tin oxide layer is laminated at a thickness of 5 nm or more and 130 nm or less so as to cover the oxide layer.

53. An optical device as claimed in claim 52, wherein the tin oxide layer is formed by a gas phase film forming method.

54. An optical device as claimed in claim 50, having a pair of one of transparent and semitransparent substrates opposed to each other, the working electrode disposed on at least one of opposing surfaces of the pair of one of transparent and semitransparent substrates and a silver salt solution as the electrolyte disposed between the one of transparent and semitransparent substrates in contact with the working electrode and the counter electrode.

55. An optical device, comprising:

a working electrode;

a counter electrode;

an electrolyte disposed in contact with both of the electrodes, wherein the counter electrode has a first layer including conductive particles; a second layer including a polymer layer; and a third layer including a current collector, and the second layer is interposed between the first layer and the third layer.

56. An optical device as claimed in claim 55, wherein at least a portion of the first layer of the counter electrode contains at least one kind of conductive particles and at least one kind of binder.

57. An optical device as claimed in claim 55, wherein the conductive particles are constituted with at least one member selected from the group consisting of silver and carbon material.

58. An optical device as claimed in claim 55, wherein the binder is constituted with at least one of resin materials selected from the group consisting of natural rubber series, cellulose series, phenol series, urethane series and epoxy series materials.

59. An optical device, comprising:

a working electrode;

a counter electrode;

an electrolyte disposed in contact with both of the electrodes, wherein the counter electrode has a first layer including conductive particles; a second layer including a polymer layer; and a third layer including a current collector, and the second layer is interposed between the first layer and the third layer;

wherein at least a portion of the first layer of the counter electrode comprises silver particles, conductive particles other than the silver particles and the binder.

60. An optical device as claimed in claim 59, wherein the silver particles are added at a weight ratio of 0.01 to 100 times based on an ingredient comprising the conductive particles other than the silver particles and the binder.

61. An optical device as claimed in claim 60, wherein the silver particles are added at a weight ratio of 0.01 to 100 times based on a solid content of a paste comprising the conductive particles other than the silver particles and the binder.

62. An optical device as claimed in claim 59, wherein the silver particles are added to a paste comprising the conductive particles and the binder in a case where a potential of the counter electrode is different by 50 mV or more than a potential for the silver electrode in one of the positive and negative direction.

63. An optical device as claimed in claim 56, wherein at least a portion of the first layer of the counter electrode comprises conductive particles other than silver which are one of previously plated with silver and vapor deposited with silver, and the binder.

64. An optical device, comprising:

a working electrode;

a counter electrode;

an electrolyte disposed in contact with both of the electrodes;

wherein the counter electrode has a first layer including conductive particles, a second layer including a polymer layer, and a third layer including a current collector, and the second layer is interposed between the first layer and the third layer;

wherein at least a portion of the first layer of the counter electrode contains at least one kind of conductive particles and at least one kind of binder;

wherein at least a portion of the first layer of the counter electrode comprises conductive particles other than silver which are one of previously plated with silver and vapor deposited with silver, and the binder; and wherein the silver formed by one of plating and vapor deposition of silver is added at a weight ratio of 0.01 to 100 times based on an ingredient comprising the conductive particles other than silver and the binder.

65. An optical device as claimed in claim 64, wherein silver formed by one of plating and vapor deposition of silver is added at a weight ratio of 0.01 times to 100 times based on a solid content of a paste comprising the conductive particles other than silver and the binder.

66. An optical device as claimed in claim 55, wherein at least a portion of the first layer of the counter electrode is formed of a paste prepared by mixing, with the binder, the conductive material other than silver which is one of previously plated with silver and vapor deposited with silver after pulverization.

67. An optical device as claimed in claim 55, wherein the conductive particles are added to the binder in a case where a potential of the counter electrode is different by 50 mV or more than a potential for silver electrode in one of the positive and negative direction.

68. An optical device as claimed in claim 55, wherein the first layer of the counter electrode comprises a sintered product of conductive particles.

69. An optical device, comprising:

a working electrode;

a counter electrode;

an electrolyte disposed in contact with both of the electrodes, wherein the counter electrode has a first layer including conductive particles; a second layer including a polymer layer; and a third layer including a current collector, and the second layer is interposed between the first layer and the third layer;

wherein the first layer of the counter electrode comprises a sintered product of conductive particles; and wherein at least a portion of the first layer of the counter electrode comprises a sintered layer of silver particles and conductive particles other than the silver.

70. An optical device, comprising:

a working electrode;

a counter electrode;

an electrolyte disposed in contact with both of the electrodes, wherein the counter electrode has a first layer including conductive particles; a second layer including a polymer layer; and a third layer including a current collector, and the second layer is interposed between the first layer and the third layer;

wherein the first layer of the counter electrode comprises a sintered product of conductive particles; and wherein the sintered layer is formed in a case where a potential of the counter electrode is different is different by 50 mV or more than a potential for the silver electrode in one of the positive and negative direction.

71. An optical device, comprising:

a working electrode;

a counter electrode;

an electrolyte disposed in contact with both of the electrodes, wherein the counter electrode has a first layer including conductive particles; a second layer including a polymer layer; and a third layer including a current collector, and the second layer is interposed between the first layer and the third layer;

wherein the first layer of the counter electrode comprises a sintered product of conductive particles; and wherein at least a portion of the first layer of the counter electrode comprises a sintered layer of conductive particles other than silver which are one of previously plated with silver and vapor deposited with silver.

72. An optical device as claimed in claim 71, wherein at least a portion of the first layer of the counter electrode is formed by pulverizing and then preliminarily molding a conductive material other than silver which has been one of previously plated with silver and vapor deposited with silver and then further sintering the same.

73. An optical device as claimed in claim 71, wherein the conductive material is sintered after pulverization and preliminary molding in a case where a potential of the counter electrode is different by 50 mV or more than a potential for the silver electrode in one of the positive and negative direction.

74. An optical device, comprising:

a working electrode;

a counter electrode;

an electrolyte disposed in contact with both of the electrodes; and wherein the counter electrode has a first layer including conductive particles; a second layer including a polymer layer; and a third layer including a current collector, and the second layer is interposed between the first layer and the third layer;

wherein the second layer is formed of at least one kind of conductive polymeric material.

75. An optical device as claimed in claim 74, wherein the conductive polymeric material is formed by an electrochemical polymerization process.

76. An optical device as claimed in claim 75, wherein polyaniline is used for the conductive polymeric material.

77. An optical device as claimed in claim 75, wherein polypyrrole is used for the conductive polymeric material.

78. An optical device as claimed in claim 75, wherein polythiophene is used for the conductive polymeric material.

79. An optical device as claimed in claim 55, comprising:

a working electrode;

a counter electrode;

an electrolyte disposed in contact with both of the electrodes; and wherein the counter electrode has a first layer including conductive particles; a second layer including a polymer layer; and a third layer including a current collector, and the second layer is interposed between the first layer and the third layer;

wherein the third layer of the counter electrode is constituted with one of a metal foil and a thin conductive film.

80. As optical device, comprising:

a working electrode;

a counter electrode;

an electrolyte disposed in contact with both of the electrodes;

wherein the counter electrode has a first layer including conductive particles; a second layer including a polymer layer; and a third layer including a current collector, and the second layer is interposed between the first layer and the third layer; and wherein the third layer is constituted with the same material as that for the working electrode.

81. An optical device, comprising:

a working electrode;

a counter electrode;

an electrolyte disposed in contact with both of the electrodes; and wherein the counter electrode has a first layer including conductive particles; a second layer including a polymer layer; and a third layer including a current collector, and the second layer is interposed between the first layer and the third layer;

wherein no angled edge substantially is present at an edge of the counter electrode.

82. An optical device as claimed in claim 55, comprising a pair of one of transparent and semitransparent substrates opposed to each other, a working electrode disposed to at least one of opposing surfaces of the pair of one of transparent and semitransparent substrates, a silver salt solution disposed between the pair of one of transparent and semitransparent substrates in contact with the working electrode and the counter electrode disposed in contact with the silver salt solution.

83. An optical device as claimed in claim 82, wherein the working electrode is constituted with indium/tin oxide.

84. An optical device comprising:

a working electrode;

a counter electrode;

an electrolyte disposed in contact with both of the electrodes; and a control device controlling a driving current to the electrodes, wherein a driving current is controlled in accordance with a temperature.

85. An optical device, comprising:

a working electrode;

a counter electrode;

an electrolyte disposed in contact with both of the electrodes; and a control device controlling a driving current to the electrodes, wherein a driving current is controlled in accordance with a temperature; and wherein a sensor for detecting the temperature of the electrolyte is disposed and an information of the temperature is inputted to a control circuit as a control means.

86. An optical device, comprising:

a working electrode;

a counter electrode;

an electrolyte disposed in contact with both of the electrodes; and a control device controlling a driving current to the electrodes, wherein a driving current is controlled in accordance with a temperature; and wherein the working electrode is one of a transparent and semitransparent electrode having a transmissivity of 70% or more in a visible light region.

87. An optical device, comprising:

a working electrode;

a counter electrode;

an electrolyte disposed in contact with both of the electrodes; and a control device controlling a driving current to the electrodes, wherein a driving current is controlled in accordance with a temperature; and wherein the electrolyte is a silver salt solution.

88. An optical device comprising:

a working electrode;

a counter electrode;

an electrolyte disposed in contact with both of the electrodes; and a current supply connected to the working electrode, wherein the current supply supplies a current for supplementing a spontaneously dissolved portion of electrodeposited material after electrodeposition of a material from the electrolyte on the working electrode.

89. An optical device as claimed in claim 88, wherein the current supply means is a constant current source.

90. An optical device as claimed in claim 88, wherein the current supply means is connected between the working electrode and the counter electrode.

91. An optical device, comprising:

a working electrode;

a counter electrode;

an electrolyte disposed in contact with both of the electrodes; and a current supply connected to the working electrode, wherein the current supply supplies a current for supplementing a dissolved portion of electrodeposited material after electrodeposition of a material from the electrolyte on the working electrode; and a sensor for detecting a temperature of the electrolyte and a control circuit for controlling one of the current supplied and the voltage applied by the current supply means.

92. An optical device, comprising:

a working electrode;

a counter electrode;

an electrolyte disposed in contact with both of the electrodes; and a current supply connected to the working electrode, wherein the current supply supplies a current for supplementing a dissolved portion of electrodeposited material after electrodeposition of a material from the electrolyte on the working electrode; and wherein a power source circuit is disposed for supplying a driving current controlled for one of electrodeposition and dissolution of a predetermined material and a power source circuit and the current supply means are adapted to be switchable.

93. An optical device as claimed in claim 92, further comprising a sensor for detecting a temperature of the electrolyte and a control circuit for controlling a driving current by the power source circuit based on a temperature information of the sensor.

94. An optical device, comprising:

a working electrode;

a counter electrode;

an electrolyte disposed in contact with both of the electrodes; and a current supply connected to the working electrode, wherein the current supply supplies a current for supplementing a dissolved portion of electrodeposited material after electrodeposition of a material from the electrolyte on the working electrode; and wherein the working electrode is one of a transparent and a semitransparent electrode having a transmissivity of 70% or more in a visible light region.

95. An optical device, comprising:

a working electrode;

a counter electrode;

an electrolyte disposed in contact with both of the electrodes; and a current supply connected to the working electrode, wherein the current supply supplies a current for supplementing a dissolved portion of electrodeposited material after electrodeposition of a material from the electrolyte on the working electrode; and wherein the electrolyte is a silver salt solution.

96. An optical device, comprising:

a working electrode;

a counter electrode;

an electrolyte disposed in contact with both of the electrodes; and a polarization device connected to the working electrode, wherein the polarization device polarizes the working electrode to an oxidation direction before electrodeposition of a material from the electrolyte on the working electrode.

97. An optical device as claimed in claim 96, comprising a temperature sensor for detecting a temperature of the electrolyte and a control circuit for controlling the polarization device in accordance with the temperature of the electrolyte detected by the temperature sensor.

98. An optical device as claimed in claim 96, wherein the working electrode is polarized toward a reducing state to electrodeposit the material after the working electrode has been polarized in the oxidation direction.

99. An optical device as claimed in claim 98, comprising a temperature sensor for detecting a temperature of the electrolyte and a control circuit for controlling polarization of the working electrode upon at least one of electrodeposition and dissolution of a material in accordance with the temperature of the electrolyte.

100. An optical device as claimed in claim 96, comprising a pair of one of transparent and semitransparent substrates opposed to each other, a transparent electrode disposed as the working electrode to at least one of opposing surfaces of the pair of one of transparent and semitransparent substrates and a silver salt solution as the electrolyte disposed in contact with the transparent electrode and the counter electrode between the one of transparent and semitransparent substrates.

101. A method of driving an optical device having a working electrode, a counter electrode and an electrolyte disposed in contact with both of the electrodes, comprising:

electrodepositing a material on the working electrode; and supplying an electric current for supplementing a spontaneously dissolved portion of the material.

102. A method of driving an optical device as claimed in claim 101, wherein the current supply for supplementing the dissolved portion of the electrodeposition material is conducted by a constant current.

103. A method of driving an optical device as claimed in 101, wherein a power source circuit for current supply for supplementing the dissolved portion of the electrodeposition material is connected between the working electrode and the counter electrode.

104. A method of driving an optical device having a working electrode, a counter electrode and an electrolyte disposed in contact with both of the electrodes, comprising:

electrodepositing a material on the working electrode; and supplying an electric current for supplementing a dissolved portion of the material; and detecting a temperature of the electrolyte, and controlling one of electric current and voltage by current supply for supplementing the dissolved portion of the electrodeposition material based on information of the temperature.

105. A method of driving an optical device having a working electrode, a counter electrode and an electrolyte disposed in contact with both of the electrodes, comprising:

electrodepositing a material on the working electrode; and supplying an electric current for supplementing a dissolved portion of the material;

wherein a current supply for a driving current for one of electrodeposition and dissolution of a predetermined material and the current supply for supplementing the dissolved portion of the electrodeposition material are switched.

106. A method of driving an optical device as claimed in claim 105, further comprising:

detecting a temperature of the electrolyte and controlling the driving current based on an information of the temperature.

107. A method of driving an optical device having a working electrode, a counter electrode and an electrolyte disposed in contact with both of the electrodes, comprising:

electrodepositing a material on the working electrode; and supplying an electric current for supplementing a dissolved portion of the material;

wherein the working electrode is one of a transparent and a semitransparent electrode having a transmissivity of 70% or more in a visible light region.

108. A method of driving an optical device having a working electrode, a counter electrode and an electrolyte disposed in contact with both of the electrodes, comprising:

electrodepositing a material on the working electrode; and supplying an electric current for supplementing a dissolved portion of the material;

wherein the electrolyte is a silver salt solution.

109. A method of driving an optical device having a working electrode, a counter electrode and an electrolyte disposed in contact with both of the electrodes, comprising:

polarizing the working electrode to an oxidation direction; and thereafter electrodepositing a material on the working electrode.

110. A method of driving an optical device as claimed in claim 109, further comprising a temperature sensor for detecting a temperature of the electrolyte and a control circuit for controlling a polarization means in accordance with the temperature of the electrolyte detected by the temperature sensor.

111. A method of driving an optical device as claimed in claim 109, wherein the working electrode is polarized toward a reducing state to electrodeposit the material after the working electrode has been polarized in the oxidation direction.

112. A method of driving an optical device as claimed in claim 111, comprising a temperature sensor for detecting a temperature of the electrolyte and a control circuit for controlling a polarization of the working electrode upon one of electrodeposition and dissolution of a material in accordance with the temperature of the electrolyte.

113. A method of driving an optical device as claimed in claim 109, the device comprising a pair of one of transparent and semitransparent substrates opposed to each other, a transparent electrode disposed as the working electrode to at least one of opposing surfaces of the pair of one of transparent and semitransparent substrates and a silver salt solution as the electrolyte disposed in contact with the transparent electrode and the counter electrode between the one of transparent and semitransparent substrates.

114. An optical device comprising:

a working electrode as the electrode, having a transmissibility of 70% or more in a visible light region;

a counter electrode; and an electrolyte disposed in contact with the electrode which comprises the oxide layer;

wherein indium is doped to tin and indium/tin is 1.5 to 0.5 by an element ration.

115. An optical device comprising:

a transparent electrode;

wherein the electrode is formed of a laminate having an oxide layer in which indium is doped to tin and a tin oxide layer;

wherein the tin oxide layer is laminated at a thickness of 5 nm or more and 130 nm or less so as to cover the oxide layer;

wherein the tin oxide layer is formed by a gas phase film forming method; and wherein at least a portion of the first layer of the counter electrode is formed of a paste prepared by mixing, with the binder, the conductive material other than silver which is one of previously plated with silver and vapor deposited with silver after pulverization.

116. An optical device comprising:

a transparent electrode;

wherein the electrode is formed of a laminate having an oxide layer in which indium is doped to tin and a tin oxide layer, wherein the tin oxide layer is laminated at a thickness of 5 nm or more and 130 nm or less so as to cover the oxide layer;

wherein the tin oxide layer is formed by a gas phase film forming method; and wherein conductive particles are added to the binder in a case where a potential of the counter electrode is different by 50 mv or more than a potential for a silver electrode in one of the positive and negative direction.

* * * * *